(12) United States Patent
Ahmed et al.

(10) Patent No.: US 7,522,657 B2
(45) Date of Patent: Apr. 21, 2009

(54) THROUGHPUT MAXIMIZATION IN WIRELESS COMMUNICATION SYSTEMS

(75) Inventors: S. Nadeem Ahmed, Allen, TX (US); Richard G. Baraniuk, Houston, TX (US)

(73) Assignee: William Marsh Rice University, Houston, TX (US)

( * ) Notice: Subject to any disclaimer, the term of this patent is extended or adjusted under 35 U.S.C. 154(b) by 743 days.

(21) Appl. No.: 10/969,637

(22) Filed: Oct. 20, 2004

(65) Prior Publication Data

US 2006/0083295 A1  Apr. 20, 2006

Related U.S. Application Data

(60) Provisional application No. 60/512,712, filed on Oct. 20, 2003.

(51) Int. Cl.
*H04B 1/38* (2006.01)
*H04L 5/16* (2006.01)

(52) U.S. Cl. .................................... 375/219
(58) Field of Classification Search ................ 375/219
See application file for complete search history.

(56) References Cited

U.S. PATENT DOCUMENTS

| | | | |
|---|---|---|---|
| 6,947,407 B2* | 9/2005 | Ayyagari et al. | 370/342 |
| 2001/0040881 A1* | 11/2001 | Ayyagari et al. | 370/342 |
| 2003/0206559 A1* | 11/2003 | Trachewsky et al. | 370/509 |

OTHER PUBLICATIONS

J.H. Barnard, C. K. Pauw,"Probability of Error for Selection Diversity as a Function of Dwell Time," IEEE Transactions on Communications, vol. 31, No. 8, Aug. 1989.*
Nadeem Ahmed and Richard G. Baraniuk, "Throughput Measures for Delay-Constrained Communications in Fading Channels," Dept. of Electrical and Computer Engineering Engineering, Rice University, Houston, TX, Oct. 2003—Rice DSP publications from the CMC database online: http://cmc.rice.edu/docs/docs/Ahm2003Oct5Throughput.pdf.*
Ahmed, Nadeem et al., "Throughput Measures For Delay-Constrained Communications In Fading Channels," Allerton Conf. Comm., Cont. And Comp., 2003, 11 pages, Monticello, Illinois.
Berry, Randall A., et al., "Communication Over Fading Channels With Delay Constraints," IEEE Transactions On Information Theory, May, 2002, pp. 1135-1149, vol. 48, No. 5.
Biglieri, Ezio et al., "Fading Channels: Information-Theoretic And Communications Aspects," IEEE Transactions On Information Theory, Oct. 1998, pp. 2619-1692, vol. 44, No. 6.
Caire, Giuseppe, et al., "Optimum Power Control Over Fading Channels" IEEE Transactions On Information Theory, Jul. 1999, pp. 1468-1489, vol. 45, No. 5.

(Continued)

*Primary Examiner*—David C Payne
*Assistant Examiner*—Nader Bolourchi
(74) *Attorney, Agent, or Firm*—Conley Rose, P.C.; Rodney B. Carroll

(57) ABSTRACT

A communication method comprising characterizing a communications channel, determining a data rate and optionally a power allocation strategy that maximizes channel throughput, and configuring a transmitter to send a transmit signal with said data rate and said optional power allocation strategy.

31 Claims, 25 Drawing Sheets

OTHER PUBLICATIONS

Corless, R. M. et al., On The Lambert W Function, 1996, 32 pgs.

Ephremides, Anthony et al., "Information Theory And Communication Networks: An Unconsummated Union," IEEE Transactions On Information Theory, Oct. 1998, pp. 2416-2434, vol. 44, No. 6.

Fu, Alvin et al, "Transmission Scheduling Over A Fading Channel With Energy And Deadline Constraints," 2002 Conference On Information Sciences And Systems, Mar. 20-22, 2002, 6 pgs., Princeton University.

Goldsmith, Andrea J., et al., "Capacity Of Fading Channels With Channel Side Information," IEEE Transactions On Information Theory, Nov. 1997, pp. 1986-1992, vol. 43, No. 6.

Hanly, Stephen V. et al., "Multiaccess Fading Channels—Part II: Delay-Limited Capacities," IEEE Transactions On Information Theory, Nov. 1998, pp. 2816-2831, vol. 44, No. 7.

Knopp, Raymond et al., "On Coding For Block Fading Channels," IEEE Transactions On Information Theory, Jan. 2000, pp. 189-205, vol. 46, No. 1.

Luo, Jianghong et al., "Service Outage Based Capacity And Optimum Power Allocation For Parallel Fading Channels," ISIT 2002, p. 108, Jun. 30-Jul. 5, 2002, Switzerland.

Luo, Jianghong et al., "Service Outage Based Power and Rate Allocation," IEEE Transactions On Information Theory, Jan. 2003, pp. 323-330, vol. 49, No. 1.

Negi, Rohit, et al., "Delay-Constrained Capacity With Casual Feedback," IEEE Transactions On Information Theory, Sep. 2002, pp. 2478-2494, vol. 48, No. 9.

Negi, Rohit, et al., "Minimum Outage Transmission Over Fading Channels With Delay Constraint," IEEE International Conference Communication (ICC). 2000, pp. 282-286, New York.

Ozarow, Lawrence H. et al., "Information Theoretic Considerations For Cellular Mobile Radio," IEEE Transactions On Vehicular Technology, May 1994, pp. 359-378, vol. 43, No. 2.

Prabhakar, Balaji et al., "Entropy And The Timing Capacity Of Discrete Queues," IEEE Transactions On Information Theory, Feb. 2003, pp. 357-370, vol. 49, No. 2.

Rajan, Dinesh et al., "Delay-Bounded Packet Scheduling Of Bursty Traffic Over Wireless Channels," IEEE Transactions On Information Theory, Jan. 2004, pp. 125-144, vol. 50, No. 1.

Robertazzi, Thomas G., "Computer Networks And Systems," 2000, pp. 275-319, Third Edition, Springer, New York.

Telatar, I. Emre et al., "Combining Queueing Theory With Information Theory For Multiaccess," IEEE Transactions On Information Theory, Aug. 1995, pp. 963-969, vol. 13, No. 6.

Tse, David N. C. et al., "Multiaccess Fading Channels—Part I: Polymatroid Structure, Optimal Resource Allocation And Throughput Capacities," IEEE Transactions On Information Theory, Nov. 1998, pp. 2796-2815, vol. 44, No. 7.

Tuninetti, Daniela, et al., "The Throughput Of Some Wireless Multiaccess Systems," IEEE Transactions On Information Theory, Oct. 2002, pp. 2773-2785, vol. 48, No. 10.

Uysal-Biyikoglu, Elif et al., "Adaptive Transmission Of Variable-Rate Data Over A Fading Channel For Energy-Efficiency," IEEE Global Communication Conference (GLOBECOM), 2002, pp. 97-101, Taipei, Taiwan.

Uysal-Biyikoglu, Elif et al., "On Adaptive Transmission For Energy Efficiency In Wireless Data Networks," IEEE Transactions On Information Theory, Dec. 2004, pp. 3081-3094, vol. 50, No. 12.

Woodard, Michael E., "Communication And Computer Networks," 1994, pp. 77-98, IEEE Computer Society Press, Los Alamitos, California.

Yoon, Won S. et al., "Transmission Of Bursty Data Over Wideband Fading Channels," IEEE International Symposium Information Theory (ISIT), Jun. 29-Jul. 4, 2003, p. 66, Yokohama, Japan.

Yoon, Won S. et al., "Delay-Optimal Power Control For Wireless Data Users With Average Power Constraints," IEEE International Symposium Imformation Theory (ISIT) Jun. 30-Jul. 5, 2002, p. 53, Lausanne, Switzerland.

* cited by examiner ations channel, and further configured to provide a transmit signal to the communications channel using said data rate.

THROUGHPUT MAXIMIZATION IN WIRELESS COMMUNICATION SYSTEMS

PRIORITY CLAIM

This application claims priority to U.S. Provisional Patent Application Ser. No. 60/152,712, filed on Oct. 20, 2003, entitled, "Throughput Maximization In A Wireless Communication System," incorporated herein by reference.

BACKGROUND

The channels encountered by many wireless communication systems often scatter the transmitted signal along its transmission path. Time variation of the channel results in random fluctuations of the received power level, or fading, making reliable communications difficult.

Transmitters typically employ channel coding techniques that map sequences of input data to codewords that add redundancy to combat the effects of fading and noise prior to transmission. Codewords consist of a number of symbols carrying data at the transmission rate, the number of information bits communicated with each symbol. The channel coherence time is the amount of time the time-varying channel is assumed constant; signals transmitted within the coherence time are affected by a single fading state. During transmission, each codeword is affected by one or more fading states with the specific number affecting the communications performance The coding delay is proportional to the codeword length and is often quantified in terms of the number of fading states affecting each codeword; it significantly affects a system's reliable communications performance. A system is considered delay unconstrained if it uses infinite-length codewords resulting in infinite coding delays Practical communication systems are delay-limited; they use finite-length codewords and therefore have a finite coding delay.

Conventional analysis of fading channels has been performed from the single-attempt paradigm. That is, the amount of information that can be reliably communicated with a single codeword transmission attempt has been quantified. This approach works well for idealized, delay-unconstrained systems that transmit a single, infinite-length codeword. However, practical systems are delay-limited since they use finite-length codewords. Therefore, the conventional performance metrics based on the single-attempt paradigm have drawbacks for delay-limited systems: $\epsilon$-capacity—the highest transmission rate that can be supported with a probability of data loss no greater than $\epsilon$—does not provide a measure of error-free performance, while single-attempt delay-limited capacity—$\epsilon$-capacity when data loss cannot be tolerated; that is, when $\epsilon=0$—underestimates achievable performance.

SUMMARY

The problems noted above are solved in large part by a technique for through-put analysis and maximization in wireless communication systems One illustrative embodiment may be a a communication method comprising characterizing a communications channel, determining a data rate that maximizes channel throughput, and configuring a transmitter to send a transmit signal with said data rate.

Another embodiment may comprise a transceiver that comprises a receiver configured to receive information characterizing a communications channel, and a transmitter configured to process said information to determine a data rate that maximizes a throughput for the communications chan- Yet another embodiment may be a wireless communications system that comprises a remote transceiver configured to send information characterizing a communications channel, and a local transceiver configured to receive said information and to process said information to determine a data rate that maximizes a throughput for the communications channel, and further configured to transmit data to the remote transceiver using said data rate.

BRIEF DESCRIPTION OF THE DRAWINGS

For a detailed description of illustrative embodiments of the invention, reference will now be made to the accompanying drawings in which:

FIG. 2O shows a graph of throughput vs. rate for various quantities of transmission attempts;

Notation and Nomenclature

Figure 1A:
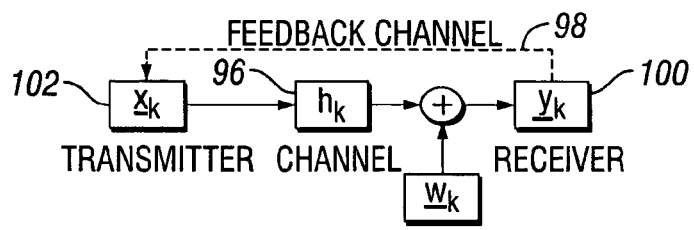
FIG. 1A shows a wireless communication system with a feedback channel.

Let Z, $\underline{Z}$, and $\mathbf{Z}$ represent a scalar, vector, and matrix, respectively Then diag($\underline{Z}$)=Z is a diagonal matrix with diagonal elements $\underline{Z}$, and $I^L$=diag(1, 1, . . . , 1) is the L×L identity matrix. Let E[g(z)] represent the expected value of g(z). Let $f(\alpha)$ and $F(\alpha)$ represent the probability density function (PDF) and cumulative distribution function (CDF) of the random vector $\underline{\alpha}$, respectively. Let R and $R_+$ represent the real line and the positive real line. Then $R^L$ and $R^{L \times M}$ are the set of length-L vectors and L×M matrices with elements in R, respectively. Similarly, $R_+^L$ and $R_+^{L \times M}$ are the set of length-L vectors and L×M matrices with elements in $R_+$, respectively. For {a,b}∈R, let $I_F$(a,b) be the indicator function, which is 1 if a>b and 0 if a<b. Let w~N(m, V) represent a jointly Gaussian random vector with mean m and covariance matrix V. Similarly let x~$\chi_a^2$ with a=1, 2, 3, . . . represent a chi-squared random variable with a degrees of freedom. Finally let $\mathcal{W}$(b) be Lambert's W function, the solution to $xe^z$=b.

DETAILED DESCRIPTION

Described below is an analysis framework for delay-limited systems based on the multi-attempt paradigm. Average communications throughput is maximized by optimizing system parameters and using the maximum throughput as a measure of delay-limited communication performance. Discussed below awe two common scenarios, the first being only when the receive has channel state information (CSI-R), while in the second both transmitter and receiver have information pertaining to the channel (CSI-RT). With CSI-R, the average transmit power is held constant and throughput is maximized by performing optimal transmission rate selection. With CSI-RT, the transmitter knows the condition of the channel at the time of transmission and can vary the power accordingly. The analysis described below is performed for an average power constraint on the transmitted signal. Also considered is the scenario if an additional peak power constraint on the transmitted signal is added. Therefore, throughput is maximized by performing optimal rate selection and power control. As a prerequisite for throughput maximization, the outage minimization problem is solved for signals with both peak and average power constraints.

Maximum ε-throughput (MεT) and maximum zero-outage throughput are shown to be measures of best-case communications performance when there is, and is not, a restriction on the maximum number of transmission attempts per codeword, respectively. A greater throughput is achieved with the multi-attempt approach than the single-attempt approach. The increased throughput comes at the cost of queueing delays that are not present when transmitters are limited to a single transmission attempt. Therefore, also discussed is the situation in which throughput is maximized with a constraint on the queueing delay.

Historically, communication systems have been examined and designed using a layered approach. The Open System Interconnection (OSI) model separates communications systems into seven layers, including the physical, data-link, network, and upper layers. The physical layer deals with the transmission of unstructured data across the physical medium, while the data-link layer is responsible for creating a reliable data pipe between transmitter and receiver. This separation works well for analyzing idealized communication systems; however, in practical systems there can be significant coupling between layers This suggests that cross-layer optimization, rather than optimizing each layer independently, should be performed to maximize the performance of practical communication systems.

The field of information theory has concerned itself primarily with understanding the performance of the physical layer. Information theoretic measures traditionally characterize the amount of information that can be transmitted reliably with a single transmission attempt for any codeword Single-attempt measures, for delay-limited and delay-unconstrained systems, are motivated by the fact that the upper layers will ensure reliable delivery of the data if there are errors in the physical link. For delay-unconstrained systems the communications performance is quantified by the ergodic capacity, the ultimate reliable data rate over a fading channel. The concept of outage has been introduced for delay-limited systems If the transmission rate exceeds what the channel condition will reliably allow then an outage occurs, resulting in a decoding error at the receiver. The outage concept leads to $\epsilon$-capacity (or outage capacity) and delay-limited capacity as measures of delay-limited communication performance. $\epsilon$-capacity is the highest transmission rate that can be supported with outage probability no greater than $\epsilon$, while delay-limited capacity is simply $\epsilon$-capacity when outages cannot be tolerated; that is, when $\epsilon=0$.

Multi-Attempt Communication Paradigm

The single-attempt paradigm works well, theoretically, for delay-unconstrained systems. Such systems buffer an infinite amount of data and then transmit a single infinite-length codeword. Here, error-free communications is possible as long as the transmission rate is less than the ergodic capacity of the channel. Since error-free communications is possible, data retransmission is unnecessary, making the purely physical-layer, single-attempt approach perfectly suited for delay-unconstrained systems. For delay-limited systems, the single-attempt approach makes error-free communications very difficult. Traditional communication measures for delay-limited systems reflect this: $\epsilon$-capacity does not provide a measure of error-free communications performance, while delay-limited capacity tends to underestimate communication performance.

The multi-attempt paradigm is more suitable for delay-limited systems than the single-attempt paradigm Delay-limited systems need not restrict themselves to a single transmission attempt for each codeword—multiple transmission attempts can be performed since codewords are finite length. In practical systems upper layers will often retransmit data to ensure reliable communication. For example, variants of the link-layer ARQ or transport layer TCP protocols are often used in real-world systems. There is a disconnect between how delay-limited systems are designed and used (practical, multi-attempt) and the measures (idealized, single-attempt) used to quantify their performance. Characterizing the maximum communications through-put, when multiple transmission attempts per codeword is permitted, may lead to a more accurate reflection of communications performance of delay-limited systems than the single-attempt measures used today.

For delay-limited systems, transmitters need not restrict themselves to a single transmission attempt per codeword. In fact, practical communication protocols, such as TCP or ARQ, retransmit data when errors occur. There is a disconnect in the design of delay-limited systems (multi-attempt) and the conventional measures used to quantify their performance (single-attempt) in an effort to achieve optimal throughput. The following discussion lays out a foundation for the new analysis framework disclosed herein.

In many applications, the condition of the fading channel changes on a time scale that is much slower than the communications signalling. This motivates modeling the channel as a discrete-time, block-fading, additive white Gaussian noise (BF-AWGN) channel. In this model, each "block" of N symbols corresponds to the amount of time the channel remains constant, the channel coherence time. The system in the $k^{th}$ block can be written $$y_k = x_k h_k + w_k, \quad (1)$$

with $x_k, y_k \in \mathbb{R}^N$ representing the system input and output. A Gaussian noise process $w_k \sim N(0, I^N)$ is assumed. Scattering by the environment results in reflections of the transmitted signal that add constructively or destructively with the original signal. The multipath interference due to scattering is represented by a random multiplicative gain $h_k \in \mathbb{R}$ on the transmitted signal. Below, x, y, w and h will be used to refer to the channel input, output, noise and gain when the relative position in the codeword is not important.

Figure 1B:
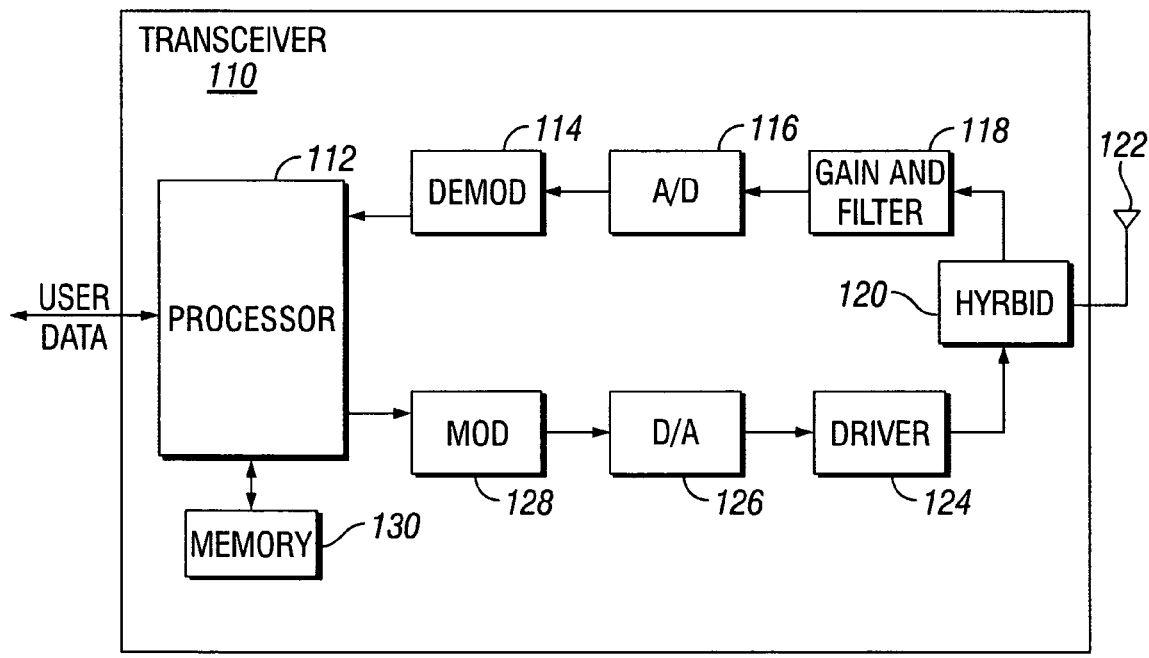
FIG. 1B shows at least some of the internal components of a transceiver that may be used as a transmission or reception device in the system of FIG. 1A.

FIG. 1A provides a block diagram of a wireless communication system model. The model contains a transmission channel 96 used to transmit data from a transmitter 102 to a receiver 100. The model also contains a delay-less, error-free feedback link 98 used to relay acknowledgements of codewords (whether they were successfully decoded or not) back to the transmitter 102. The receiver 100 and the transmitter 102 may each be a transceiver, as shown in FIG. 1B. Specifically, a transceiver 110 may comprise an antenna 122 coupled to a hybrid 120. The hybrid 120 may convert between the bi-directional data stream 132 and the unidirectional data streams 134, 136.

The hybrid 120 may be coupled to a receive chain comprising a gain and filter 118, an analog-to-digital converter 116, a demodulator 114, and a processor 112. The processor 112 may communicate with a user or some other entity that uses the transceiver 110 to transmit or receive information. The processor 112 may be coupled to a memory 130 that may be used to store data and embedded software. The processor 112 also may be coupled to a transmit chain comprising a modulator 128, a digital-to-analog converter 126 and a driver 124 that couples to the hybrid 120. A data signal received by the antenna 122 may be directed to the receive chain by the hybrid 120. After the signal is filtered and the gain is adjusted by the gain and filter 118, the signal may be converted from analog to digital form by the converter 116 and demodulated by the demodulator 114. The processor 112 then may process the demodulated signal to extract receive signal information. Conversely, processor 112 may convert user data into a transmit data stream, which is modulated by the modulator 128 and converted to analog form by the converter 126. The signal may have its gain adjusted by the driver 124, which also drives the antenna 122. After passing through the hybrid 120, the signal may be transmitted by the antenna 122.

Codewords span K blocks of the BF-AWGN channel, contain KN symbols, and correspond to a K block coding delay. Each of the KN symbols contain information encoded at the transmission rate $$R \text{ nats/sec/Hz}\left(\text{nat} := \frac{\text{bit}}{\log_e(2)}\right).$$

More specifically, R denotes spectral efficiency, but also can be used to denote transmission rate and/or encoding rate. The time-variations of the channel are assumed to be independent and identically distributed (i.i.d.) from block to block Blocks can physically correspond to slots in time, frequency, or both. The K i.i.d. channel fades affecting each codeword are $$\alpha := [(\alpha_0, \alpha_1, \ldots, \alpha_{K-1}] \qquad (2)$$

with $\alpha_k = |h_k|^2$ (or $\alpha = |h|^2$ when the relative position in the codeword generally is not of substantial importance). This model applies, for example, to wireless multicarrier modulated systems with K parallel subchannels.

It is assumed that the fading states follow a $\chi_2^2$ (chi-squared with 2 degrees of freedom) distribution with $$f(\alpha) = e^{-\alpha}, \qquad (3)$$

and $$F(\alpha) = 1 - e^{-\alpha} \qquad (4)$$

the PDF and CDF, respectively. Such a distribution results when the $|h|$ are Rayleigh distributed. This model is commonly used for wireless communication systems without line-of-sight between transmitter and receiver. Constructive interference results in a large $\alpha$ and thus a large received signal power that is conducive to communication; this situation is a "good" fade. Destructive interference results in a small $\alpha \approx 0$ and thus a small received signal power that is not conducive to communication; this situation is a "bad" fade.

A system's capacity is normally measured with an average power constraint on the input, denoted $P_{av}$. Without such a restriction the capacity of the channel may be infinite since the cardinality of the input distribution is infinite; that is, $x \in \mathbb{R}^N$. The transmitted power in the $k^{th}$ block of codeword is $$\gamma_k := \frac{1}{N} \sum_{n=0}^{N-1} |x(n)|^2. \qquad (5)$$

Random fading results in a received power of $\alpha_k \gamma_k$. Since a unit variance noise process $E[w]=1$ is assumed, $\alpha_k \gamma_k$ also equals the received signal-to-noise ratio (SNR) in the block. Additionally, since $E[\alpha]=1$, the average received SNR is also $\gamma$. The results described herein can easily be generalized to cover non-unity variance noise processes.

Two channel state information (CSI) scenarios are considered. The first is when only the receiver has perfect, delay-less and error-free, CSI (CSI-R). In this case the transmitter cannot vary the average power based on the condition of the channel since it is unknown. Therefore, performance is maximized by transmitting at the average power. That is $\gamma_k = P_{av}$, $\forall k\{0, 1, \ldots, K-1\}$.

For the second scenario when both transmitter and receiver have perfect CSI (CSI-RT), the average transmit power need not be constant; it can be varied in different blocks of the codeword based on the condition of the channel. Let $\gamma$ represent a power allocation policy, a strategy that assigns the power allocation vector $$\gamma(\alpha) := [\gamma_0(\alpha), \gamma_2(\alpha), \ldots, \gamma_{K-1}(\alpha)] \qquad (6)$$

given the channel $\alpha$. When performing power control, the transmitter must be careful not to violate the specified power constraint. A common example is the short-term average power constraint $$\langle \gamma(\alpha) \rangle := \frac{1}{K} \sum_{k=0}^{K-1} \gamma_k \leq P_{av}. \qquad (7)$$

Here the average power in any block of the codeword can exceed $P_{av}$, while the average within the entire codeword cannot. Another widely used example is the long-term average power constraint $$E_\alpha[\langle \gamma(\alpha) \rangle] \leq P_{av}. \qquad (8)$$

This is a more relaxed condition since it allows the average power for any particular codeword to exceed $P_{av}$ as long as the average long-term power across all codewords does not.

In practical communication systems there is often a peak power constraint on the channel input in addition to the average power constraint. Non-linearities in power amplifiers force transmitters to limit the peak power to avoid distortion of the transmitted signal. Similarly, peak power may be limited to comply with communication standards that limit the interference to other communication systems. The peak power constraint is defined as $$\gamma_k \leq P_p, \forall k \in \{0, 1, \ldots, K-1\} \qquad (9)$$

which limits the maximum average power that can be allocated in any block of a codeword. While not a constraint on the absolute peak, such an approach allows the constraint of the peak power of the transmitted signal while remaining in the class of capacity achieving Gaussian channel inputs. The peak-to-average power ratio (PAR) is defined as $$PAR = \frac{P_p}{P_{av}}. \qquad (10)$$

Note that $P_p = \infty$ corresponds to no peak power constraint on the channel input.

The constraints defined above are denoted as:

$$O_K^{st}(P_{av}) = \{\gamma : \langle \gamma(\alpha) \rangle \leq P_{av}\} \qquad (11)$$

$$O_K^{lt}(P_{av}) = \{\gamma : E_\alpha[\langle \gamma(\alpha) \rangle] \leq P_{av}\} \qquad (12)$$

$$O_K^{st}(P_{av}, P_p) = \{\gamma : \langle \gamma(\alpha) \rangle \leq P_{av}, \gamma_k \leq P_p \ \forall k=0, 1, \ldots, K-1\} \qquad (13)$$

$$O_K^{lt}(P_{av}, P_p) = \{\gamma : E_\alpha[\langle \gamma(\alpha) \rangle] \leq P_{av}, \ \gamma_k \leq P_p \ \forall k=0, 1, \ldots, K-1\} \qquad (14)$$

or in words, as the set of all K-block power allocation policies that satisfy the short-term average (11), long-term average (12), short-term average and peak (13), and long-term average and peak (14) power constraints.

The instantaneous capacity (spectral efficiency), the highest reliable data rate for a codeword, is found by maximizing the mutual information over a frame of K i.i.d. channel fades, $\alpha$. Assuming a Gaussian noise process and with CSI-R, and a constant average transmit power of $P_{av}$, the instantaneous capacity is given by $$C_K(\alpha, P_{av}) := \frac{1}{K} \sum_{k=0}^{K-1} \log(1 + \alpha_k P_{av}). \qquad (15)$$

With CSI-RT and for power allocation vector $\gamma(\alpha)$, is it given by $$C_K^{pc}(\alpha, \gamma(\alpha)) := \frac{1}{K}\sum_{k=0}^{K-1} \log(1 + \alpha_k \gamma_k(\alpha)). \tag{16}$$

In both cases it is achieved using random coding at the transmitter, with the elements of $x_k$ drawn from a Gaussian codebook~$N(0, 1)$. Prior to transmission, each of the K blocks in the codeword is scaled by $\sqrt{P_{av}}$ (CSI-R) or $\sqrt{\gamma_k(\alpha)}$ (CSI-RT), respectively. Maximum a posteriori (MAP) detection is used at the receiver. Instantaneous capacity is an asymptotic quantity that is achieved as $N \to \infty$.

Communication performance measures based on the instantaneous capacity depend on the coding delay K. The delay unconstrained (K=$\infty$) and delay-limited (K<$\infty$) cases are discussed below.

Delay Unconstrained Systems (K=$\infty$)

If the sequence of fading states $\alpha_k$ for $k \in \{0, 1, \ldots, K-1\}$ is asymptotically ergodic as $K \to \infty$, then the channels indexed by the block length N form a family that have the same capacity. This quantity is known as ergodic capacity and with CSI-R is given by $$C_{erg} = \lim_{K \to \infty} C_K(\alpha, p_{av}) = \mathbb{E}_\alpha[\log(1 + \alpha P_{av})], \tag{17}$$

for an average power constraint on the channel input. The expectation is performed with respect to the distribution of the channel fading process $f(\alpha)$. It is found by talking $K \to \infty$ in (15).

With CSI-RT ergodic capacity is given by $$C_{erg-pc}(P_{av}) := \sup_{\gamma \in O_\infty^{\#1}} \mathbb{E}_\alpha[\log(1 + \alpha\gamma)]. \tag{18}$$

for an average power constraint $P_{av}$ on the channel input. Again the expectation is performed with respect to $f(\alpha)$. It is found by taking $K \to \infty$ in (16) and selecting the optimal power allocation strategy that satisfies the average power constraint. The capacity achieving power allocation strategy $$\gamma^C(\alpha) = \left[\frac{1}{\lambda^C} - \frac{1}{\alpha}\right]_+ \tag{19}$$

assigns power $\gamma^C(\alpha)$ to any block affected by fading state $\alpha$. Here, $\lambda^C$ chosen such that the power constraint is satisfied, $$\int_{\lambda^C}^\infty \left(\frac{1}{\lambda^C} - \frac{1}{\alpha}\right) dF(\alpha) = P_{av}. \tag{20}$$

For the model in which $\alpha \sim \chi_2^2$, ergodic capacitor can be written $$C_{erg} = e^{-P_{av}} \int_{\frac{1}{P_{av}}}^\infty \frac{e^{-t}}{t} dt \tag{21}$$

with CSI-R and as $$C_{erg-pc} = \int_{\lambda^C}^\infty \frac{e^{-t}}{t} dt \tag{22}$$

with CSI-RT, with $\lambda^C$ as the solution to $$\frac{e^{-\lambda^C}}{\lambda^C} - \int_{\lambda^C}^\infty \frac{e^{-t}}{t} dt = P_{av}. \tag{23}$$

For both CSI scenarios codewords are drawn from an infinite-length codebook with i.i.d. symbols~$N(0, 1)$. Prior to transmission, the N symbols in each block ale scaled by either $\sqrt{P_{av}}$ (CSI-R) or $\sqrt{\gamma^C(\alpha)}$ (CSI-RT). Since codewords are affected by infinitely many fading states, the effect of the fading channel can be "averaged out" and reliable transmission at ergodic capacity is possible Contrary to what (17) and (18) seem to suggest, ergodic capacity is not actually an average capacity, but rather the highest rate that can be sustained on all channel states with arbitrarily small probability of error.

Figure 1C:
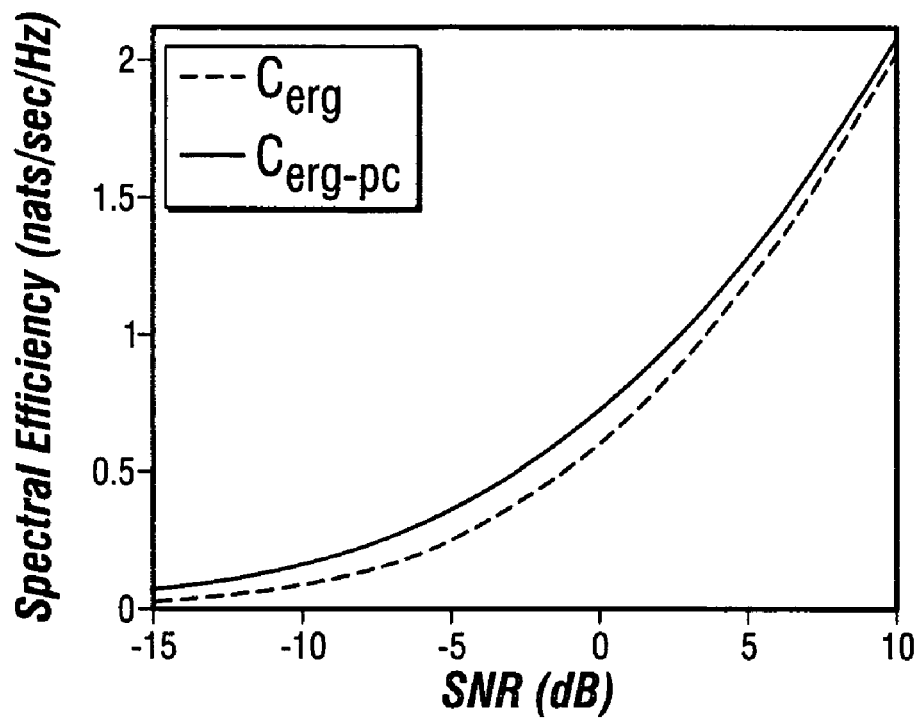
FIG. 1C shows a graph of ergodic capacity, with and without power control, as a function of signal-to-noise ratio (SNR)

FIG. 1C compares ergodic capacity, $C_{erg-pc}$, with power control (18) to ergodic capacity for constant power allocation, $C_{erg}$, as a function of the average power $P_{av}$ for $\chi_2^2$ fading. For small transmit powers, the capacity with power control is larger than capacity with constant power For larger transmit powers, the difference between variable and constant power transmission shrinks, leading to the accepted wisdom that power control yields negligible capacity gains over constant power transmission. This shrinking difference occurs because the power allocated for each fading state (19) differs very little when $P_{av}$ is large.

Delay Constrained Systems (K<$\infty$)

For finite K<$\infty$, the sequence of fading states $\alpha_k$ for $k \in \{0, 1, \ldots, K-1\}$ cannot be considered asymptotically ergodic. As such the instantaneous capacity becomes a random quantity When the channel condition is good, a number of the K channel fades affecting a codeword are good and a large amount of information can be transmitted per codeword-Conversely, when the channel condition is bad only a small amount of information can be reliably transmitted. An outage is declared if the transmission rate is larger than the instantaneous capacity, $R > C_K(\alpha, P_{av})$ (CSI-R) or $R > C_K(\alpha, \gamma(\alpha))$ (CSI-RT). For large N the outage probability closely approximates the codeword error probability.

Since the instantaneous capacity is a random quantity, outages can occur no matter how small or how large the transmission rate. The outage probability, the likelihood of outage events, is given by $$P_{out}(R, \mathcal{P}_{av}, K) := Prob[R > C_K(\underline{\alpha}, \mathcal{P}_{av})] \tag{24}$$

$$= \mathbb{E}_{\underline{\alpha}}[I_F(R, C_K(\underline{\alpha}, \mathcal{P}_{av}))],$$

with CSI-R and by $$P_{out}(R, \gamma, K) := Prob[R > C_K^{pc}(\underline{\alpha}, \gamma(\alpha))] \quad (25)$$
$$= \mathbb{E}_{\underline{\alpha}}[I_F(R, C_K^{pc}(\underline{\alpha}, \gamma(\alpha)))],$$

with CSI-RT. That is, for any transmission rate R and power allocation policy (including constant power transmission) there is an associated outage probability $P_{out}(R, P_{av}, K)$ (CSI-R) or $P_{out}(R, \gamma, K)$ (CSI-RT). Using this, $\epsilon$-capacity is defined as $$C_c(P_{av}, K) := \sup_R \{R : P_{out}(R, P_{av}, K) \le \epsilon\}, \quad (26)$$

with CSI-R and by $$C_c^{pc}(P_{av}, K) := \sup_R \{R : P_{out}(R, \gamma, K) \le \epsilon : \gamma \in O_K\}. \quad (27)$$

with CSI-RT, where $O_K$ is the set of all valid power allocation strategies over which the optimization is performed and can represent either $O_K^{st}(P_{av})$, $O_K^{st}(P_{av}, P_p)$, $O_K^{lt}(P_{av})$, or $O_P^{lt}(P_{av}, P_p)$. $\epsilon$-capacity represents the highest rate that can be supported with outage probability less than $\epsilon$ and may be used to quantify the communications performance of delay-limited communications systems in fading channels.

The need for a measure of error-free performance leads to the notion of delay-limited capacity $$C_{dl}(\mathcal{P}_{av}, K) := C_c |_{\epsilon=0} \quad (28)$$
$$= \log(1 + \alpha_{min} \mathcal{P}_{av}) \quad (29)$$

with CSI-R, and by $$C_{dl}^{pc}(P_{av}, K) := C_c^{pc}|_{\epsilon=0} \quad (30)$$

with CSI-RT. When the minimum channel gain $$\alpha_{min} := \min\{\alpha\} = 0 \quad (31)$$

which is the case for many common fading distributions including $\chi_2^2$ delay-limited capacity is 0 for all $K<\infty$ with CSI-R. While for CSI-RT delay-limited capacity is 0 for K=1, however, it is possible to have non-zero delay-limited capacity for K>1.

Since the transmit power can be varied based on the condition of the channel with CSI-RT, the power allocation policy used affects performance One policy of particular importance is the one that minimizes the outage probability. This policy can also be used to maximize the transmission rate for a target outage probability; that is, it can be used to achieve $C_c^{pc}$. The outage minimization problem can be stated as $$\min_\gamma \{P_{out}(R, \gamma, K) : \gamma \in O_K\}. \quad (32)$$

The solution to (32) is known as the outage minimizing power allocation strategy and has been found for $O_K = O_K^{st}(P_{av})$ and $O_K = O_K^{lt}(P_{av})$, the short-term and long-term average power constraints. Overviewed below are the solutions for these cases.

Under the short-term average power constraint $O_K = O_K^{st}(P_{av})$ in (32) and the outage minimizing power allocation policy is $$\gamma_k^{st}(\underline{\alpha}) = \left[\lambda^{st}(\underline{\alpha}) - \frac{1}{\alpha_k}\right]_+, \quad (33)$$

with $$\lambda^{st}(\underline{\alpha}) = \frac{1}{\mu} \sum_{l=0}^{\mu(\alpha)-1} \frac{1}{\alpha_{(l)}} + \frac{K}{\mu(\underline{\alpha})} \mathcal{P}_{av} \quad (34)$$

for $\mu(\alpha) \in \{1, 2, \ldots, K\}$ and $\alpha_{(0)} \ge \alpha_{(1)} \ge \ldots \ge \alpha_{(K-1)}$ an ordered permutation of the fading states affecting the codeword.

Under the long-term average power constraint $O_K = O_K^{lt}(P_{av})$ in (32), and the outage minimizing power allocation policy takes the form $$\gamma^{lt}(\underline{\alpha}) = \begin{cases} \hat{\gamma}(\underline{\alpha}), & w/\ prob\ 1 & if\ \underline{\alpha} \in R_1(s_1^*) \\ \hat{\gamma}(\underline{\alpha}), & w/\ prob\ w^* & if\ \underline{\alpha} \in \overline{R}_1(s_1^*) - R_1(s^*) \\ 0, & w/\ prob\ (1-w^*) & if\ \underline{\alpha} \in \overline{R}_1(s_1^*) - R_1(s_1^*) \\ 0, & w/\ prob\ 1 & if\ \underline{\alpha} \notin R_1(s_1^*) \cup \overline{R}_1(s_1^*) \end{cases} \quad (35)$$

where $$R_1(s) = \{\alpha : \langle \hat{\gamma}(\alpha) \rangle < s\} \quad (36)$$
$$\overline{R}_1(s) = \{\alpha : \langle \hat{\gamma}(\alpha) \rangle \le s\} \quad (37)$$
$$\overline{R}_1(s) - R_1(s) = \{\alpha : \langle \hat{\gamma}(\alpha) \rangle = s\} \quad (38)$$

represent sets of fading states differentiated by the amount power allocated for each fading state. Then $$P_1(s) = \int_{R_1(s)} \langle \tilde{\gamma}(\alpha) \rangle dF(\alpha) \quad (39)$$
$$\overline{P}_1(s) = \int_{\overline{R}_1(s)} \langle \tilde{\gamma}(\alpha) \rangle dF(\alpha) \quad (40)$$

is the average power allocated over these sets. Then $$s_1^* = \sup\{s : P_1(s) < P_{av}\} \quad (41)$$

is maximum average power allocated for any fading state and $$w_1^* = \frac{\mathcal{P}_{av} - \mathcal{P}_1(s^*)}{\overline{\mathcal{P}}_1(s^*) - \mathcal{P}_1(s^*)} \quad (42)$$

is the probability that the codeword is transmitted when this maximum is achieved. Both $s_{1*}$ and $w^*$ ensure the average transmitted power across all fading states is $P_{av}$ as desired. Finally, $$\hat{\gamma}_k(\underline{\alpha}) = \left[\lambda^{lt}(\underline{\alpha}) - \frac{1}{\alpha_k}\right]_+ \quad (43)$$

is the form of the power allocated for fading state α, with $$\lambda^{lt}(\underline{\alpha}) = \left(\frac{e^{KR}}{\prod_{l=0}^{\mu(\underline{\alpha})-1} \alpha_{(l)}}\right) \quad (44)$$

$\mu(\underline{\alpha}) \in \{1, 2, \ldots, K\}$.

Figure 1D:
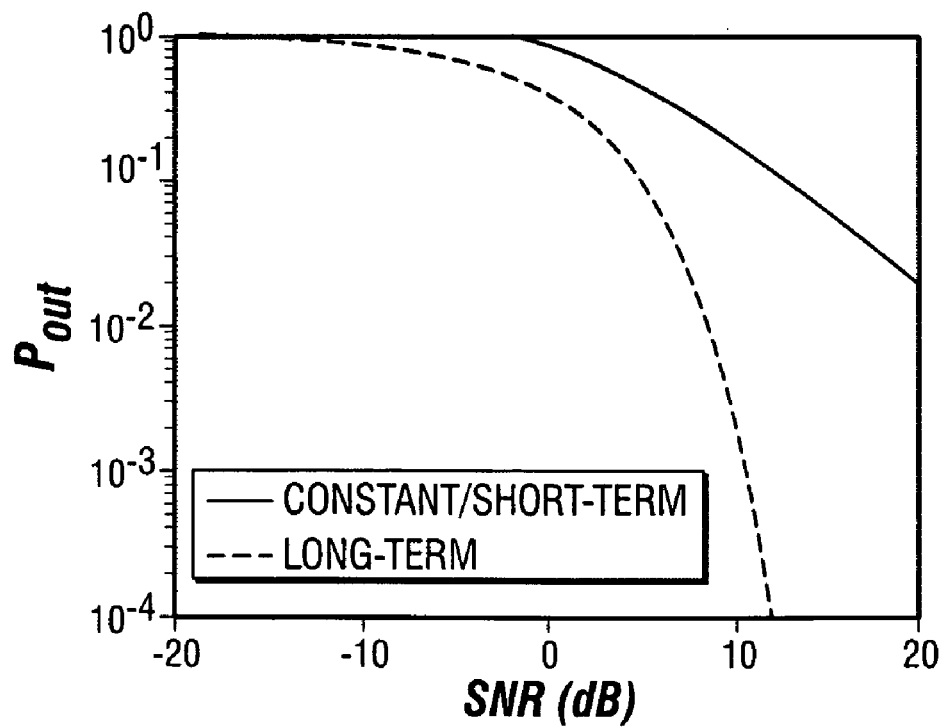
FIG. 1D shows a graph of minimum outage probability as a function of transmitted power for a transmission rate of 1 nat/sec/Hz with constant power and under long-term power constraint.

FIG. 1D plots the minimum outage probability for K=1 as a function of $P_{av}$ under constant power allocation and under the long-term average power constraint. The gain of power control is seen for a target outage probability, the average power required when performing power control is less than when using constant power transmission.

Throughput and Fading Channels

Within the single attempt paradigm, zero-outage (error-free) communications is often viewed as an all-or-nothing phenomenon. For delay-unconstrained systems it is possible to transmit reliably at rates approaching ergodic capacity, while for delay-limited systems delay-limited capacity is zero for many fading distributions of interest.

Figure 1E:
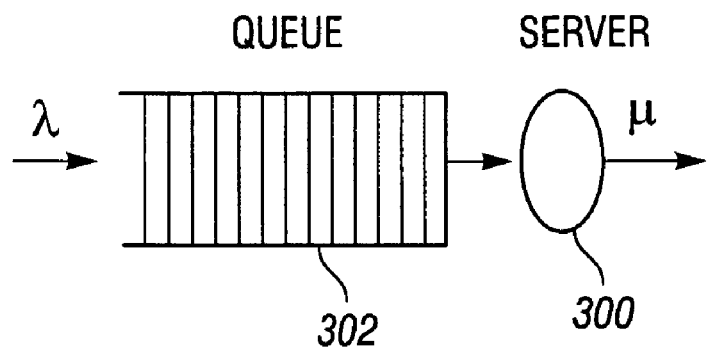
FIG. 1E shows a queueing model of a wireless communication system.

A new analysis framework for delay-limited systems in fading channels is described below. FIG. 1E shows a queue 302 receiving data at a rate λ and transferring data to a server 300 using a first-in, first-out (FIFO) methodology. By modeling the communications systems as a queue, it is possible to relate the throughput of the system with the amount of information passing through the queue 302. The server 300 in the queueing model encompasses the details of both the physical and data-link layers, shown in FIGS. 1A-1B. The server 300 takes codewords that arrive in the queue 302 and attempts transmission repeatedly until the channel condition allows successful transmission. The service time for a codeword is based on the number of transmission attempts required and can vary from system to system based on the particular retransmission scheme. Using this approach the throughput is simply the transmission rate divided by the service time—the amount of data in each codeword divided by the number of transmission attempts required for successful decoding. Maximizing the throughput through the queue is equivalent to maximizing the throughput of the delay-limited communication system As discussed above, two main CSI scenarios are considered: when only the receiver has CSI (CSI-R) and when both transmitter and receiver have CSI (CSI-RT). With CSI-R, throughput is maximized using optimal rate selection, while with CSI-RT it is maximized by optimal rate selection and power control. For both scenarios, the maximum throughput under the multi-attempt paradigm exceeds that under under the single-attempt paradigm, That is, for the same coding delay a higher throughput is possible my allowing multiple transmission attempts per codeword, rather than a single attempt.

1. Multi-Attempt Throughput Maximization

1.1 Cross-Layer Queueing Model

By maximizing the communications throughput within the multi-attempt framework, the communications throughput of the physical layer (which is responsible for selecting the transmission rate R) and data-link- layer (which is responsible for data retransmission in the face of errors) are jointly maximized. This joint optimization can be used to predict the best case performance for any retransmission scheme in fading channels.

The physical and data-link layers can be modeled jointly as a queue. In this model, codewords arrive into the queue encoded at rate R, and therefore contain RKN nats. The server takes a codeword from the queue and attempts transmission. When an outage occurs, the codeword is retransmitted until successful transmission or until a maximum number of transmission attempts is reached. The number of transmission attempts for each codeword, the service time, is a random quantity due to the random nature of the fading channel. The number of transmission attempts is used to quantify the service time, since each transmission attempt corresponds to K blocks and therefore corresponds to the channel coherence time scaled by a factor of K. The service time distribution, the probability that s attempts are required for successful transmission, depends on the nature of the retransmission scheme, the transmission rate and power, and the statistics of the fading channel In general, the probability that a codeword's service time, S, will be s attempts for successful transmission is $$Prob(S = s) = Prob\left(\bigcap_{i=1}^{n-1} out_i\right)\left[1 - Prob\left(out_s \mid \bigcap_{i=1}^{s-1} out_i\right)\right] \quad (1.1)$$
$$= Prob\left(\bigcap_{i=1}^{s-1} out_i\right) - Prob\left(\bigcap_{i=1}^{s} out_i\right),$$

which is the probability of outage events on the first s−1 attempts multiplied by the probability of successful transmission on the $s^{th}$ attempt given that it was previously in error.

The service time distribution can be used to determine the expected service time E[S] and the expected service rate $$\frac{1}{E[S]}$$

of a codeword. The average amount of data passing through the queue with each transmission attempt is $$\frac{R}{E[S]} \text{(nats/sec/Hz)},$$

the encoding rate divided by the average number of attempts for successful transmission. For example if the data transmission rate is R=10 nats/sec/Hz and takes on average E[S]=2 transmission attempts per codeword, then the average throughput is 5 nats/sec/Hz. Using this idea, the maximum throughput of the system is defined as $$T_{max}(P_{av}, K, P_p) := \sup_R \sup_\gamma \left\{\frac{R}{E[S(R, \gamma)]} : \gamma \in O_K\right\}. \quad (1.2)$$

where the supremum is taken over all transmission rates and power allocation strategies in $O_K$. Either constant power transmission, $\gamma=P_{av}$ for a system with CSI-R, or the transmitter performing power control with $O_K \in \{O_K^{st}(P_{av}), O_K^{lt}(P_{av}), O_K^{st}(P_{av}, P_p), O_k^{lt}(P_{av}, P_p)\}$ for a system with CSI-RT, may be considered. It is noted that $T_{max}(P_{av}, K, P_p)$ predicts the best case performance for a particular multi-attempt scheme, coding delay K, average power constraint $P_{av}$ and peak power constraint $P_p$. By matching the multi-attempt scheme used in the analysis to one that is used in practice, this analysis can be used to predict the best case communication performance of practical retransmission algorithms, (i.e., ARQ), in fading channels.

If the transmission rate is R, then the amount of data successfully decoded with any transmission attempt is either 0 or R, depending on whether an outage does or does not occur, respectively. The maximum average throughput is a representative measure of communications performance.

2. Throughput Maximization with Optimal Rate Selection

When only the receiver has CSI, the transmitter does not vary the transmit power level based on the condition of the channel. As such, for this scenario, the transmitter uses the average power, $\gamma_k=P_{av}$, $\forall k \{0, 1, \ldots, K-1\}$. In this case the optimization in (1.2) is over the encoding rate and $$T_{max}(P_{av}, K) := \sup_R \frac{R}{E[S(R, P_{av}, K)]}. \quad (2.1)$$

$T_{max}(P_{av}, K)$ represents the optimal balance between the amount of information in each codeword and the frequency at which codewords pass through the queueing system. As $R \to 0$, the amount of information carried per codeword shrinks and the throughput approaches 0. Similarly, as $R \to \infty$, outages become frequent and $E[S] \to \infty$, resulting in a throughput that approaches 0.

Figures 1, 2A:
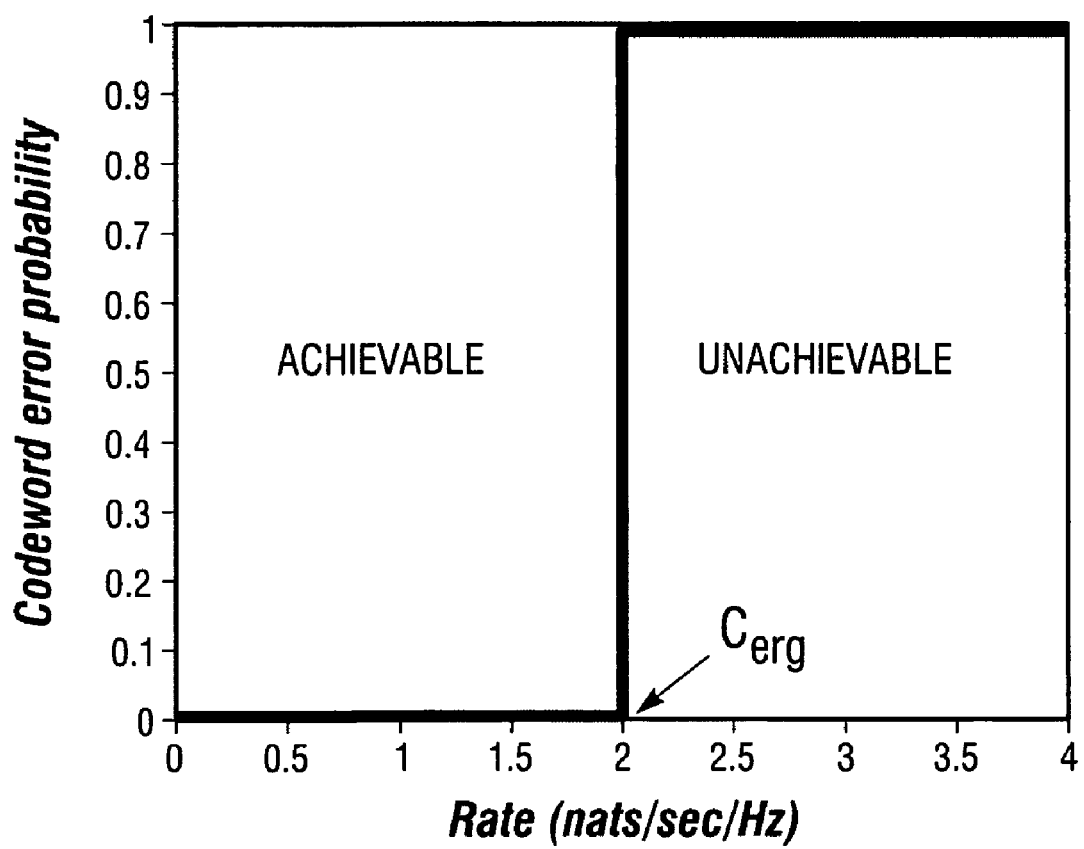
FIG. 2A shows a graph of codeword error probability vs. rate for 1) $K=\infty$ and 2) $K=1$.
Figures 2, 2A:
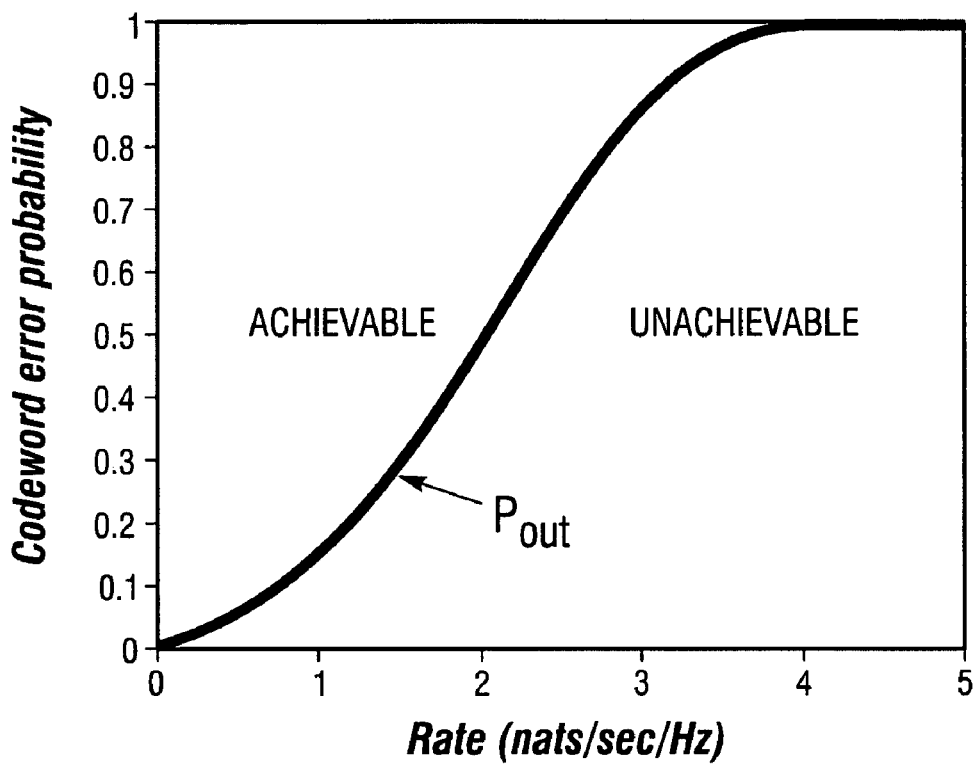
Figure 2B:
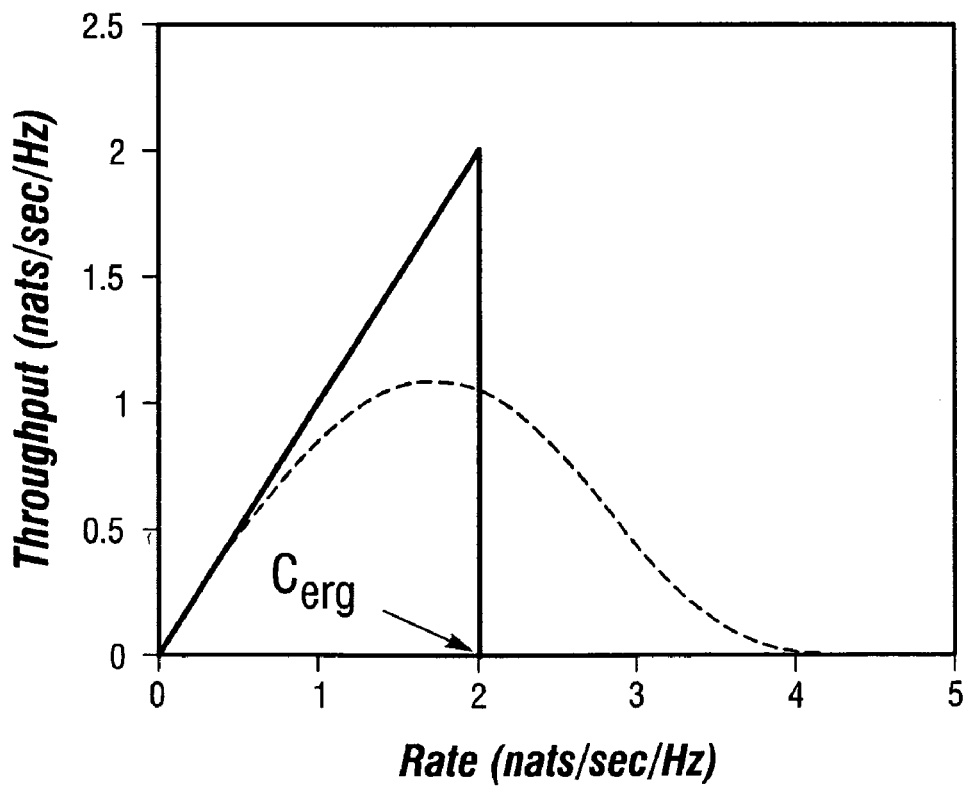
FIG. 2B shows a graph of throughput vs. transmission rate when average power is approximately 10 dB for coding delays of one and infinity.

The optimal transmission rate depends significantly on the coding delay K. FIG. 2A(1)(2) illustrates the codeword error probability when $K=\infty$ and $K=1$ (for scheme RT), respectively. The optimal operating point when $K=\infty$ is obvious, the transmit rate is set at a rate as close to ergodic capacity as possible with codeword error probability close to zero. However, for K=1 the optimal transmission rate is not immediately obvious. Examining the system from a throughput perspective in FIG. 2B, both systems are shown to have a transmission rate that maximizes throughput. For $K=\infty$, $R=C_{erg}$ is the unique throughput maximizing transmission rate For K=1, for scheme RT, there is also a unique throughput maximizing transmission rate For delay-limited systems, the optimal transmission rate depends on the particular retransmission scheme being used and its expected service time. In general, it is possible to specify conditions on the expected service time, for a particular retransmission scheme, that guarantee the existence of a unique throughput maximizing transmission rate Theorem 2.0.1. If $$\frac{1}{E[S(R)]}$$

is a log-concave function of R, then (1.2) has a unique global maximum.

Proof. Let $$T(R) = \frac{R}{E[S(R)]};$$

then $f(R) = \log T(R) = \log R + \log \frac{1}{E[S(R)]}$. If $\log \frac{1}{E[S(R)]}$ is a concave function then $f(R)$ is also concave, since log R is concave and the sum of two concave functions is also concave. Then from convex optimization theory, $f(R)$ has a unique maximizer on the convex set $R_+$. Let $R^*$ be the argument that maximizes $f(R)$. If $f(R)$ is composed with the monotonically increasing function $e^z$, then $e^{f(R)}=T(R)$ has the same maximizer $R^*$. Hence (1.2) has a unique maximum. □

This is a sufficient, but not necessary, condition for the existence of a unique solution. It is possible for $$T(R) = \frac{R}{E[S]}$$

to be log-concave without $$\frac{1}{E[S]}$$

being log-concave. This scenario would also have a unique maximizer for the throughput. The uniqueness of the optimal transmission rate is of practical importance. Often (1.2) cannot be solved explicitly and numerical techniques must be used. Fortunately, if $$\frac{1}{E[S]}$$

is log-concave, any numerical solution to (1.2) is globally optimal.

Since only the receiver has CSI, the transmitter has no way of knowing an outage has occurred unless it receives feedback from the receiver which can be relayed to the transmitter in the form of retransmission requests. For both schemes a single bit of feedback is required for each codeword to relay (un)successful decoding acknowledgements back to the transmitter. The amount of feedback per block is $$\frac{1}{K} \text{bits,}$$

which approaches to 0 as the coding delay increases $K \to \infty$.

When the transmitter is allowed to retransmit each codeword as many times as necessary, then zero-outage, or error-free, communications is possible. The maximum throughput is termed maximum zero-outage throughput (MZT). The name is appropriate as it quantifies the maximum error-free throughput of a communications system for a particular retransmission scheme.

2.1 Maximum zero-outage throughput with scheme RT ($MZT_{RT}$)

2.1.1 Mathematical Formulation

For scheme RT all transmission attempts have the same probability of success or failure, and (1.1) becomes $$Prob(S=s) = [P_{out}(R, P_{av}, K)]^{s-1}[1 - P_{out}(R, P_{av}, K)] \quad (2.2)$$

The service time distribution becomes geometric on the positive integers with parameter $[1-P_{out}(R, P_{av}, K)]$ and having the well-known mean $$\mathbb{E}[S] = \frac{1}{1 - P_{out}(R, P_{av}, K)}. \quad (2.3)$$

Using (1.2), maximum zero-outage throughput for scheme RT is defined as $$MZT_{RT}(P_{av}, K) = \sup_R R[1 - P_{out}(R, P_{av}, K)]. \quad [2.4]$$

When the channel fading is good a rate R is achieved; when the channel fading is bad rate 0 is achieved due to outage. By optimizing over the transmission rate, the maximum average throughput across all channel fading states is $MZT_{RT}(P_{av}, K)$.

Note that (2.4) is simply the transmission rate R multiplied by the success probability $[1-P_{out}(R, P_{av}, K)]$ and that this same throughput can be achieved without any feedback to the transmitter. This occurs because the feedback only ensures that codewords in error are retransmitted and is not used to improve the throughput. Without such feedback, codewords in error are discarded by the receiver, and the transmitter sends a new codeword with the next transmission attempt. $MZT_{RT}$ can also be thought of as selecting the best rate and outage probability pair (R, $\epsilon$) based on the statistics of the channel that maximizes the throughput. Typically, communications performance in fading channels is measured with $\epsilon$-capacity, the highest rate for a given outage probability $\epsilon$ and a small value of $\epsilon$ is normally chosen such as $\epsilon$=0.01. However, fixing $\epsilon$ may yield a low throughput. $MZT_{RT}$ finds the best (R, $\epsilon$) pair that maximizes the communications throughput.

2.1.2 Uniqueness of $MZT_{RT}$

In general, (2.4) does not have a closed form due to the difficulty of obtaining exact expressions for the outage probability for common fading distributions. However, it is possible use properties of the fading distribution to show that a unique global maximizer exists.

Theorem 2.1.1. If the probability density $f_C(R)$ of the instantaneous capacity over a single block, $C=\log(1+\alpha P_{av})$, is log-concave, then there is a unique transmission rate that achieves $MZT_{RT}(P_{av}, K)$.

Proof. The instantaneous capacity over a codeword spanning K blocks is $$C_K = \frac{C_{(1)} + C_{(2)} + \ldots + C_{(K)}}{K}, \quad (2.5)$$

where $C_{(k)}$ is the instantaneous capacity in the $k^{th}$ block having distribution $\alpha_C(R)$. The outage probability $P_{out}(R, P_{av}, K)=Prob(C_K<R)$ is the CDF of the random variable $C_K$ evaluated at R. The PDF of $C_K$ is then $$f_{C_K}(R) = \frac{f_C(R) * f_C(R) * \ldots * f_C(R)}{K} \quad (2.6)$$

where * is convolution. Since $f_C(R)$ is log-concave, (2.6) is also log-concave since the convolution of log-concave functions is also log-concave. Then both $$P_{out}(R, P_{av}, 1) = \int_0^R f_{C_K}(x) dx \quad (2.7)$$

and $$(1 - P_{out}(R, P_{av}, 1)) = \int_R^\infty f_{C_K}(x) dx \quad (2.8)$$

are log-concave. Since $$\frac{1}{\mathbb{E}[S]} = [1 - P_{out}(R, P_{av}, 1)]$$

is log-concave, by Theorem 2.0.1 there is a unique transmission rate corresponding to $MZT_{RT}(P_{av}, K)$. □

This result is general and holds for any fading distribution corresponding to a log-concave instantaneous capacity over a single block.

Proposition 2.1.2. If the channel fading $\alpha$ follows a $\Phi_2^2$ distribution, then the PDF of the instantaneous capacity $f_C(R)$ is log-concave.

Proof. If the fading process follows a $\chi_2^2$ distribution, then $$P_{out}(R, P_{av}, 1) = Prob[R > \log(1 + \alpha P_{av})] \quad (2.9)$$

$$= Prob\left[\left(\frac{e^R - 1}{P_{av}}\right) > \alpha\right].$$

The CDF of a $\chi_2^2$ random variable is $F(x)=1-e^{-x}$ and therefore $$F_C(R) = P_{out}(R, P_{av}, 1) \quad (2.10)$$

$$= 1 - e^{-\left(\frac{e^R - 1}{P_{av}}\right)}.$$

Then the PDF and its derivatives are given by $$f_C(R) = \frac{e^R}{P_{av}} e^{-\left(\frac{e^R - 1}{P_{av}}\right)}, \quad (2.11)$$

$$f'_C(R) = \frac{e^R}{P_{av}^2} e^{-\left(\frac{e^R - 1}{P_{av}}\right)} (P_{av} - e^R), \quad (2.12)$$

-continued $$f_C''(R) = \frac{e^R}{P_{av}^3}e^{-\left(\frac{e^R-1}{P_{av}}\right)}(P_{av}^2 - 3e^R + e^{2R}). \quad (2.13)$$

After some algebraic manipulations it can be shown that $$f_C(R)f_C''(R) \leq [f_C'(R)]^2, \quad (2.14)$$

which is a necessary and sufficient condition for log-concavity. □

Proposition 2.1.2 implies that with $\chi_2^2$ fading, there is a unique transmission rate that maximizes the communications throughput. However, explicit expressions for the transmission rate and the maximum throughput have been elusive. Examining (2.7), determining the outage probability involves integrating (2.6). However, a closed form expression for (2.6), let alone (2.7), may not exist since it is the convolution of one or more complicated functions. Nonetheless, when K=1, (2.4) admits a semi-explicit solution.

Theorem 2.1.3. If K=1 and the channel fading α follows a $\chi_2^2$ distribution then $$MZT_{RT}(P_{av}, 1) = W(P_{av})e^{-\left(\frac{e^{W(P_{av})}-1}{P_{av}}\right)}. \quad (2.15)$$

Proof. If α is a $\chi_2^2$ random variable, then $$P_{out}(R, P_{av}, 1) = 1 - e^{-\left(\frac{e^R-1}{P_{av}}\right)}$$

Using this, let $$T(R) = Re^{-\left(\frac{e^R-1}{P_{av}}\right)}.$$

Taking the derivative with respect to R and equating with zero, the transmission rate corresponding to the critical point is the solution to $Re^R = P_{av}$. The solution to this is the optimal transmission rate $R^* = W(P_{av})$. This rate corresponds to a throughput maximum (rather than a minimum) from Theorem 2.1.1. Substituting this back into T(R), (2.15) is obtained. □

2.1.3 Properties of $MZT_{RT}$

The performance of many communication systems is often maximized with respect to a fixed outage probability. Normally, system designers select the highest transmission rate that supports a predetermined outage probability (or in practice, packet error rate). However, a greater communications throughput is possible if the constraint of a target outage probability is removed.

Theorem 2.1.4. $MZT_{RT}$ is always greater than or equal to the throughput achieved by transmitting at ε-capacity.

Proof For a fixed outage probability ε, ε-capacity is given by $$C_c := \sup_R\{R : P_{out}(R, P_{av}, K) \leq \epsilon\}. \quad (2.16)$$

Every transmission rate $R=C_c$ corresponds to an outage probability ε. This results in $$T_c = C_c(1-\epsilon) \quad (2.17)$$

as the throughput for outage probability ε. Therefore (4.5) is a single point on the curve $$T_{RT}(R) = R[1 - P_{out}(R, P_{av}, K)], \quad (2.18)$$

with $P_{out}(R, P_{av}, K)$ the outage probability achievable for transmission rate R and coding delay K. Since $$MZT_{RT} = \sup_R\{T_{RT}(R)\}. \quad (2.19)$$

then $$MZT_{RT} \geq T_c. \quad (2.20)$$

□

With the single-attempt approach, zero-outage communications must be guaranteed with a single transmission attempt (i.e., ε=0 in the above analysis) When 0 is in the support of the fading process, as is the case for $\chi_2^2$ fading, $T_c\mid_{\epsilon=0}=C_{dl}=0$ is the highest single-attempt throughput. However, with the multi-attempt approach, ε is not necessarily 0, since codeword retransmission is permitted. Therefore with 0 in the support of the fading process, it is possible to have $MZT_{RT}>0$ This illustrates the power of the multi-attempt approach; zero-outage communications can be possible with the multi-attempt approach when it is not possible with the single-attempt approach.

It is a known phenomenon that the outage probability approximates the code-word error probability when N is large. Since zero-outage communication is possible with K=∞, this suggests that the outage probability converges asymptotically to $I_F(R, C_{erg})$ as K→∞.

Theorem 2.1.5. The outage probability $P_{out}(R, P_{av}, K)$ converges to the indicator function $I_F(R, C_{erg})$ as K→∞.

Proof. It is possible to bound (24) using Chebyshev's inequality for $R<C_{erg}$ by $$0 \leq P_{out}(R, P_{av}, K) \leq \frac{\beta}{K} \quad (2.21)$$

and for $R>C_{erg}$ by $$1 \geq P_{out}(R, P_{av}, K) \geq 1 - \frac{\beta}{K} \quad (2.22)$$

In both cases β is a constant. Taking K→∞ produces $$P_{out}(R, P_{av}, K) = I_F(R, C_{erg}). \quad (2.23)$$

□

Intuitively as K grows, codewords become more immune to the effects of the fading channel; blocks in the codeword that experience a good channel fade can compensate for blocks that suffer from a bad fade.

Theorem 2.1.6. $MZT_{RT}(P_{av}, K)$ converges to ergodic capacity as $K \to \infty$.

Proof. Taking $K \to \infty$ and using (2.23), produces $$MZT_{RT}(P_{av}, \infty) = \sup_R R[1 - I_F(R, C_{erg})] = C_{erg}. \qquad (2.24)$$

The maximization is trivial since $P_{out}(R, P_{av}, K)$ takes only two values: 0 or 1. $MZT_{RT}(P_{av}, K)$ does converge to $C_{erg}$ as $K \to \infty$, and thus the optimal transmission rate $R_{MZT_{RT}}^* = MZT_{RT}(P_{av}, \infty) = C_{erg}$. □

Then $K = \infty$, ergodic capacity is viewed as a hard-limit on the transmission rate. From the ergodic capacity theorem, if the transmission rate is less than ergodic capacity then the codeword error probability can almost always be driven to 0. On the other hand, if the transmission rate is larger than ergodic capacity, then codeword errors almost ways occur. Thus only transmission rates below ergodic capacity result in non-zero throughput.

However, when $K < \infty$ the situation is different The outage probability approaches 1 only as $R \to \infty$ and for any finite transmission rate other than $R = 0$ it is possible to transmit data successfully. More specifically, when $K < \infty$ any finite transmission rate other than $R = 0$ results in non-zero throughput. That is, the notion of capacity as a hard-limit on the transmission rate is "softened." This is due to the fact that multiple transmission attempts per codeword is permitted and there is no need to guarantee successful transmission with a single attempt. Note that using a transmission rate above ergodic capacity does not contradict any information theoretic notions since the resulting throughput is always below ergodic capacity.

Theorem 2.1.7. Non-zero throughput is achievable for transmission rates $R > C_{erg}$ when $K < \infty$.

Proof. Let $R = C_{erg} + \epsilon$. By Theorem 2.1.5 it is seen that $P_{out}(C_{erg} + \epsilon, P_{av}, K) < 1$ for $K < \infty$. Using this inequality in (2.4), it is seen that the throughput $R[1 - P_{out}(C_{erg} + \epsilon, P_{av}, K)] > 0$. □

The intuition behind this phenomenon is that for finite $K < \infty$ the instantaneous capacity (15) is a random quantity. For fading distributions that have support on $R_+$, this means that no matter how high the transmission rate there is non-zero probability that the channel state is good enough to support it. Hence non-zero throughput is possible for $R > C_{erg}$ if $K < \infty$, In the limit when $K \to \infty$, the instantaneous capacity becomes a constant—the erogdic capacity—and it is virtually impossible for the channel to support $R > C_{erg}$.

2.1.4 Simulation results

Now, the properties of $MZT_{RT}$ are empirically verified via Monte Carlo simulation. For the purposes of these simulations it is assumed that the channel fading follows a $\chi_2^2$ distribution.

Figure 2C:
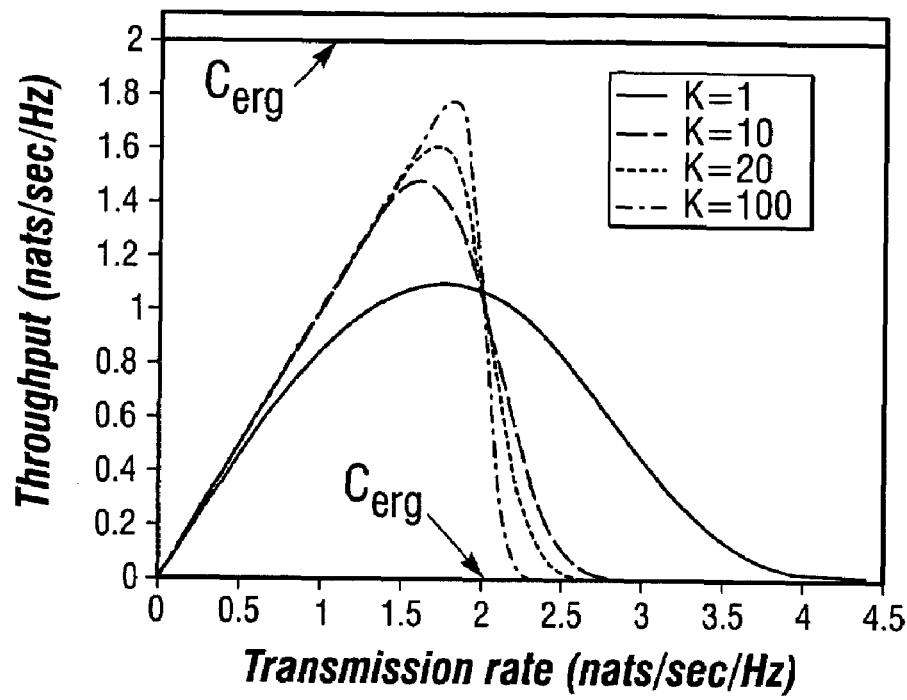
FIG. 2C shows a graph of throughput vs. transmission rate for various values of K where average power is approximately 10 dB.

Theorem 2.1.1 and Proposition 2.1.2 disclose that if the channel fading is $\chi_2^2$ then a unique solution for $MZT_{RT}$ exists. This phenomenon can be easily observed in FIG. 2C, which plots throughput vs. transmission rate for various values of K and $P_{av} = 10$ dB. It is seen that each curve has a unique maximum corresponding to $MZT_{RT}(P_{av}, K)$. FIG. 2C also empirically verifies Theorem 2.1.7 since it is apparent that for finite $K < \infty$ if $R > C_{erg}$ then non-zero throughput is possible. It is also seen that as K increases the throughput achievable for $R > C_{erg}$ decreases.

Figure 2D:
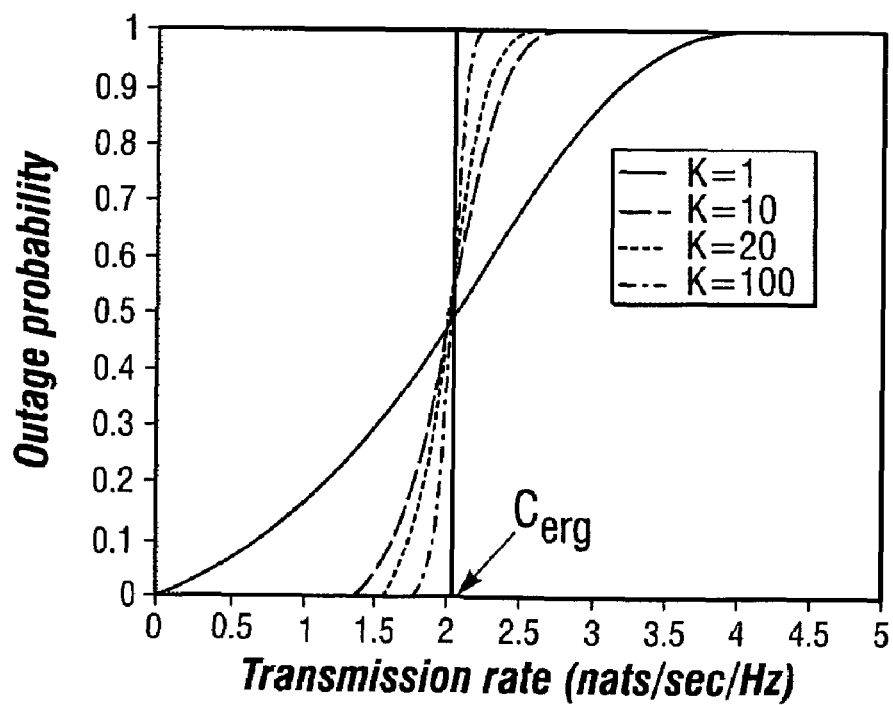
FIG. 2D shows a graph of outage probability vs. transmission rate for various values of K where average power is approximately 10 dB.
Figure 2E:
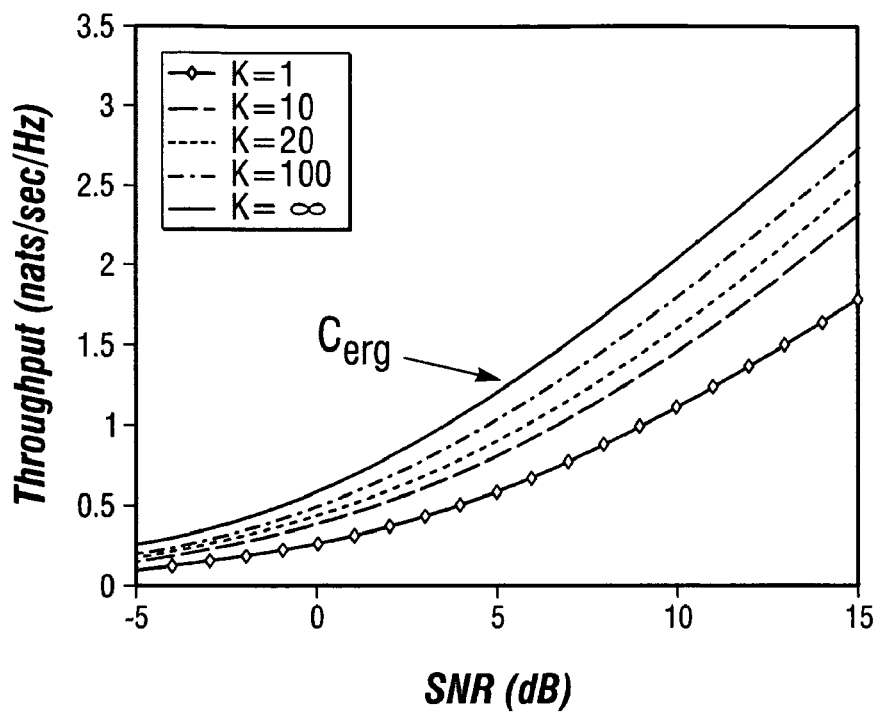
FIG. 2E shows a graph of maximum zero-outage throughput (MZT) as a function of average power and coding delay vs. average power for various coding delays.

Theorem 2.1.5 discloses that that the outage probability as a function of R, $P_{out}(R, P_{av}, K)$, converges to $I_F(R, C_{erg})$ as $K \to \infty$. This effect can be seen in FIG. 2D, which plots outage probability vs. transmission rate for $P_{av} = 10$ dB and for various values of K. Clearly the larger the K the closer the outage probability is to $I_F(R, C_{erg})$. Theorem 2.1.6 also shows that $MZT_{RT}(P_{av}, K)$ converges to $C_{erg}(P_{av})$ as $K \to \infty$. This is verified in FIG. 2D, which plots $MZT_{RT}(P_{av}, K)$ as a function of transmit power $P_{av}$ for various K. As K increases it can be seen that $MZT_{RT}(P_{av}, K)$ approaches $C_{erg}(P_{av})$, verifying Theorem 2.1.6. FIG. 2E also demonstrates the performance penalty suffered by delay-limited systems with scheme RT when compared to ergodic capacity. For example, at a target throughput of 1 nats/sec/Hz, $MZT_{RT}(P_{av}, K)$ is about 1.18 dB away from ergodic capacity when $K = 100$, 2.21 dB away when $K = 20$, 2.96 dB away when $K = 10$, and 5.54 dB when $K = 1$.

Figure 2F:
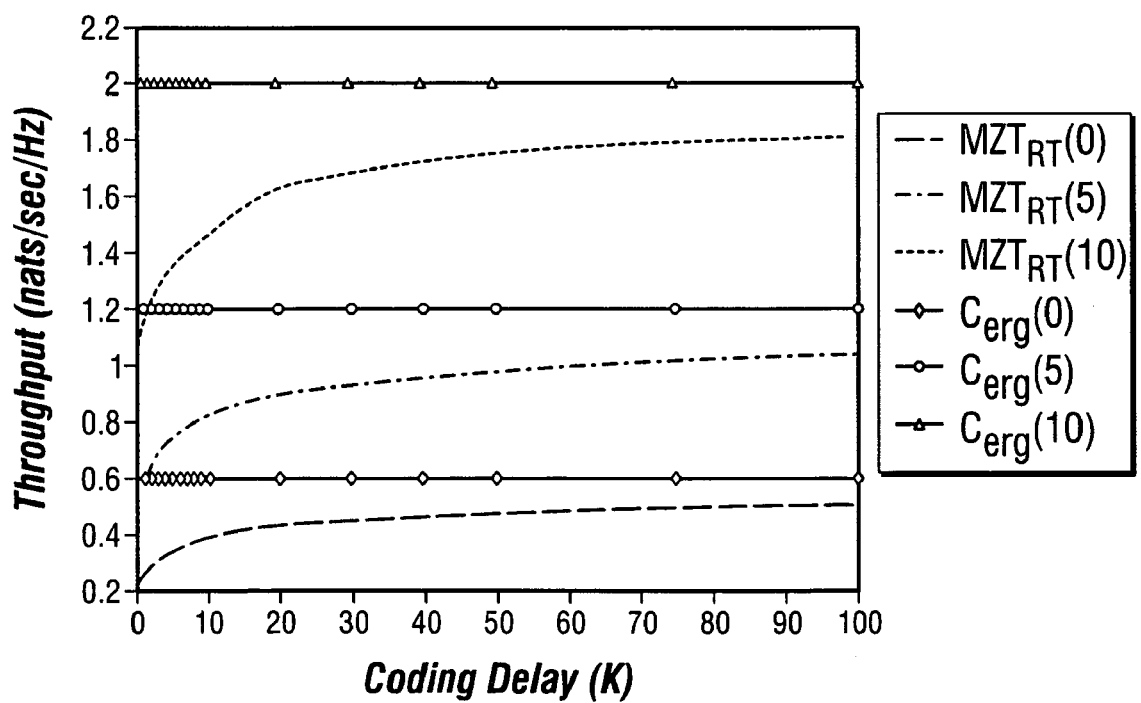
FIG. 2F shows a graph of MZT (re-transmission scheme) as a function of average power and K, where average power is 0, 5, and/or 10 dB.
Figure 2G:
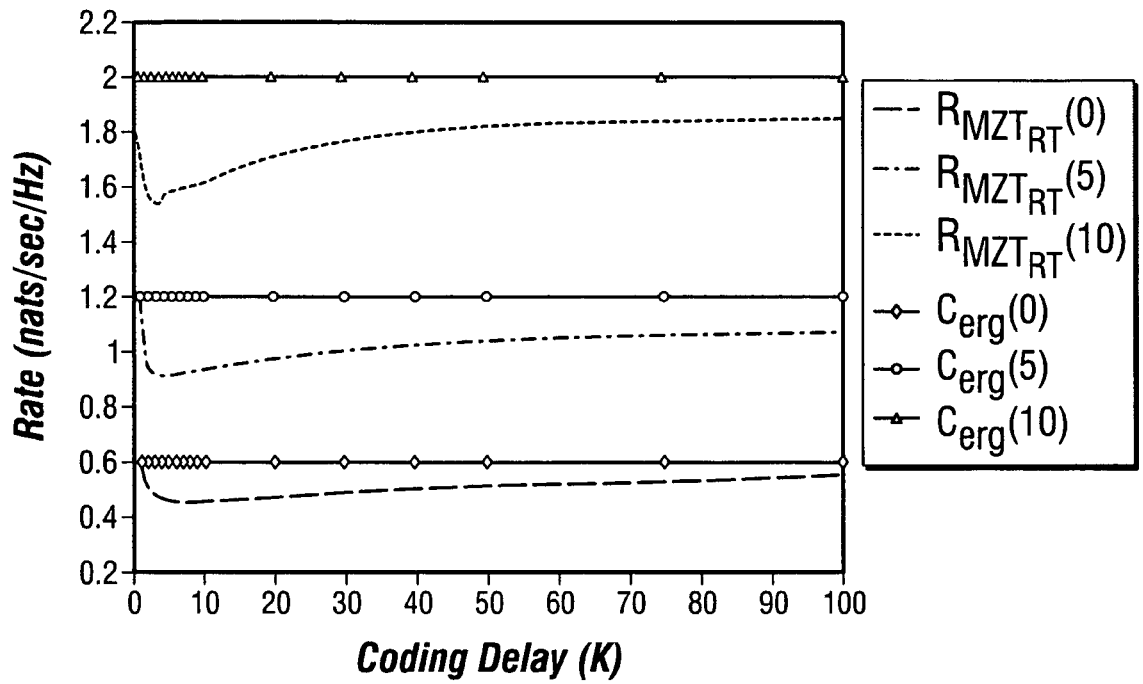
FIG. 2G shows a graph of transmission rate as a function of K for average power values of 0, 5 and/or 10.
Figure 2H:
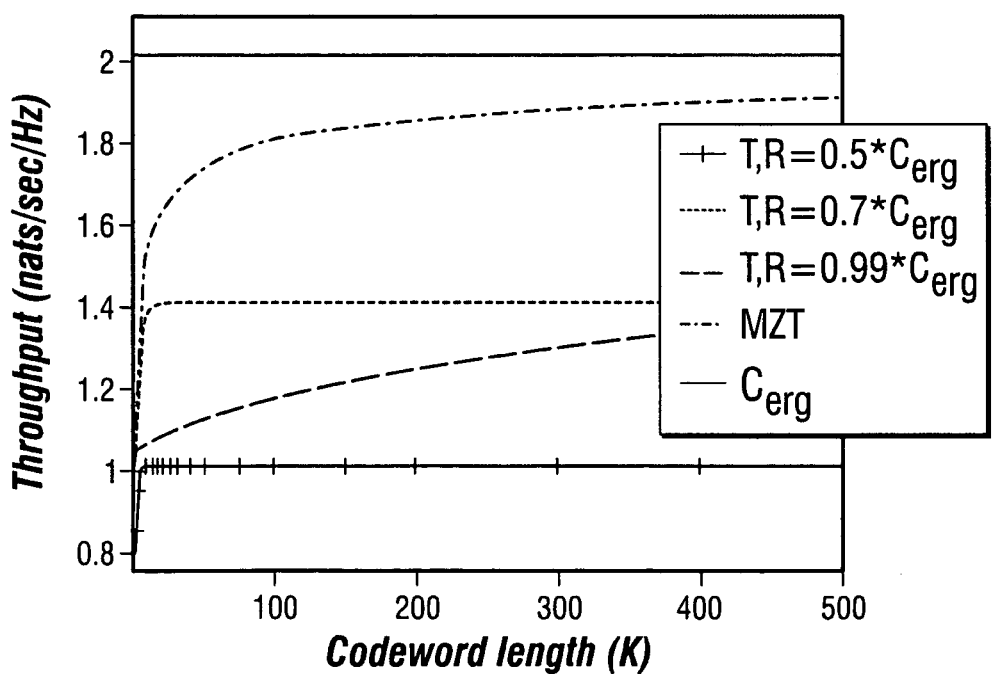
FIG. 2H shows a graph of throughput vs. K achieved with an SNR of 10 dB for various transmission rates.

FIG. 2F plots $MZT_{RT}(P_{av}, K)$ as a function of coding delay K for $P_{av} \in \{0, 5, 10\}$ dB. Again, this illustrates that the maximum throughput approaches $C_{erg}(P_{av})$ as $K \to \infty$. $MZT_{RT}(P_{av}, K)$ also appears to be a monotonically increasing function of K. This does make sense intuitively; larger coding delays result in more fading states affecting each codeword and more opportunity to "average out" poor channel conditions and therefore reach a higher throughput Often system designers assume that for a "large enough" coding delay K the ergodic nature of the fading channel can be captured and an outage probability close to zero can be achieved. Such a scenario would result in a throughput equivalent to the transmission rate FIG. 2H plots the throughput achieved if $R = \beta C_{erg}$ for various $\beta \in [0, 1]$. It is seen for $\beta = 0.5$ and $\beta = 0.7$ that the throughput is close to the transmission rate when $K \approx 10$ and $K \approx 25$, respectively. For $\beta = 0.99$ the throughput is below the transmission rate even for $K = 500$. Clearly, the closer the transmission rate is to ergodic capacity the harder it is to capture the erogdic nature of the channel.

The transmission rate of the system should be selected to achieve the $MZT_{RT}$ rather than attempting to achieve $C_{erg}$, which is unattainable for finite K. FIG. 2G plots the optimal transmission rate $R_{MZT_{RT}}^*$ as a function of K for $P_{av} \in \{0, 5, 10\}$ dB. The relationship between $R_{MZT_{RT}}^*$ and K is not as obvious $R_{MZT_{RT}}^*$ does converge to ergodic capacity as $K \to \infty$, but not monotonically and can fluctuate for small K. This can be attributed to the behavior of the tail of $f_{C_K}(R)$, the distribution of the instantaneous capacity, as a function of K with $\chi_2^2$ fading For different fading processes the behavior of $R_{MZT_{RT}}^*$ may be different. This highlights the need to properly select $R_{MZT_{RT}}^*$ by solving (2.4).

Selecting a transmission rate that overshoots (is larger than) $R_{MZT_{RT}}^*$ will result in a loss in throughput when compared to $MZT_{RT}$, as seen in FIG. 2C. The severity of the throughput loss depends on K. For larger K, the throughput vs. transmission rate curve is narrower, which shows that the throughput loss is more severe if the optimal transmission rate is overshot. In the limit when $K = \infty$, selecting a transmission rate infinitesimally larger than the optimal one yields zero throughput. Therefore, system designers must be very careful not to overshoot the optimal transmission rate for larger K. This phenomenon also suggests a trade off: throughput vs. system robustness For larger K, $MZT_{RT}$ is higher but the loss in throughput if the optimal transmission rate is overshot is more severe For smaller K, $MZT_{RT}$ is lower but the loss in throughput if the optimal rate is overshot is less severe.

Underestimating the transmission rate also yields similar losses in throughput. This is seen in FIG. 2H where compared are $MZT_{RT}(P_{av}, K)$, achieved using $R_{MZT_{RT}}*$, to the throughput achieved using $R=\beta C_{erg}$, for various $\beta \in (0, 1)$. For $\beta=0.5$ and $\beta=0.7$ the throughput curves plateau as a function of K and are far below $MZT_{RT}(P_{av}, K)$ This occurs because the transmission rate is underestimated and a larger rate, yielding a larger throughput, can be supported for that K. These examples clearly illustrate the importance of properly selecting the transmission rate.

Figure 2I:
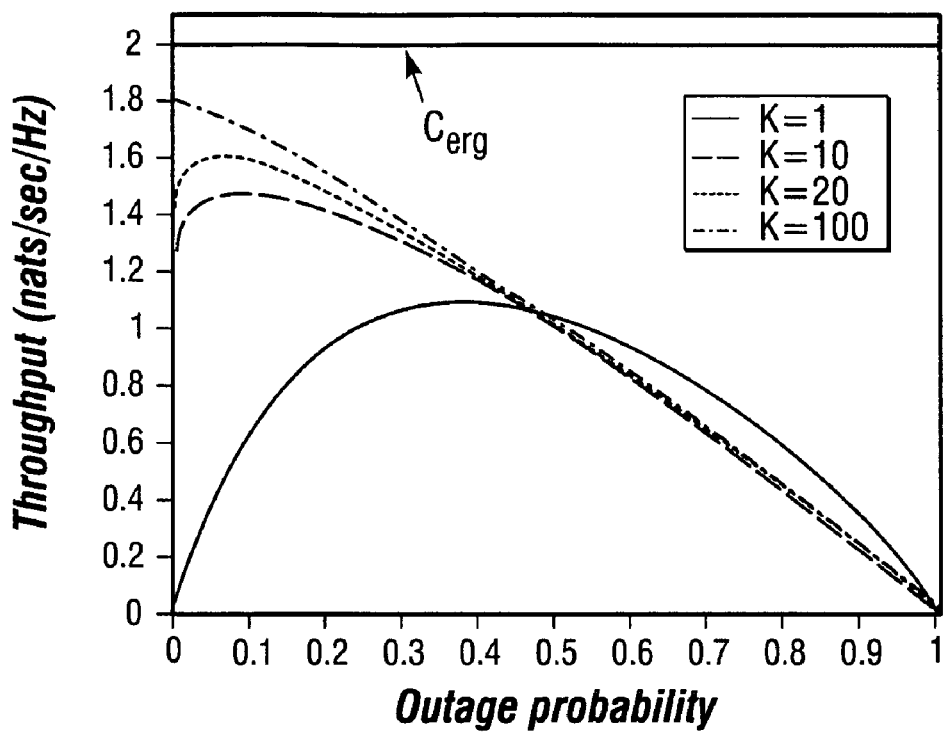
FIG. 2I shows a graph of throughput vs. outage probability for various values of K, where average power is 10 dB.
Figure 2J:
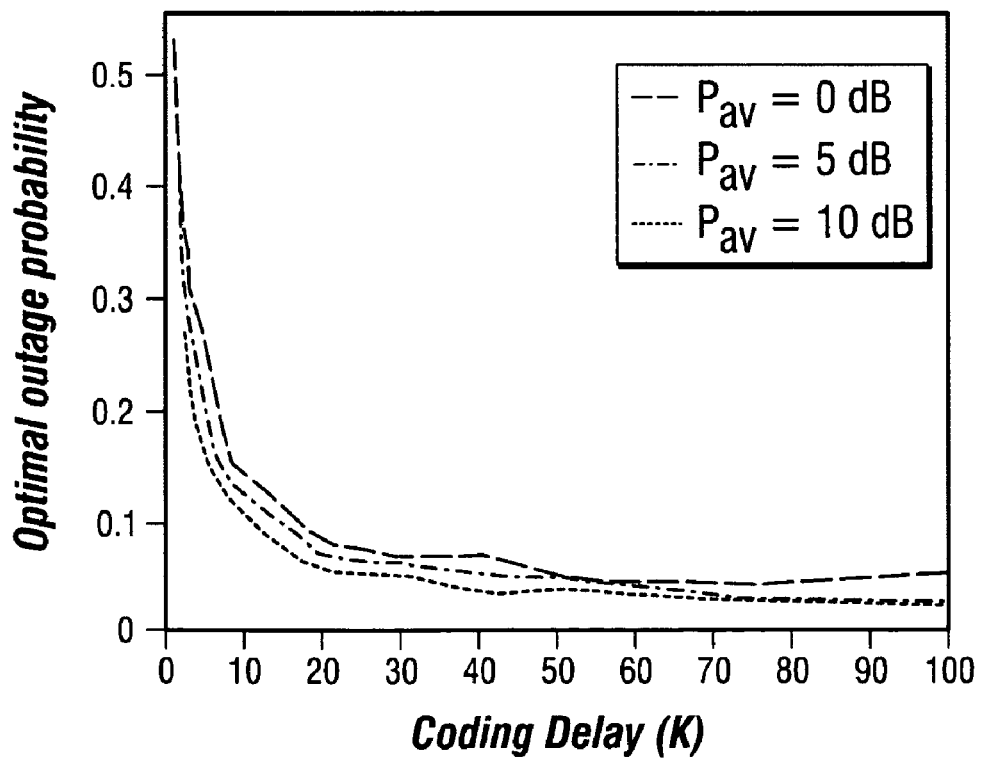
FIG. 2J shows a graph of optimal outage probability as a function of K for various average power values.

The uniqueness of $MZT_{RT}$ implies that there is a unique outage probability $P_{out}(R_{MZT_{RT}}*, P_{av}, K)$ that corresponds to the maximum throughput. FIG. 2I plots throughput vs. the optimal outage probability for various values of K and $P_{av}=10$ dB, $MZT_{RT}(P_{av}, K)$ corresponds to the peak of each curve. FIG. 2J plots the optimal outage probability as a function of K for $P_{av} \in \{0, 5, 10\}$ dB. From both figures it is seen that the optimal outage probability can be high, especially for small coding delays. For example if $P_{av}=0$ dB and K=1 then the optimal outage probability is $P_{out}(R_{MZT_{RT}}*, P_{av}, 1)=0.53$. This suggests that in order to maximize the through-put it is necessary to lose over half of the transmitted codewords to outage. When compared to the conventional practice of constraining the outage probability to be rather small, for example $\epsilon=0.01$, the result is substantially significant. The penalty of outages means zero rate for K consecutive blocks, which is small for small K and large for large K. For small K the ergodic nature of the channel cannot be captured, and the instantaneous capacity is highly variable. Throughput is maximized by exploiting this variability and transmitting codewords with a high rate and therefore a large outage probability, since the penalty for outage is small. For larger but finite K, the instantaneous capacity is still a random quantity but is not highly variable and codewords begin to see "average" channels. Since the penalty for outage is large, throughput is optimized by selecting rates that the "average" channel can support. Intuitively, this makes sense since the optimal outage probability decreases as $K \to \infty$ and at the extreme $K=\infty$ the optimal outage is 0, corresponding to a maximum throughput of $C_{erg}$.

2.2 Maximum Zero-Outage Throughput with Scheme ID ($MZT_{ID}$)

2.2.1 Mathematical Formulation

Scheme ID is a more complex retransmission scheme than scheme RT. Feedback is used not only to guarantee that codewords are successfully received but also to improve communications performance. This is accomplished by a more intelligent receiver design. Since the receiver saves, rather than discards, codewords that are in outage and optimally combines them with subsequent retransmitted versions (prior to making a decoding decision), the outage probability decreases with each retransmission.

In general when combining J codewords with a K block coding delay using MRRC the instantaneous capacity is given by $$C_K(P_{av}, K, J) = \frac{1}{K}\sum_{k=0}^{K-1} \log\left(1 + \sum_{j=1}^{J} \alpha_{k,j} P_{av}\right), \quad (2.25)$$

and the associated outage probability is $$P_{out}(R, P_{av}, K, J) = Prob[R > C_K(P_{av}, K, J)]. \quad (2.26)$$

As a result, the probability of outage after s consecutive transmission attempts becomes $$Prob\left(\bigcap_{j=1}^{s} out_j\right) = Prob\left[\left(R > \frac{1}{K}\sum_{k=0}^{K-1} \log\left(1 + \sum_{j=1}^{s} \alpha_{k,j} P_{av}\right)\right) \cap \quad (2.27)$$

$$\left(R > \frac{1}{K}\sum_{k=0}^{K-1} \log\left(1 + \sum_{j=1}^{s-1} \alpha_{k,j} P_{av}\right)\right) \cap$$

$$\cdots \cap \left(R > \frac{1}{K}\sum_{k=0}^{K-1} \log(1 + \alpha_{k,1} P_{av})\right)\right] \quad (2.28)$$

for scheme ID. In general, (2.28) is difficult to solve analytically and is computed numerically. The numerical solution to (2.28) can be used to determine the service time distribution (1.1), the expected service time E[S], and the associated maximum zero-outage throughput for scheme ID ($MZT_{ID}$).

2.2.2 Uniqueness of $MZT_{ID}$ when K=1

The difficulty of determining a closed form expression for the service time is apparent from (2.28). However, when K=1 and the channel fading is $\chi_2^2$, (2.28) admits a closed form expression and therefore the service time distribution and expected service-time can be determined analytically.

Theorem 2.2.1. If K=1 and the channel fading is $\chi_2^2$ then $$\mathbb{E}[S] = \frac{e^R + P_{av} - 1}{P_{av}} \quad (2.29)$$

Proof. For simplicity, let $$x = \frac{e^R - 1}{P_{av}}.$$

Then since K=1 the probability of outage on successive transmission attempts (2.28) is given by $$Prob(out_1) = Prob[x > \alpha_1], \quad (2.30)$$

$$Prob(out_2 \cap out_1) = Prob[(x > \alpha_1 + \alpha_2) \cap (x > \alpha_1)],$$

$$\vdots$$

$$Prob\left(\bigcap_{j=1}^{s} out_j\right) = Prob\left[\left(x > \sum_{j=1}^{s} \alpha_j\right) \cap \left(x > \sum_{j=1}^{s-1} \alpha_j\right) \cap \cdots \cap (x > \alpha_1)\right]$$

where $\sum_{j=1}^{s} \alpha_j$ is a $\chi_{2s}^2$ random variable. This can be determined by integrating the joint distribution of the $\alpha_j$'s over the appropriate region $$Prob\left(\bigcap_{j=1}^{s} out_i\right) = \int_0^x \int_0^{x-\alpha_1} \cdots \int_0^{x-\sum_{j=1}^{q-1} \alpha_j} f(\alpha_1, \alpha_2, \ldots, \alpha_s) d\alpha_s d\alpha_{s-1} \ldots d\alpha_1. \quad (2.31)$$

Since the channel gains are assumed to be i.i.d., $f(\alpha_1, \alpha_2, \ldots, \alpha_s) = \prod_{i=1}^{s} f(\alpha_i)$. Then (2.31) becomes $$Prob\left(\bigcap_{j=1}^{s} out_j\right) = 1 - e^{-x} \sum_{j=0}^{s-1} \frac{x^j}{j!}. \quad (2.32)$$

Using this the service time distribution is found (1.1) to be $$Prob(S = s) = Prob\left(\bigcap_{k=1}^{s-1} out_k\right) - Prob\left(\bigcap_{k=1}^{s} out_k\right) \quad (2.33)$$

$$= e^{-x} \frac{x^{s-1}}{(s-1)!}$$

The expected service time can then be computed as $$\mathbb{E}[S] = \sum_{s=1}^{\infty} s[Prob(S = s)] \quad (2.34)$$

$$= e^{-x} \sum_{s=1}^{\infty} \frac{s x^{s-1}}{(s-1)!}$$

$$= e^{-x} \left(\sum_{s=1}^{\infty} \frac{(s-1) x^{s-1}}{(s-1)!} + \sum_{s=1}^{\infty} \frac{x^{s-1}}{(s-1)!}\right)$$

$$= e^{-x} \left(\sum_{s=0}^{\infty} \frac{s x^s}{s!} + \sum_{s=1}^{\infty} \frac{x^{s-1}}{(s-1)!}\right)$$

$$= e^{-x} \left(x \sum_{s=1}^{\infty} \frac{x^{s-1}}{(s-1)!} + e^x\right)$$

$$= e^{-x}(xe^x + e^x)$$

$$= 1 + x.$$

By substituting the value of x, (2.29) is obtained as desired. □

Using the form of E[S] described above, $MZT_{ID}(P_{av}, 1)$ can be written as $$MZT_{ID}(P_{av}, 1) = \sup_R \frac{RP_{av}}{e^R + P_{av} - 1}. \quad (2.35)$$

Note that this equation is quite different from (2.4). For scheme ID, the throughput is no longer the transmission rate multiplied by the success probability. The difference is due to the receiver performing MRRC with the retransmitted codewords.

As was the case for scheme RT, the special case when K=1 for scheme ID also admits a semi-explicit solution for the optimal transmission rate and therefore for $MZT_{ID}(P_{av}, 1)$.

Theorem 2.2.2. If the channel fading is $\chi_2^2$ then (2.35) has a unique maximizer Proof. Let $$T(R) = \frac{RP_{av}}{e^R + P_{av} - 1};$$

Its first two derivatives are given by $$T'(R) = \frac{P_{av}(e^R + P_{av} - 1 - Re^R)}{(e^R + P_{av} - 1)^2}, \quad (2.36)$$

$$T''(R) = \frac{e^R P_{av}[R(e^R - P_{av} + 1) - 2(e^R + P_{av} - 1)]}{(e^R + P_{av} - 1)^3}. \quad (2.37)$$

After some algebraic manipulations it can be shown that $$T(R)T''(R) \leq [T'(R)]^2 \quad (2.38)$$

is satisfied, which means that T(R) is a log-concave function. Then from convex optimization theory, log T(R) has a unique maximizer $R_{MZT_{ID}}^*$ on the convex set $R_+$. If T(R) is composed with the monotonic increasing function $e^z$, then $e^{T(R)}$ has the same maximizer $R_{MZT_{ID}}^*$, completing the proof. □

Theorem 2.2.3. If K=1 and the channel gains follow a $\chi_2^2$ distribution then $$MZT_{ID}(P_{av}, 1) = \frac{\left(W\left(\frac{P_{av}-1}{e}\right) + 1\right) P_{av}}{e^{\left(W\left(\frac{P_{av}-1}{e}\right) + 1\right)} + P_{av} - 1}. \quad (2.39)$$

Proof. Let $$T(R) = \frac{RP_{av}}{e^R + P_{av} - 1}. \quad (2.39)$$

Let $f(R)=\log[T(R)]$, which is concave in R since T(R) is log-concave as shown in Theorem 2.2.2. Taking the derivative of $f(R)$ with respect to R and equating with zero, ut is seen that transmission rate corresponding to the critical point is the solution to $e^R(1-R)+P_{av}-1=0$, which turns out to be $$R^*_{MZT_{ID}} = W\left(\frac{P_{av}-1}{e}\right)+1.$$

It is known that this rate corresponds to a throughput maximum (rather than a minimum) from Theorem 2.2.2. Substituting this back into T(R), (2.39) is obtained. □

Note that Theorem 2.2.2 was proved by illustrating that T(R) directly is a log-concave function, rather than by showing that $$\frac{1}{E[S]}$$

is log-concave. Indeed, $$\frac{1}{E[S]}$$

is not log-concave in this case, highlighting the fact that Theorem 2.1.1 is a sufficient, but not necessary, condition for uniqueness.

2.2.3 Properties of $MZT_{ID}$

Since it optimally combines multiple codewords to make a decoding decision, scheme ID may perform at least as well as scheme RT. Intuitively, if discarding codewords in error is optimal, then the optimal combining scheme would adopt this strategy. This can be proven explicitly for K=1.

Theorem 2.2.4. If K=1 and the channel fading follows a $\chi_2^2$ distribution then $MZT_{ID}(P_{av}, 1) \geq MZT_{RT}(P_{av}, 1)$.

Proof. Let $$MZT_{RT}(P_{av}, 1) = R_1[1 - P_{out}(R_1, P_{av}, 1)] = R_1 e^{-\left(\frac{e^{R_1}-1}{P_{av}}\right)}$$

and let $$MZT_{ID}(P_{av}, 1) = \frac{R_2 P_{av}}{e^{R_2} + P_{av} - 1},$$

where $R_1 = R^*_{MZT_{RT}}$ and $R_2 = R^*_{MZT_{ID}}$. Then $$\log MZT_{RT}(P_{av}, 1) = \log R_1 - \left(\frac{e^{R_1}-1}{P_{av}}\right) \quad (2.40)$$

$$\leq \log R_1 - \log\left(1+\frac{e^{R_1}-1}{P_{av}}\right)$$

$$= \log R_1 - \log\left(\frac{e^{R_1}-1+P_{av}}{P_{av}}\right)$$

$$\leq \log R_2 - \log\left(\frac{e^{R_2}-1+P_{av}}{P_{av}}\right)$$

$$= \log MZT_{ID}(P_{av}, 1).$$

The first inequality comes from the fact that $x \geq \log(1+x)$ $\forall x \geq 0$ as well as $R_1, R_2 > 0$ and $P_{av} > 0$. The second inequality occurs since $R_2$ is the optimizer for scheme ID. Finally, since $\log(x)$ is a monotonically increasing function of x, $MZT_{RT}(P_{av}, 1) \leq MZT_{ID}(P_{av}, 1)$, completing the proof. □

The gain in the throughput from scheme ID over scheme RT is due to the fact that the feedback is implicity used to optimize the transmission rate. Incremental diversity reduces the outage probability on each retransmission attempt. This allows the transmitter to more aggressively select the transmission rate resulting in a larger throughput than with scheme RT.

2.2.4 Simulation Results

Some of the Theorems and properties of $MZT_{ID}$ are now empirically verified via Monte Carlo simulation. In all of the simulations it is assumed that the channel fading is $\chi_2^2$.

Figure 2K:
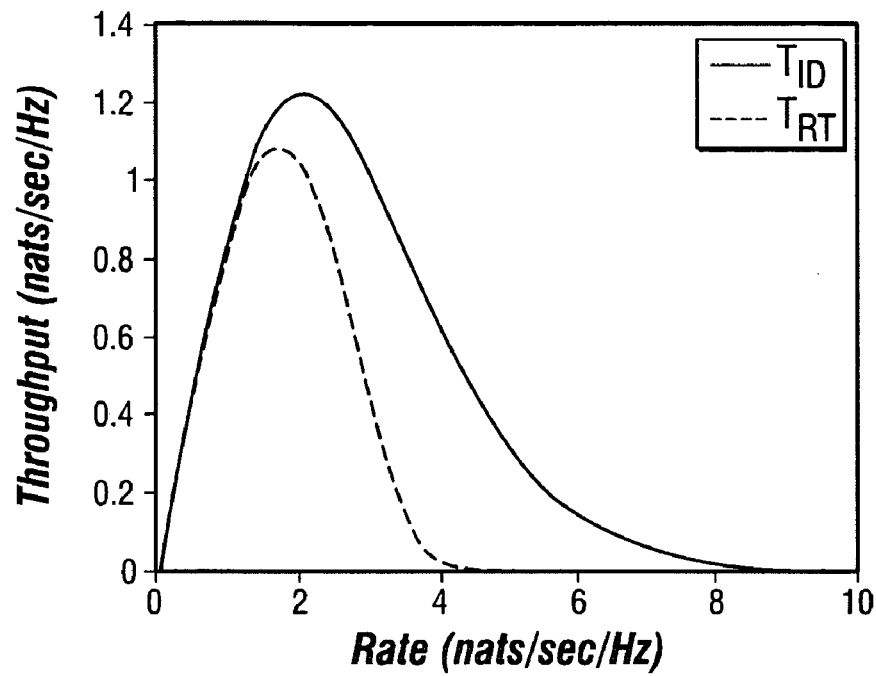
FIG. 2K shows a graph of fading throughput vs. transmission rate for an SNR. of 10 dB using simple re-transmission and incremental diversity.

Throughput is plotted against transmission rate in FIG. 2K with K=1 and $P_{av}$=10 dB for both schemes RT and ID. $MZT_{ID}$ and $MZT_{RT}$ correspond to the peaks of each curve. It is seen that for Scheme ID there is also a single peak in the throughput vs. rate curve and a unique optimal transmission rate. This empirically validates Theorem 2.2.2. It is also seen that the throughput for scheme ID is clearly higher than that using scheme RT, verifying Theorem 2.2.4. Moreover, it is seen that the gap between Scheme ID and Scheme RT is larger for large R. This is due to the fact that for large R there ale frequent outages and more retransmission attempts This results in more opportunities for codeword combining yielding greater throughput.

Figure 2L:
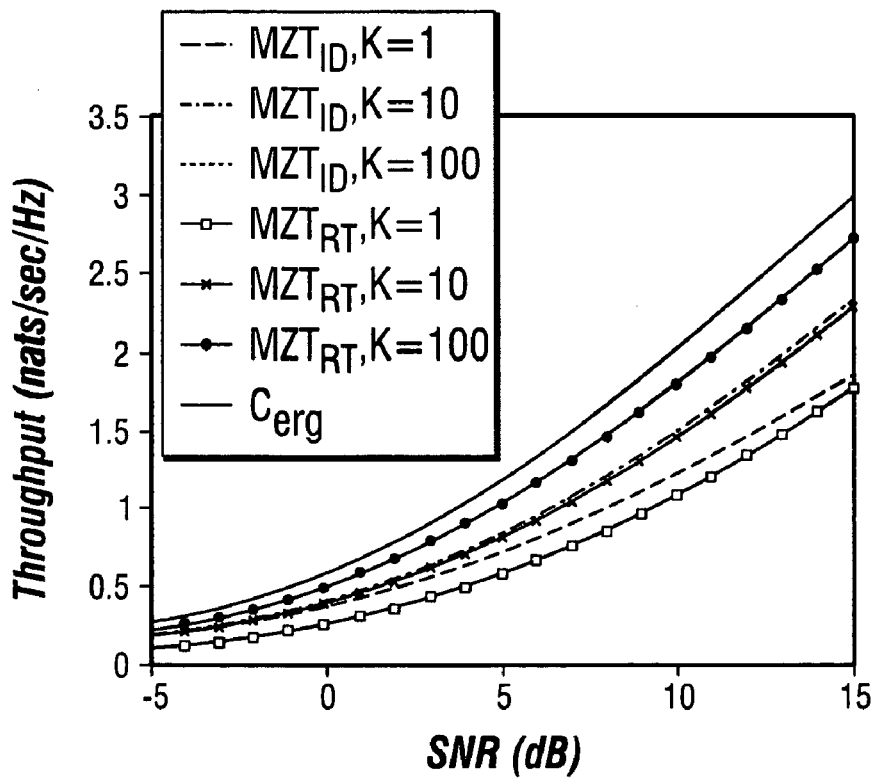
FIG. 2L shows a graph of MZT vs. SNR for various values of K.

As a means to estimate the performance penalty for having a finite coding delay K, both $MZT_{ID}(P_{av}, K)$ and $MZT_{RT}(P_{av}, K)$ are plotted as a function of the transmitted power $P_{av}$ for various K in FIG. 2L. For a target throughput of 1 nat/sec/Hz and a coding delay K=1, scheme ID provides a 1.22 dB gain over scheme RT. When K=10 and K=100 the gain shrinks to 0.18 dB and 0.04 dB, respectively. The decreasing difference between the two schemes can be explained as follows. For a given transmission rate outage events are more likely when K is small. Therefore, there are more retransmissions and more opportunities for codeword combining, resulting in higher throughput for scheme ID vs. scheme RT. In the limit as K→∞ the difference will shrink to zero as outages will never occur and codeword combining will not be exploited.

Figure 2M:
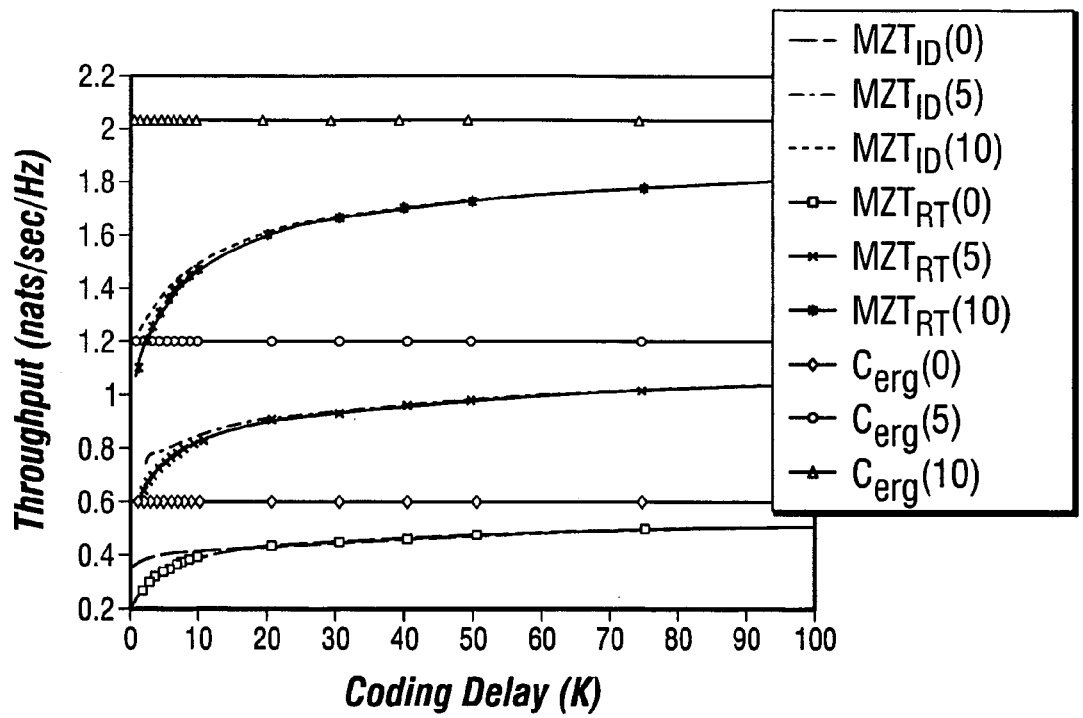
FIG. 2M shows a graph of MZT vs. coding delay for various values of average power.

FIG. 2M plots $MZT_{ID}(P_{av}, K)$ as a function of the coding delay K for various values of $P_{av}$. The maximum throughput for scheme RT is also plotted for reference. As is the case for scheme RT it can be seen that the maximum throughput with scheme ID can be far from ergodic capacity for finite K. Also, as K→∞, $MZT_{ID}(P_{av}, K) \to C_{erg}(P_{av})$. As with scheme RT, the convergence appears to be monotonic.

Figure 2N:
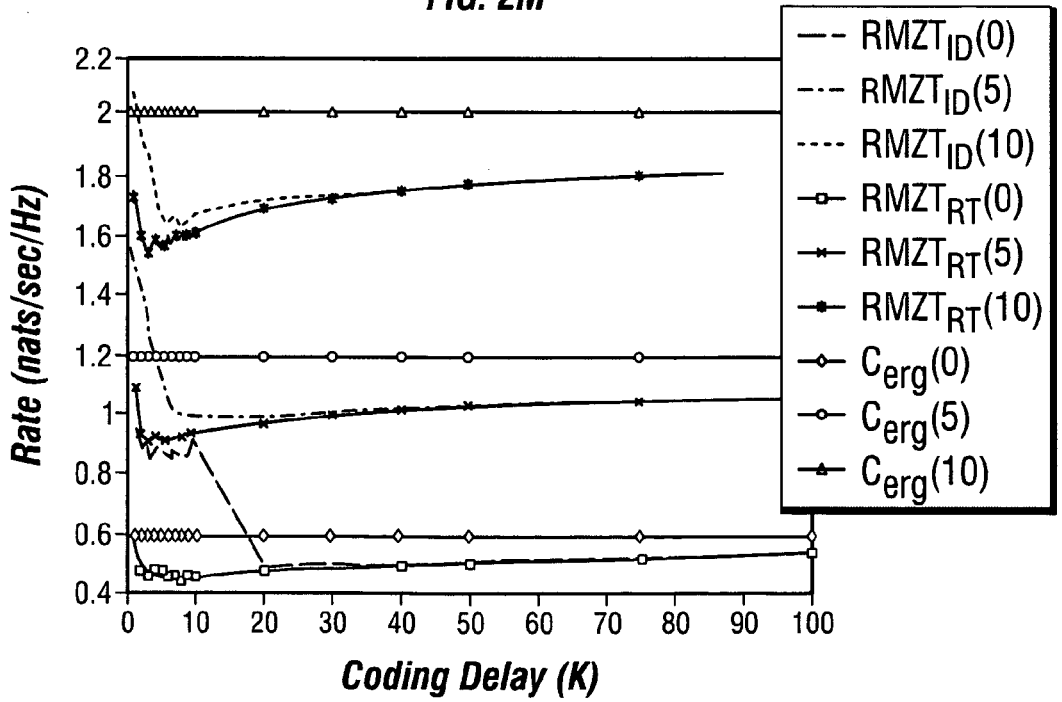
FIG. 2N shows a graph of transmission rate vs. coding delay for various values of average power.
Figure 20:
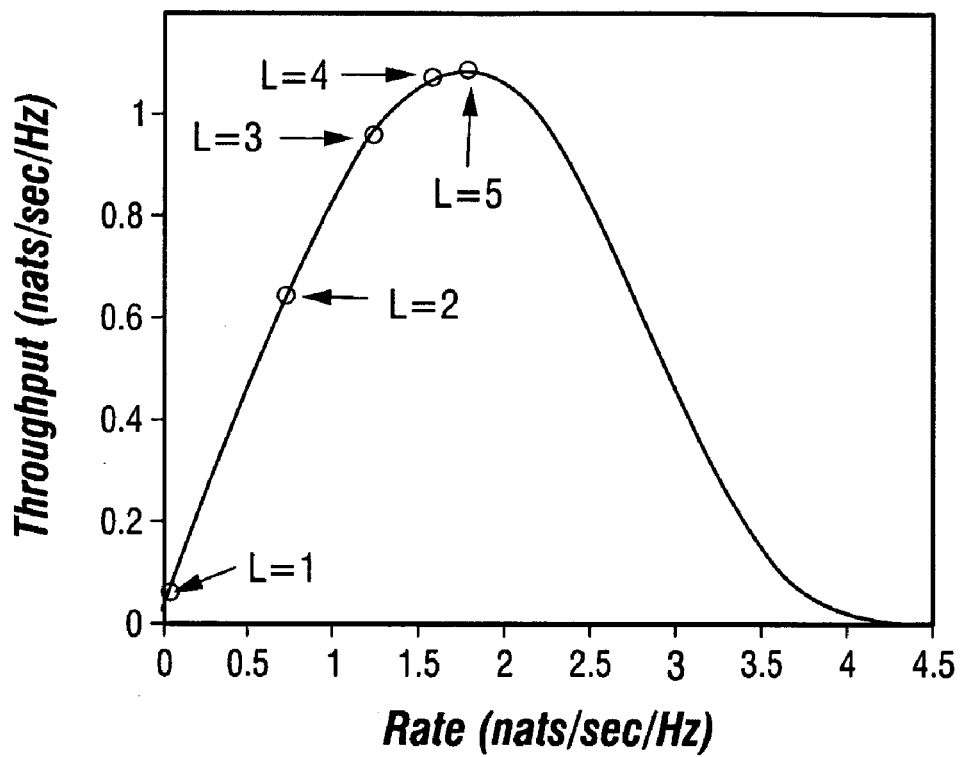

As is the case for scheme RT, the transmission rate for scheme ID should be selected carefully. Rather than trying to achieve $C_{erg}(P_{av})$ the transmitter should select the transmission rate to maximize the throughput. FIG. 2N plots the optimal transmission rate $R_{MZT_{ID}}^*(P_{av}, K)$ against the coding delay K for various values of $P_{av}$. The optimal transmission rate for scheme RT is included for reference. It is seen that as $K \to \infty$ that the optimal transmission rate converges to ergodic capacity $R_{MZT_{ID}}^*(P_{av}, K) \to C_{erg}(P_{av})$. Similar to scheme RT, the convergence is not monotonic and the optimal transmission can fluctuate a great deal as a function of K, especially for small K. For scheme ID the optimal transmission rate can actually be higher than the ergodic capacity of the channel. This does not contradict information theoretic capacity theorems as the resulting throughput is always less than ergodic capacity. However, this is rather non-intuitive as in practice transmission rates lower than ergodic capacity are normally selected. This can be explained by the fact that the codeword combining of scheme ID reduces the outage probability with each retransmission attempt allowing the transmitter to more aggressively select the transmission rate—in some cases resulting in rates higher than ergodic capacity.

2.3 Maximum $\epsilon$ Throughput with Scheme RT (M$\epsilon$T$_{RT}$)

Many applications, including streaming video and voice, are sensitive to delay and jitter, the variance of the delay. These applications may not be compatible with a possibly infinite number of transmission attempts for each codeword. Limiting the number of transmission attempts provides a tighter bound on delay and jitter at the cost of not guaranteeing successful transmission of every codeword. This is illustrated by generalizing scheme RT, due to its analytical tractability, to at most L attempts.

This is denoted as $RT_L$.

With scheme $RT_L$, $$Prob(S = s) = \begin{cases} [P_{out}(R, \mathcal{P}_{av}, K)]^{s-1}[1 - P_{out}(R, \mathcal{P}_{av}, K)] & s < L \\ [P_{out}(R, \mathcal{P}_{av}, K)]^{s-1}[1 - P_{out}(R, \mathcal{P}_{av}, K)] + [P_{out}(R, \mathcal{P}_{av}, K)]^L & s = L \\ 0 & s > L \end{cases} \quad (2.41)$$

as the service time distribution. For s<L it is a geometric distribution with parameter $[1-P_{out}(R, P_{av}, K)]$. Since L is the maximum number of transmission attempts, it is impossible for the service time to exceed L and thus the service time distribution is 0 for s>L. Finally, s=L consists of those codewords that are successfully transmitted with exactly L attempts or require more attempts and are in outage after L attempts. This "effective outage" probability can be found by summing the tail of a geometric distribution for s=L+1, ..., ∞. That is, $$P_{out}^{eff} = \sum_{s=L+1}^{\infty} [P_{out}(R, \mathcal{P}_{av}, K)]^{s-1}[1 - P_{out}(R, \mathcal{P}_{av}, K)] \quad (2.42)$$

$$= [P_{out}(R, \mathcal{P}_{av}, K)]^L$$

From (2.41), the expected service time is given by $$E[S] = \frac{1 - [P_{out}(R, \mathcal{P}_{av}, K)]^L}{[1 - P_{out}(R, \mathcal{P}_{av}, K)]}. \quad (2.43)$$

The maximum $\epsilon$-throughput for scheme $RT_L$ (M$\epsilon$T$_{RT_L}$) is defined as the highest achievable throughput using at most L transmission attempts per codeword, with the effective outage probability no greater than $\epsilon$; that is, $$M\epsilon T_{RT_L}(\mathcal{P}_{av}, K, L) = \sup_R \left\{ \frac{R[1 - P_{out}^{eff}]}{\mathbb{E}[S]} : P_{out}^{eff} \leq \epsilon \right\} \quad (2.44)$$

$$= \sup_R \{R[1 - P_{out}(R, \mathcal{P}_{av}, K)] : P_{out}^{eff} \leq \epsilon\}.$$

It is remarkable that M$\epsilon$T$_{RT_L}$ is found by maximizing the same objective function as the one for MZT$_{RT}$ in (2.4).

The only difference in finding MZT$_{RT}$ and M$\epsilon$T$_{RT_L}$ is that the optimization is performed over different sets of transmission rates: For MZT$_{RT_L}$ this set is restricted to those rates that result in an effective outage probability less than a target $\epsilon$. Clearly as L$\to\infty$, M$\epsilon$T$_{RT_L} \to$MZT$_{RT}$ since the constraint on the transmission rate disappears and $P_{out}^{eff} \to 0$.

The effect of a limited number of transmission attempts can be seen in FIG. 2O, which plots M$\epsilon$T$_{RT_L}$ for various values of L and $P_{out}^{eff}$=0.01. Clearly as L increases the set of valid transmission rates over which the optimization in (2.44) is performed increases, resulting in a throughput that approaches MZT$_{RT}$. As L increases, and the set of transmission rates over which the optimization in (2.44) is performed includes the transmission rate that achieves MZT$_{RT}$, then there is no throughput benefit in further increasing L. This can be seen in FIG. 2O in which M$\epsilon$T$_{RT_L}$ for L=5 is the same as MZT$_{RT}$.

3. Outage Minimization Under a Peak and Average Power Constraint

Outage minimization for a fixed transmission rate is a prerequisite step required in order to maximize the throughput of delay-limited communication systems with CSI-RT. The solution under the short-term and long-term average power constraints is described above. The fixed rate outage minimization under both peak and average power constraints are discussed in this chapter.

3.1 Short-Term Average and Peak Power Constraints

Under the short-term average and peak power constraints, the minimum outage probability $$\min_\gamma \{P_{out}(R, \gamma, K) : \gamma \in O_K^{st}(P_{av}, P_p)\} \quad (3.1)$$

is achieved by an optimal outage minimizing power allocation strategy $\tilde{\gamma}^{st} \in O_K^{st}(P_{av}, P_p)$.

Theorem 3.1.1. The power allocation strategy that satisfies the short-term average and peak power constraints is given by $$\tilde{\gamma}_k^{st}(\underline{\alpha}) = \begin{cases} \min\left(\max\left(\tilde{\lambda}^{st}(\underline{\alpha}) - \frac{1}{\alpha_k}, 0\right), \mathcal{P}_p\right) & \text{if } \mathcal{P}_p > \mathcal{P}_{av} \\ \mathcal{P}_p & \text{if } \mathcal{P}_p \leq \mathcal{P}_{av} \end{cases} \quad (3.2)$$

with $\tilde{\lambda}^{st}(\underline{\alpha})$ the solution to $$\frac{1}{K}\sum_{k=0}^{K-1} \min\left(\max\left(\tilde{\lambda}^{st}(\underline{\alpha}) - \frac{1}{\alpha_k}, 0\right), \mathcal{P}_p\right) = \mathcal{P}_{av}. \quad (3.3)$$

Proof. The power allocation policy that solves (3.1) is the same as that which maximizes the K-block instantaneous capacity (15) for a codeword affected by channel α. If $P_p \leq P_{av}$ then (15) is trivially maximized by always transmitting at the peak power, $\tilde{\gamma}_k^{st}(\alpha) = P_p$.

If $P_p > P_{av}$, then (15) is maximized by solving $$\min_{\underline{\gamma}}\left\{-\sum_{k=0}^{K-1} \log(1 + \alpha_k \gamma_k) : 0 \leq \gamma_k \leq \mathcal{P}_p, \sum_{k=0}^{K-1} \gamma_k = K\mathcal{P}_{av}\right\}. \quad (3.4)$$

The Lagrangian functional is first set up in standard form $$J = \quad (3.5)$$
$$-\sum_{k=0}^{K-1} \log(1 + \alpha_k \gamma_k) - \sum_{k=0}^{K-1} \psi_k \gamma_k + \sum_{k=0}^{K-1} \mu_k(\gamma_k - P_p) + \upsilon\left(\sum_{k=0}^{K-1} \gamma_k - P_{av}\right).$$

Since both the objective function and set of feasible points are convex, it is known that the Karush-Kuhn-Tucker (KKT) conditions are sufficient for optimality. Therefore an.) feasible point that satisfies the KKT conditions is the globally optimal point that minimizes the objective function. The optimal power allocation policy $\gamma^*$ and the associated $\psi_k^*$, $\mu_k^*$, and $\nu^*$, satisfy $$\gamma_k^* \geq 0 \quad (3.6a)$$
$$\gamma_k^* \leq P_p \quad (3.6b)$$
$$\sum_{k=0}^{K-1} \gamma_k^* = KP_{av} \quad (3.6c)$$
$$\psi_k^* \geq 0 \quad (3.6d)$$
$$\mu_k^* \geq 0 \quad (3.6e)$$
$$\psi_k^* \gamma_k^* = 0 \quad (3.6f)$$
$$\mu_k^*(\gamma_k^* - P_p) = 0 \quad (3.6g)$$
$$\frac{\partial J}{\partial \gamma_k^*} = \frac{-\alpha_k^*}{1 + \alpha_k^* \gamma_k^*} - \psi_k^* + \mu_k^* + \upsilon^* = 0 \quad (3.6h)$$

with (3.6a), (3.6b), and (3.6c) the set of feasible points, (3.6d) and (3.6e) the non-negativity of the Lagrange multipliers, (3.6f) and (3.6g) the complimentary slackness condition, and (3.6h) the vanishing gradient of the Lagrangian at the optimal solution. It is clear that a solution of the form $$\tilde{\gamma}_k^{st}(\underline{\alpha}) = \gamma_k^* = \min\left(\max\left(\tilde{\lambda}^{st}(\underline{\alpha}) - \frac{1}{\alpha_k}, 0\right), P_p\right) \quad (3.7)$$

with $\tilde{\lambda}^{st}(\underline{\alpha}) = 1/\nu^*$ the solution to $$\frac{1}{K}\sum_{k=0}^{K-1} \min\left(\max\left(\tilde{\lambda}^{st}(\underline{\alpha}) - \frac{1}{\alpha_k}, 0\right), P_p\right) = P_{av}, \quad (3.8)$$

satisfies (3.6a-3.6h). Thus, $\tilde{\gamma}^{st}$ is the power allocation strategy that minimizes outage probability under a peak and short-term average power constraint. □

Note that when $P_p > P_{av}$ the optimal solution has three regions. A constant power allocation of $\tilde{\gamma}_k^{st}(\alpha) = P_p$ is used when $$\lambda^{st}(\underline{\alpha}) - \frac{1}{\alpha_k} \geq P_p.$$

Next, the waterfilling solution)

$$\tilde{\gamma}_k^{st}(\underline{\alpha}) = \lambda^{st}(\underline{\alpha}) - \frac{1}{\alpha_k}$$

is applied when $$0 < \lambda^{st}(\underline{\alpha}) - \frac{1}{\alpha_k} < P_p.$$

Finally, no power is allocated $$\tilde{\gamma}_k^{st}(\underline{\alpha}) = 0 \text{ when } 0 > \lambda^{st}(\underline{\alpha}) - \frac{1}{\alpha_k}.$$

The functional implementation of this power control strategy is straightforward. The receiver relays CSI to the transmitter. If the current channel is α, the transmitter encodes the current codeword at rate R with the power allocation vector $\tilde{\gamma}^{st}(\alpha)$. If the transmission rate is higher than what the channel can support, $R > C_K(R, \tilde{\gamma}^{st}(\alpha))$, then an outage is declared.

3.2 Long-Term Average and Peak Power Constraints

Under the short-term average and peak power constraints, the minimum outage probability $$\min_{\gamma}\{P_{out}(R, \gamma, K) : \gamma \in O_K^{lt}(P_{av}, P_p)\} \quad (3.9)$$

is achieved by an optimal outage minimizing power allocation strategy $\tilde{\gamma}^{lt} \in O_K^{lt}(P_{av}, P_p)$.

Theorem 3.2.1. The power allocation policy that minimizes outage under the long-term average and peak power constraints is $$\tilde{\gamma}^{lt}(\underline{\alpha}) = \begin{cases} \tilde{\gamma}(\underline{\alpha}), & w/prob\ 1 & \text{if } \underline{\alpha} \notin G(P_p) \text{ and } \langle\tilde{\gamma}(\underline{\alpha})\rangle < s^* \\ \tilde{\gamma}(\underline{\alpha}), & w/prob\ w^* & \text{if } \underline{\alpha} \notin G(P_p) \text{ and } \langle\tilde{\gamma}(\underline{\alpha})\rangle = s^* \\ 0, & w/prob\ (1-w^*) & \text{if } \underline{\alpha} \notin G(P_p) \text{ and } \langle\tilde{\gamma}(\underline{\alpha})\rangle = s^* \\ 0, & w/prob\ 1 & \text{if } \underline{\alpha} \notin G(P_p) \text{ and } \langle\tilde{\gamma}(\underline{\alpha})\rangle > s^* \\ 0, & w/prob\ 1 & \text{if } \underline{\alpha} \notin G(P_p) \end{cases} \quad (3.10)$$

for some subset of fading states $G(P_p) \subset R_+^K$, $s^* > 0$ and $w^* \in [0, 1]$ with $$\tilde{\gamma}_k(\underline{\alpha}) = \min\left(\max\left(\tilde{\lambda}^{lt}(\underline{\alpha}) - \frac{1}{\alpha_k'}, 0\right), P_p\right) \quad (3.11)$$

and $\tilde{\lambda}^{lt}(\alpha)$ the solution to $$\frac{1}{K}\sum_{k=0}^{K-1} \log\left[1 + \alpha_k \min\left(\max\left(\tilde{\lambda}^{lt}(\underline{\alpha}) - \frac{1}{\alpha_k}, 0\right), P_p\right)\right] = R. \quad (3.12)$$

Proof. Suppose $\gamma^*$ is the outage minimizing power control policy, $$\gamma^* = \arg\min_\gamma\{P_{out}(R, \gamma, K) : \gamma \in O_K^{lt}(P_{av}, P_p)\}. \quad (3.13)$$

For this minimum outage power allocation policy, the outage region $$\phi(R, K) = \{\alpha : C_K(\alpha, \gamma^*(\alpha)) < R\} \quad (3.14)$$

is the set of channels that cannot support rate R. Let $\tilde{\gamma}$ represent the power allocation strategy that presents outage with minimum power. That is, $$\tilde{\gamma}(\underline{\alpha}) = \arg\min_\gamma\{\langle\gamma(\underline{\alpha})\rangle : C_K(\underline{\alpha}, \gamma(\underline{\alpha})) \geq R\}. \quad (3.15)$$

Then by definition $$\int_{\phi(R,K)} I_F[C_K(R, \gamma(\alpha)) < R] dF(\alpha) \geq \int_{\phi(R,K)} I_F[C_K(R, \gamma^*(\alpha)) < R] dF(\alpha) \quad (3.16)$$

and $$E_{\alpha \in \phi(R,K)}[\langle\tilde{\gamma}(\alpha)\rangle] \leq E_{\alpha \in \phi(R,K)}[\langle\gamma^*(\alpha)\rangle]. \quad (3.17)$$

Since $\gamma^*$ is the optimal solution to (3.13) then the inequalities in (3.16) and (3.17) become equalities and hence $\tilde{\gamma}$ is also an optimal solution.

Since outage is minimized with respect to both a peak and average power constraint, there will be a subset of the outage region for which outage cannot be prevented even if the peak power is used in each of the K blocks in the codeword. Denote this region by $$G(P_p) = \left\{\underline{\alpha} : \frac{1}{K}\sum_{k=0}^{K-1} \log(1 + \alpha_k P_p) < R\right\} \quad (3.18)$$

and note that it is a subset of the outage region, $G(P_p) \subset \phi(R, K)$. Using this definition, two sets of fading states are defined $$R(s) = \{\underline{\alpha} \notin G(P_p) : \langle\tilde{\gamma}(\underline{\alpha})\rangle < s\} \quad (3.19)$$

and $$\overline{R}(s) = \{(\underline{\alpha} \notin G(P_p) : \langle\tilde{\gamma}(\underline{\alpha})\rangle \leq s\} \quad (3.20)$$

that are differentiated by the average power allocated for each fading state using power allocation policy $\tilde{\gamma}$. The corresponding average power over these sets are $$P(s) = \int_{R(s)} \langle\tilde{\gamma}(\alpha)\rangle dF(\alpha) \quad (3.21)$$

and $$\overline{P}(s) = \int_{\overline{R}(s)} \langle\tilde{\gamma}(\alpha)\rangle dF(\alpha) \quad (3.22)$$

Then by Lemma 3 in the optimal power allocation policy under the peak and long-term average power constraints for all $\alpha \notin G(P_p)$ is $$\tilde{\gamma}^{lt}(\underline{\alpha}) = \begin{cases} \tilde{\gamma}(\underline{\alpha}), & w/prob\ 1 & \text{if } \langle\tilde{\gamma}(\underline{\alpha})\rangle < s^* \\ \tilde{\gamma}(\underline{\alpha}), & w/prob\ w^* & \text{if } \langle\tilde{\gamma}(\underline{\alpha})\rangle = s^* \\ 0, & w/prob\ (1-w^*) & \text{if } \langle\tilde{\gamma}(\underline{\alpha})\rangle = s^* \\ 0, & w/prob\ 1 & \text{if } \langle\tilde{\gamma}(\underline{\alpha})\rangle > s^* \end{cases} \quad (3.23)$$

where $$s^* = \sup\{s : P(s) < P_{av}\} \quad (3.24)$$

and $$w^* = \frac{P_{av} - P(s^*)}{\overline{P}(s^*) - P(s^*)}. \quad (3.25)$$

The form of $\tilde{\gamma}$, the power allocation policy that prevents outage with minimum power, can be determined by solving $$\min_\gamma\left\{\frac{1}{K}\sum_{k=0}^{K-1}\gamma_k : \frac{1}{K}\sum_{k=0}^{K-1}\log(1+\alpha_k\gamma_k) = R,\ 0 \leq \gamma_k \leq P_p\right\} \quad (3.26)$$

Setting up the functional $$L = \frac{1}{K}\sum_{k=0}^{K-1}\gamma k - \sum_{k=0}^{K-1}\psi k \gamma k + \quad (3.27)$$

-continued $$\sum_{k=0}^{K-1} \mu_k(\gamma_k - P_p) + v\left(\frac{\sum_{k=0}^{K-1} \log(1 + \alpha_k \gamma_k)}{K} - R\right)$$

and realizing that a convex objective function and convex set of feasible points are obtained implies that the globally optimal power allocation strategy $\tilde{\gamma}$, and the associated $\tilde{\psi}_k$, $\tilde{\mu}_k$ and $\tilde{v}$, satisfy the KKT conditions $$\tilde{\gamma}_k \geq 0 \qquad (3.28a)$$

$$\tilde{\gamma}_k \leq P_p \qquad (3.28b)$$

$$\frac{1}{K}\sum_{k=0}^{K-1} \log(1 + \alpha_k \tilde{\gamma}_k) = R \qquad (3.28c)$$

$$\tilde{\psi}_k \geq 0 \qquad (3.28d)$$

$$\tilde{\mu}_k \geq 0 \qquad (3.28e)$$

$$\tilde{\psi}_k \tilde{\gamma}_k = 0 \qquad (3.28f)$$

$$\tilde{\mu}_k(\tilde{\gamma}_k - P_p) = 0 \qquad (3.28g)$$

$$\frac{\partial L}{\partial \tilde{\gamma}_k} = \frac{1}{K} - \tilde{\psi}_k + \tilde{\mu}_k + \frac{\tilde{v}}{K}\frac{\alpha_k}{1 + \alpha_k \tilde{\gamma}_k} = 0 \qquad (3.28h)$$

with (3.28a-3.28h) corresponding to (3.6a-3.6h). A solution of the form $$\tilde{\gamma}_k(\alpha) = \min\left(\max\left(\tilde{\lambda}^{lt}(\alpha) - \frac{1}{\alpha_k}, 0\right), P_p\right) \qquad (3.29)$$

with $\tilde{\lambda}^{lt}(\alpha) = -\tilde{v}$ as the solution to $$\frac{1}{K}\sum_{k=0}^{K-1} \log\left[1 + \alpha_k \min\left(\max\left(\tilde{\lambda}^{lt}(\alpha) - \frac{1}{\alpha_k}, 0\right), P_p\right)\right] = R, \qquad (3.30)$$

satisfies (3.28b-3.28h) and is therefore the power allocation policy that prevents outage with minimum power. Therefore $\tilde{\gamma}^{lt}$ is the power allocation strategy that minimizes outage probability under a peak and long-term average power constraint. □

As with the short-term case the optimal solution has three regions A constant power allocation of $$\lambda^{lt}(\alpha) - \frac{1}{\alpha_k} \geq P_p.$$

is used when $\lambda^{lt}(\alpha) - 1/\alpha_k \geq P_p$. The waterfilling solution $$\lambda^{lt}(\alpha) - \frac{1}{\alpha_k} \geq P_p \tilde{\gamma}_k^{lt}(\alpha) = \lambda^{lt}(\alpha) - \frac{1}{\alpha_k}$$

is applied when $$0 < \lambda^{lt}(\alpha) - \frac{1}{\alpha_k} < P_p.$$

Finally, no power is allocated, $$\tilde{\gamma}_k^{lt}(\alpha) = 0, \text{ when } 0 > \lambda^{lt}(\alpha) - \frac{1}{\alpha_k'}.$$

The implementation of this transmission scheme is relatively simple. The receiver relays the condition of the channel $\alpha$ back to the transmitter. For the desired transmission rate R if $\alpha \in G(P_p)$ then outage is immediately declared. If $\alpha \notin G(P_p)$, then the transmitter encodes the codeword at rate R with power allocation $\tilde{\gamma}(\alpha)$ and if $\langle\tilde{\gamma}(\alpha)\rangle > s^*$ an outage is again declared. In the cases where $\langle\tilde{\gamma}(\alpha)\rangle < s^*$ and $\langle\tilde{\gamma}(\alpha)\rangle = s^*$, the codeword is transmitted with probability 1 and w*, respectively.

3.3 Simulation Results

Figure 3A:
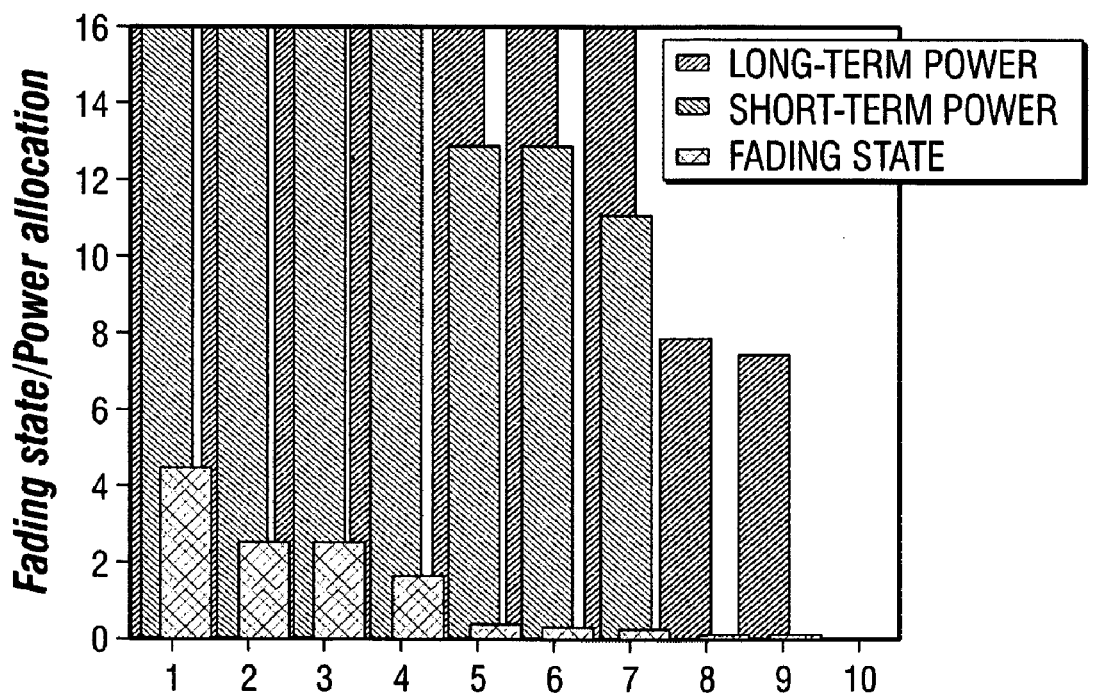
FIG. 3A shows a graph of fading state/power allocation vs. block index.

Shown in FIG. 3A is the power allocated for a particular channel $\alpha$ under a peak power constraint of 12 dB and short-term and long-term average power constraints of 10 dB for a transmission rate of 2 nats/sec/Hz. For this $\alpha$ both situations require the power allocated in several of the blocks to reach the peak power. However, under the short-term power constraint, the average power in the codeword must not exceed $P_{av}$ and therefore several of the blocks in the codeword are allocated no power. As a result an outage is unavoidable for this $\alpha$. Under the long-term power constraint, since the average power in the codeword can exceed $P_{av}$, enough power is allocated to prevent outage.

Figure 3B:
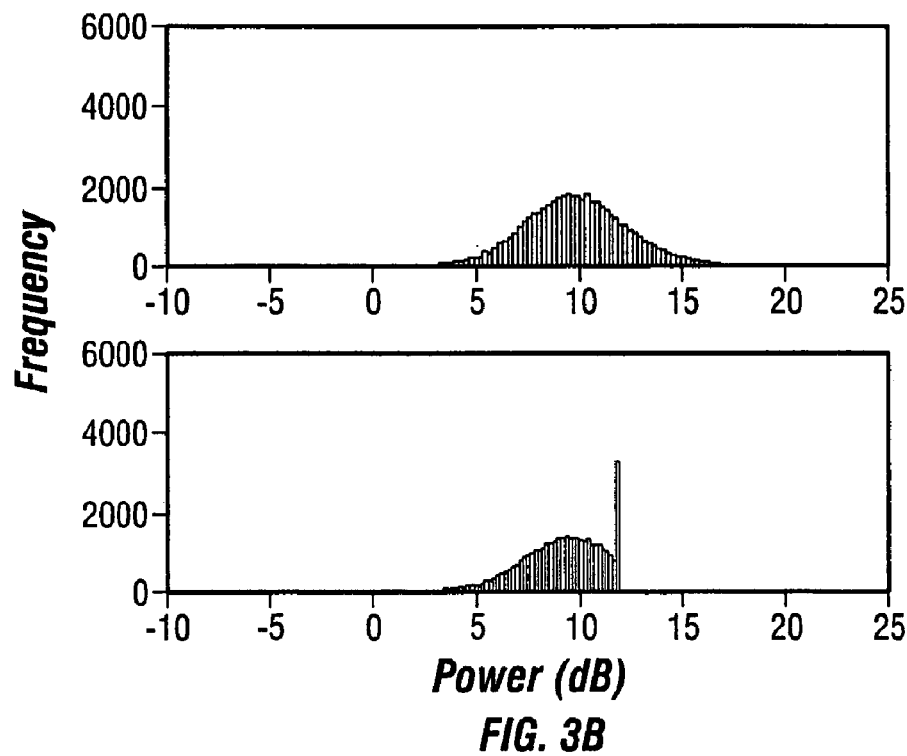
FIG. 3B shows histograms of transmitted power for a rate R of 2 nats/sec/HZ, K=5, a long-term average power constraint Pav of 10 dB and the transmission of 10000 codewords.
Figure 3C:
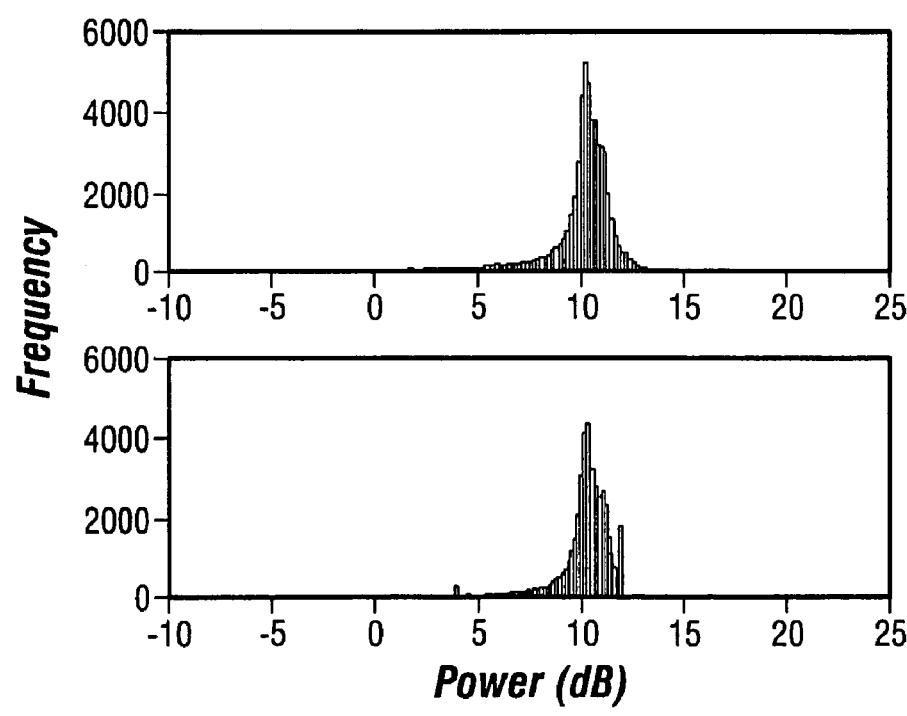
FIG. 3C shows histograms of transmitted power for R=2 nats/sec/Hz, K=5, Pav=10 dB, and the transmission of 10000 codewords.

For a fixed transmission rate the power allocated under the long-term average power constraint tends to have a larger variance than that allocated under the short-term average power constraint. This is due to the fact that the average power for any particular codeword under the long-term average power constraint can exceed $P_{av}$, while it cannot under the short-term average power constraint. The larger variance results in a larger portion of the transmitted signal exceeding the peak power constraint were it present. Therefore, when a peak power constraint is additionally imposed, the transmitted signal under the long-term average power constraint is affected to a greater degree. This can be seen in FIG. 3B and FIG. 3C, which illustrates histograms of the allocated power for 10,000 transmitted codewords both with and without a peak power constraint. Clearly, when the additional peak power constraint is imposed the power allocation distribution changes significantly under the long-term average power constraint.

Figure 3D:
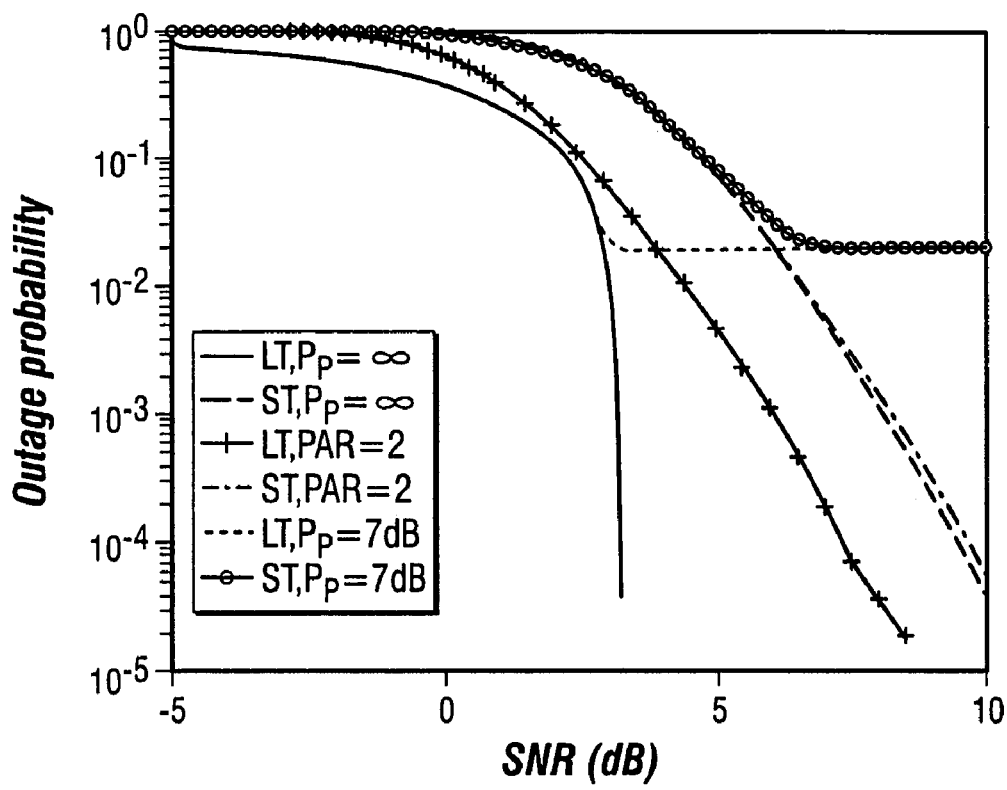
FIG. 3D shows a graph of minimum outage probability vs. average power for R=1 nats/sec/Hz.

Imposing a peak power constraint limits the ability of a communications system to ensure reliable communication. That is, when a peak power constraint is imposed in addition to an average power constraint, the outage probability will be higher than if only an average power constraint is present. FIG. 3D plots the outage probability vs. $P_{av}$ for a fixed transmission rate. It is seen that with only an average power constraint a lower outage probability is achievable for the same average power under the long-term constraint than under the short-term constraint. However, the performance difference shrinks greatly when a peak power constraint is also imposed. For a fixed PAR, under both the short-term and long-term average power scenarios the outage probability is much higher with the peak power constraint than without. However, it is seen that the short-term average power constraint is affected to a lesser degree. This occurs because the variance is higher under the long-term power scenario making it more susceptible to the peak power constraint. For a fixed $P_p$ the outage probability curve plateaus as $P_{av}$ increases. The closer $P_{av}$ is to $P_p$, the larger the performance degradation. It is seen that the long-term average power scenario plateau's for a smaller $P_{av}$ than the short-term average power scenario, illustrating its sensitivity to the peak- power constraint.

FIG. 3D plots outage probability as a function of R for a fixed $P_{av}$. Here again it is seen that when an additional peak power constraint is imposed, the outage probability increases For large values of R and/or small values of $P_p$ the outage probability is higher than without a peak power constraint, This is most clearly seen for the long-term power scenario with a peak power of $P_p$=16 dB. For R<3.5 nats/sec/Hz the outage probability is nearly the same as that achieved without a peak constraint, since R is relatively small and the power required for any channel state is rarely limited by the peak power constraint For R>3.5 nats/sec/Hz, the outage probability is higher than that achieved without a peak constraint, since the power required for any channel state is often limited by the peak power constraint.

Figure 3E:
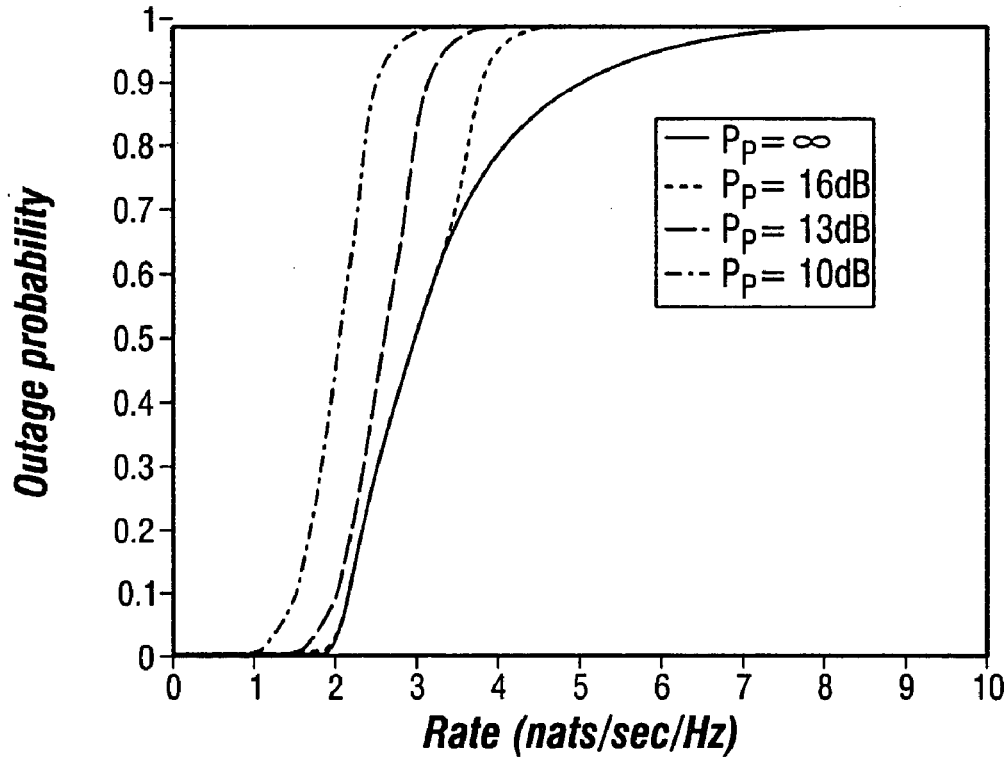
FIG. 3E shows a graph of minimum outage probability vs. R for a long-term power constraint of Pav=10 dB.
Figure 3F:
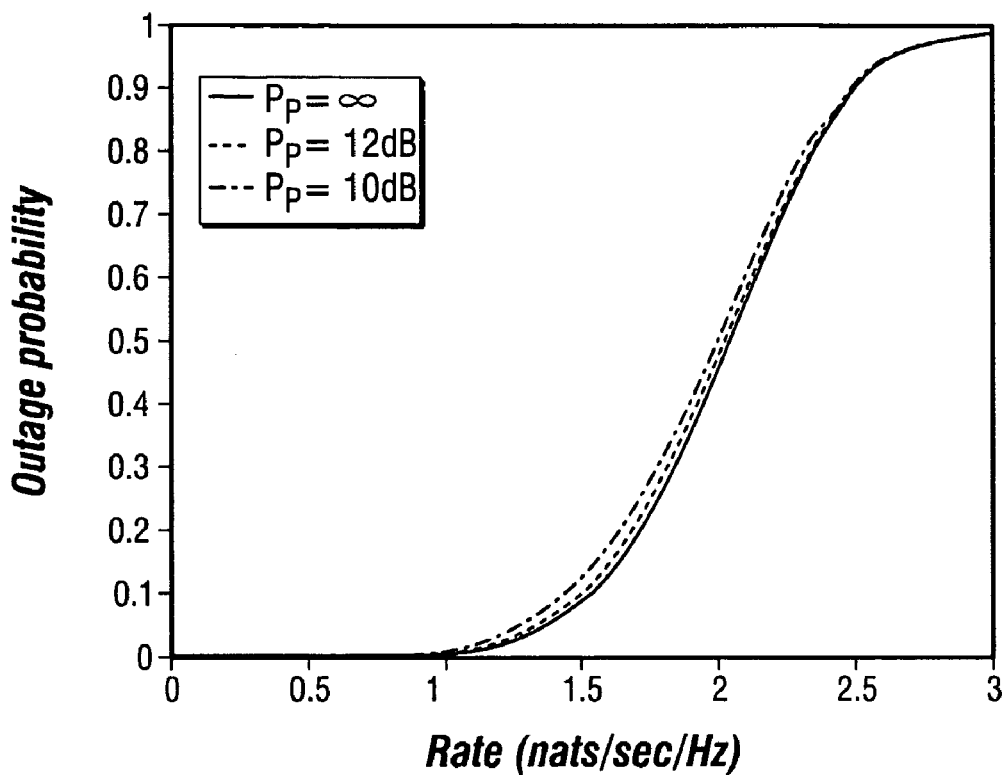
FIG. 3F shows a graph of minimum outage probability vs. R for a short-term power constraint of Pav=10 dB.

FIG. 3F plots results analogous to FIG. 3E except under the short-term average and peak power constraints. The outage probability under both peak and average power constraints is again larger than only under the average power constraint. However, as expected, the performance loss is not as pronounced as under the long-term power constraint.

4. Throughput Maximization with Optimal Rate Selection and Power Control

The scenario in which both the transmitter and receiver have CSI is considered. When this occurs the transmitter knows prior to transmission if an outage will occur. Scheme DT is proposed which delays transmission until the channel condition allows successful decoding at the receiver. Also, since the transmitter knows the condition of the channel it can vary the transmit power accordingly. The average throughput is now maximized by optimally selecting the transmission rate and power control strategy.

For scheme DT the outage probabilities are independent from one transmission attempt to the next, due to the fact that the channel states are assumed i.i.d. in the BF-AWGN model. As such the service time distribution, the probability that it will take s attempts for successful transmission, is $$\text{Prob}(S=s) = [P_{out}(R, \gamma, K)]^{s-1}[1 - P_{out}(R, \gamma, K)] \quad (4.1)$$

for transmission rate R, coding delay K and power allocation policy $\gamma$. This implies that the service time distribution is geometric on the positive integers with parameter $[1 - P_{out}(R, \gamma, K)]$. Then $$\mathbb{E}[S] = \frac{1}{1 - P_{out}(R, \gamma, K)} \quad (4.2)$$

is the expected service time.

Using the form of the expected service time and the fact that throughput is the transmission rate over the expected service time, it is defined $$MZT_{DT}(P_{av}, K, P_p) = \sup_R \sup_\gamma \{R[1 - P_{out}(R, \gamma, K)] : \gamma \in O_K\} \quad (4.3)$$

as the maximum zero-outage throughput with scheme DT for a system with coding delay K, average transmit power $P_{av}$ and peak transmit power $P_p$. $MZT_{DT}(P_{av}, K)$ is denoted as the maximum throughput without a peak power constraint or when $P_p = \infty$.

$MZT_{DT}$ is found by minimizing the outage probability for a given transmission rate and then taking the supremum over all transmission rates. Here the power allocation policy $\gamma$ belongs to $O_K$ which can represent any one of $O_K^{st}(P_{av})$, $O_K^{lt}(P_{av})$, $O_K^{st}(P_{av}, P_p)$ or $O_K^{lt}(P_{av}, P_p)$. For any transmission rate R there is an associated minimum outage probability $\epsilon$ that is achieved by using the appropriate outage minimizing power allocation strategy. Then, $MZT_{DT}$ can be thought of as selecting the throughput maximizing $(R, \epsilon)$ pair. For each power constraint, codewords are encoded using the optimal transmission rate that is the maximizer of (4.3) and power is allocated using the appropriate outage minimizing power allocation strategy. If the transmission rate is larger than the instantaneous capacity, then an outage is declared and the transmission of the codeword is delayed.

Communications performance in fading channels has been quantified historically by $\epsilon$-capacity. Typically the target outage probability is fixed to a small value such as $\epsilon = 0.01$. In practice it may be better from a throughput perspective not to fix the target outage probability. This is illustrated in Theorem 4.0.1.

Theorem 4.0.1. $MZT_{DT}$ is always greater than or equal to the throughput achieved by transmitting at $\epsilon$-capacity.

Proof. For a fixed outage probability $\epsilon$, the $\epsilon$-capacity $$C_\epsilon^{pc} := \sup_R \sup_\gamma \{R : P_{out}(R, \gamma, K) \leq \epsilon, \gamma \in O_K\} \quad (4.4)$$

is found by optimally selecting R and $\gamma$ with $O_K \in \{O_K^{st}(P_{av}), O_K^{lt}(P_{av}) \, O_K^{st}(P_{av}, P_p), O_K^{lt}(P_{av}, P_p)\}$. For the outage minimizing power allocation strategy, every transmission rate $R = C_\epsilon^{pc}$ corresponds to a minimum outage probability $\epsilon$. Conversely, this means every outage probability $\epsilon$ corresponds to a throughput maximizing transmission rate $R = C_\epsilon^{pc}$. Transmitting at $R = C_\epsilon^{pc}$ results in a throughput $$T_\epsilon = C_\epsilon^{pc}(1 - \epsilon). \quad (4.5)$$

Therefore (4.5) is a single point on the curve $$T_{DT}(R) = R[1 - P_{out}(R, \gamma^*, K)] \quad (4.6)$$

with $P_{out}(R, \gamma^*, K)$ the minimum outage probability that achievable for transmission rate R and coding delay K. Since $$MZT_{DT} = \sup_{R} \{T_{DT}(R)\} \qquad (4.7)$$

$$MZT_{DT} > T_c, \qquad (4.8)$$

is obtained, completing the proof. □

Corollary 4.0.2. $MZT_{DT}$ is always greater than or equal to the throughput achieved by transmitting at delay-limited capacity.

Proof. This is trivially shown by setting $\epsilon = 0$ and applying Theorem 4.0.1. □

Corollary 4.0.2 illustrates the power of the multi-attempt approach for delay-limited systems. For the same coding delay K a higher throughput is achieved by allowing multiple, rather than a single, transmission attempts per codeword. That is, $MZT_{DT}$ is larger delay-limited capacity ($T_c|_{c=0}$). The cost of the improved throughput is a queueing delay that is not present if the system is restricted to a single transmission attempt per codeword.

4.1 Maximum Zero-Outage Throughput with Scheme DT ($MZT_{DT}$) Under Different Power Constraints $MZT_{DT}$ is now examined under the short-term average and long-term average power constraints both with and without an additional peak power constraint. For each power constraint either $O_K^{st}(P_{av})$, $O_K^{lt}(P_{av})$, $O_K^{st}(P_{av}, P_p)$ or $O_K^{lt}(P_{av}, P_p)$ is substituted for $O_K(P_{av}, P_p)$ in (4.3). Then using the form of the outage minimizing power allocation strategy, (4.3) can be reduced to an optimization problem of only a single variable, the transmission rate R.

Theorem 4.1.1. The maximum zero-outage throughput with the delayed transmission scheme under the short-term average power constraint is $$MZT_{DT}^{st}(P_{av}, K) = \qquad (4.9)$$
$$\sup_{R} \left( R \mathbb{E}_{\underline{\alpha}} \left\{ I_F \left[ R \leq \frac{1}{K} \log \left( 1 + \alpha_k \ \max\left\{ \lambda^{st}(\underline{\alpha}) - \frac{1}{\alpha_k}, 0 \right\} \right) \right] \right\} \right)$$

with $\lambda^{st}(\alpha)$ as the solution to $$\sum_{k=0}^{K-1} \max\left( \lambda^{st}(\underline{\alpha}) - \frac{1}{\alpha_k}, 0 \right) = K P_{av}. \qquad (4.10)$$

Theorem 4.1.2. The maximum zero-outage throughput with the delayed transmission scheme under both the short-term average and peak power constraints is $$MZT_{DT}^{st}(P_{av}, K, P_p) = \qquad (4.11)$$
$$\begin{cases} \sup_{R} \left( R \mathbb{E}_{\underline{\alpha}} \left\{ I_F \left[ R \leq \frac{\log(1 + \alpha_k \xi)}{K} \right] \right\} \right) & \text{if } P_p > P_{av} \\ \sup_{R} \left( R \mathbb{E}_{\underline{\alpha}} \left\{ I_F \left[ R \leq \frac{\log(1 + \alpha_k P_p)}{K} \right] \right\} \right) & \text{if } P_p \leq P_{av} \end{cases}$$

with $$\xi = \min\left\{ \max\left[ \tilde{\lambda}^{st}(\underline{\alpha}) - \frac{1}{\alpha_k}, 0 \right], P_p \right\}$$

as the solution to $$\sum_{k=0}^{K-1} \min\left( \max\left( \tilde{\lambda}^{st}(\underline{\alpha}) - \frac{1}{\alpha_k}, 0 \right), P_p \right) = K P_{av}. \qquad (4.12)$$

Theorem 4.1.3. The maximum zero-outage throughput with the delayed transmission scheme under the long-term average power constraint is $$MZT_{DT}^{lt}(P_{av}, K) = \qquad (4.13)$$
$$\sup_{R} \left\{ R \left[ \mathbb{E}_{\underline{\alpha}} \left\{ I_F \left( \frac{1}{K} \sum_{k=0}^{K-1} \max\left( \lambda^{lt}(\underline{\alpha}) - \frac{1}{\alpha_k}, 0 \right) < s^* \right) \right\} + w^* \mathbb{E}_{\underline{\alpha}} \left\{ I_F \left( \frac{1}{K} \sum_{k=0}^{K-1} \max\left( \lambda^{lt}(\underline{\alpha}) - \frac{1}{\alpha_k}, 0 \right) = s^* \right) \right\} \right] \right\}$$

with $\lambda^{lt}(\alpha)$ as the solution to $$\frac{1}{K} \sum_{k=0}^{K-1} \log\left[ 1 + \alpha_k \ \max\left( \lambda^{lt}(\underline{\alpha}) - \frac{1}{\alpha_k}, 0 \right) \right] = R, \qquad (4.14)$$

Theorem 4.1.4. The maximum zero-outage throughput with the delayed transmission scheme under both the long-term average and peak power constraints is $$MZT_{DT}^{lt}(P_{av}, K, P_p) = \qquad (4.15)$$
$$\sup_{\gamma} \{ R[\mathbb{E}_{\underline{\alpha}} \{ I_F(\underline{\alpha} \notin G_p) \}][\mathbb{E}_{\underline{\alpha}} \{ I_F(K < S^*) \} + w^* \mathbb{E}_{\underline{\alpha}} \{ I_F(K = S^*) \}] \}$$

with $\kappa = 1/K \sum_{K=0}^{K-1} \min[\max(\lambda^{lt}(\alpha) - 1/\alpha_k, 0), P_p]$ and $\tilde{\lambda}^{lt}(\alpha)$ as the solution to $$\frac{1}{K} \sum_{k=0}^{K-1} \log\left[ 1 + \alpha_k \ \min\left( \max\left( \tilde{\lambda}^{lt}(\underline{\alpha}) - \frac{1}{\alpha_k}, 0 \right), P_p \right) \right] = R, \qquad (4.16)$$

For each power constraint, codewords are encoded using the optimal transmission rates that are the optimizers to (4.1.1), (4.1.2), (4.1.3) and (4.1.4), respectively. Using the appropriate outage minimizing power allocation strategy if the transmission rate is larger than the instantaneous capacity then an outage is declared and transmission of the codeword delayed until a more favorable channel state arises.

4.2 Special cases of $MZT_{DT}$

Since the form of the outage minimizing power allocation policies are complicated functions of the channel state α, the expression for $MZT_{DT}$ are even more complex. However, for K=1 and a $\chi_2^2$ fading process more explicit expressions for three of the four power allocation scenarios have been found.

For the short-term average power constraint it is possible to find the optimal transmission rate and the maximum throughput.

Theorem 4.2.1. If K=1 and the fading process $\alpha$ follows a $\chi_2^2$ distribution, then $$MZT_{DT}^{st}(P_{av}, 1) = W(P_{av})e^{-\left(\frac{e^{W(P_{av})}-1}{P_{av}}\right)} \qquad (4.17)$$

Proof. Since K=1 and the entire codeword spans a single block of the BF-AWGN channel, the outage minimizing power allocation is to use all the power $P_{av}$ within the codeword. In this case the solution is the same as constant power allocation when K=1.

If $\alpha$ follows a $\chi_2^2$ distribution, then $$1 - P_{out}(R, P_{av}, 1) = e^{-\left(\frac{e^R-1}{P_{av}}\right)}.$$

Using this, $$T(R) = Re^{-\left(\frac{e^R-1}{P_{av}}\right)}.$$

Taking the derivative with respect to R and equating with zero, it is seen that transmission corresponding to the critical point is the solution to $Re^R = P_{av}$. The solution to this is the optimal transmission rate $R^* = W(P_{av})$. Substituting this back into T(R) (4.17) is obtained. From Theorem 2.1.1 and Proposition 2.1.2 it is known that this solution corresponds to a unique maximum. From Theorem 2.1.1 and Proposition 2.1.2 it is known that this solution corresponds to a unique maximum. □

When a peak power constraint is imposed in addition to the short-term average power constraint a similar result is obtained.

Theorem 4.2.2. If K=1 and the channel fading $\alpha$ follows a $\chi_2^2$ distribution, then $$MZT_{DT}^{st}(P_{av}, 1, P_p) = W(\gamma)e^{-\left(\frac{e^{W(\gamma)}-1}{\gamma}\right)} \qquad (4.18)$$

with $$\gamma = \min(P_{av}, P_p) \qquad (4.19)$$

Proof. If K=1 and the entire codeword spans a single block of the fading channel and is affected by only a single channel fade. The situation is then the same as constant power allocation. The instantaneous capacity is maximized by allocating the maximum allowable power to the codeword, which is $$\gamma = \min(P_{av}, P_p) \qquad (4.20)$$

Then, by the procedure of Theorem 4.2.1, the optimal transmission rate is $R^* = W(\gamma)$ and (4.18) is obtained. □

Finally, in the case of a long-term average power constraint it is possible to find sufficient conditions that the optimal transmission rate $R^{lt}$ and optimal power cutoff $s_{R^{lt}}^*$ satisfy.

Theorem 4.2.3. If K=1 and the channel gains follow a $\chi_2^2$ distribution, then $$e^{R^{lt}} E_i\left(1, \frac{e^{R^{lt}}-1}{s_{R^{lt}}^*}\right) = P_{av}, \qquad (4.21)$$

$$(s_{R^{lt}}^*)^2 - P_{av} R^{lt} e^{R^{lt}} e^{\left(\frac{e^{R^{lt}}-1}{s^* R^{lt}}\right)} = 0 \qquad (4.22)$$

where $$E_i(1, x) = \int_1^\infty \frac{e^{-xt}}{t} dt$$

are sufficient conditions that $R^{lt}$ and $s_{R^{lt}}^*$ satisfy.

Proof. Condition (4.21) is a sufficient condition for the optimal power cutoff $s_{R^{lt}}^*$. It is obtained by finding the optimal short-term cutoff for the optimal transmission rate $R^{lt}$. That is, finding the s such that $P_1(s) = P_{av}$.

Condition (4.22) is also a sufficient condition that the optimal transmission rate $R^{lt}$ and power cutoff $s_{R^{lt}}^*$ satisfy. For transmission rate R and cutoff $s_R$, $$P_{out}(R, P_{av}, 1) = 1 - e^{-\left(\frac{e^R-1}{s_R}\right)}$$

is used which permits defining $$T(R) = Re^{-\left(\frac{e^R-1}{P_{av}}\right)}.$$

Taking the derivative $$\frac{d[T(R)]}{dR}$$

and setting to 0, it is seen that $$s_R + R\left(\frac{e^R-1}{s}\right)\frac{d(s_R)}{dR} - Re^R = 0. \qquad (4.23)$$

By letting $g(s, R) = P_1(s) - P_{av}$ and performing implicit differentiation $$\frac{ds_R}{dR} = -\frac{\frac{ds}{dR}}{\frac{ds}{ds_R}}$$

it is determined that $$\frac{ds_R}{dR} = \frac{-e^R[E_i(1, x) - xE_i(0, x)]}{x^2 E_i(0, x)} \quad (4.24)$$

where $$x = \frac{e^R - 1}{s_R} \text{ and } E_i(0, x) = e^{-xt}dt.$$

Substituting this back into (4.23) and setting $s_R = s_{R^{lt}}^*$, it is determined that (4.22). □

4.3 Examples and Discussion $MZT_{DT}$ quantifies the maximum throughput achievable with scheme DT. As is the case for constant power transmission, the benefit of allowing multiple (rather than a single) transmission attempts per codeword, with rate selection and power control, is an increased throughput for the same coding delay. In this section, this concept is illustrated for the $\chi_2^2$ fading process.

4.3.1 Increased Throughput with the Multi-Attempt Approach

Within the single-attempt paradigm the need for a measure of zero-outage (error-free) communication performance for delay-limited systems led to the notion of delay-limited capacity, or $\epsilon$-capacity with $\epsilon=0$. When only a single transmission attempt is allowed, the transmission rate R must be supported on all possible $\alpha$. Thus, delay-limited capacity quantifies the error-free data rate that can be supported over all $\alpha$ in the support of the fading process.

Figure 4A:
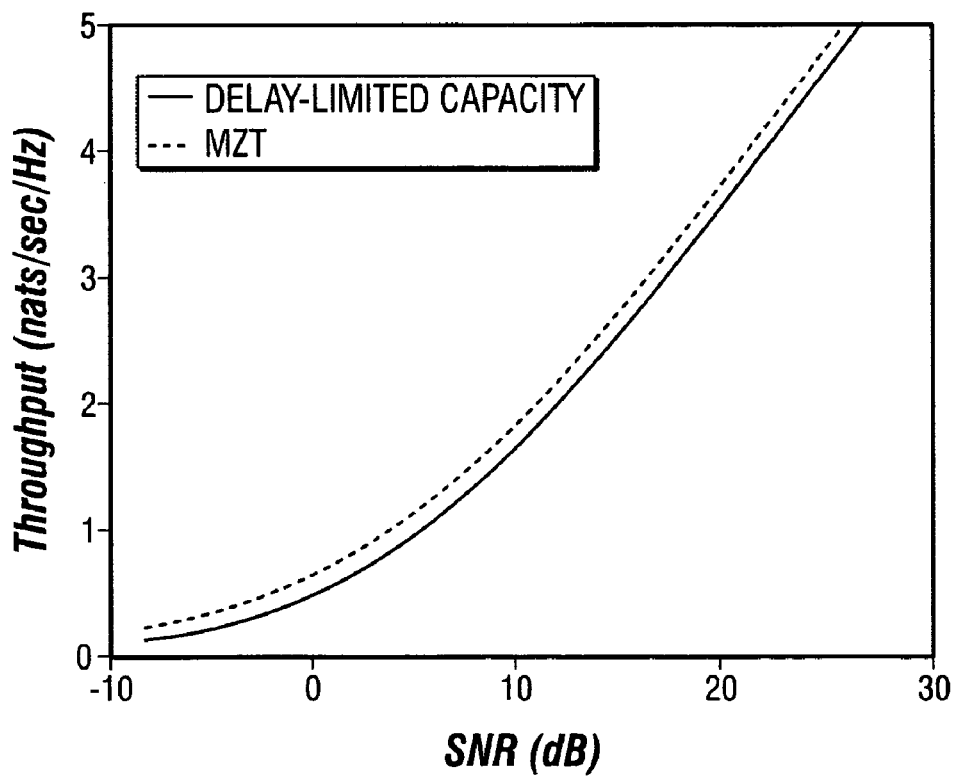
FIG. 4A shows a graph of delay-limited capacity and throughput for K=2 vs. SNR.

With CSI-RT, delay-limited capacity is always 0 for $\chi_2^2$ fading when K=1. However, when K>1 non-zero delay-limited capacity is possible. FIG. 4A illustrates $MZT_{DT}^{lt}$ and delay-limited capacity as a function of $P_{av}$ for K 32 2, the smallest coding delay with non-zero delay-limited capacity. For the same coding delay, $MZT_{DT}^{lt}$ is higher than delay-limited capacity for all $P_{av}$. The performance benefits of the multi-attempt approach over the single-attempt approach is an increased throughput for the same coding delay.

4.3.2 Importance of Power Control

The conventional view about optimal power control is that it yields "a negligible [ergodic] capacity gain" over constant power transmission. This is quite evident when comparing $C_{erg}$ and $C_{erg-pc}$ as a function of $P_{av}$ in FIG. 1C. However, in FIG. 4B $MZT_{DT}$ is plotted as a function of $P_{av}$ with K=1 for the constant, short-term (equivalent to constant power allocation for K=1) and long-term power allocation strategies. Comparing $MZT_{DT}^{const}$ and $MZT_{DT}^{lt}$, it is seen that the difference between the curves is large for all $P_{av}$; power control is important for delay-limited systems. Therefore the original statement about optimal power control should be qualified: Power control provides negligible performance gains for delay-unconstrained systems, but for delay-limited systems the gains can be significant.

Figure 4B:
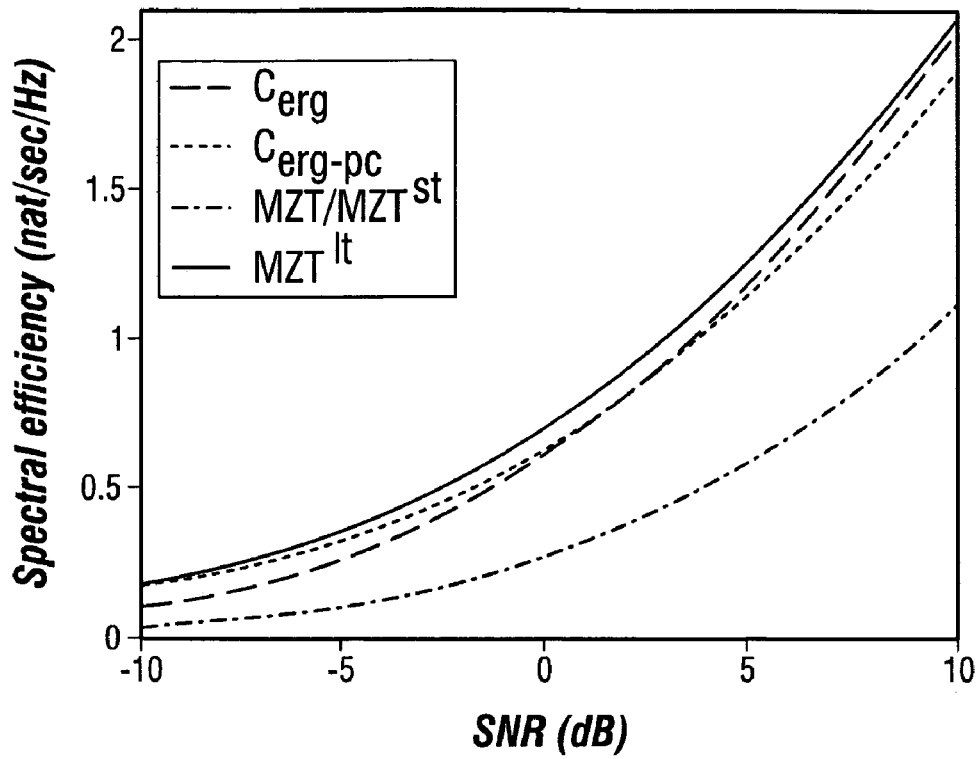
FIG. 4B shows a graph of spectral efficiency for K=1 as a function of SNR.
Figure 4C:
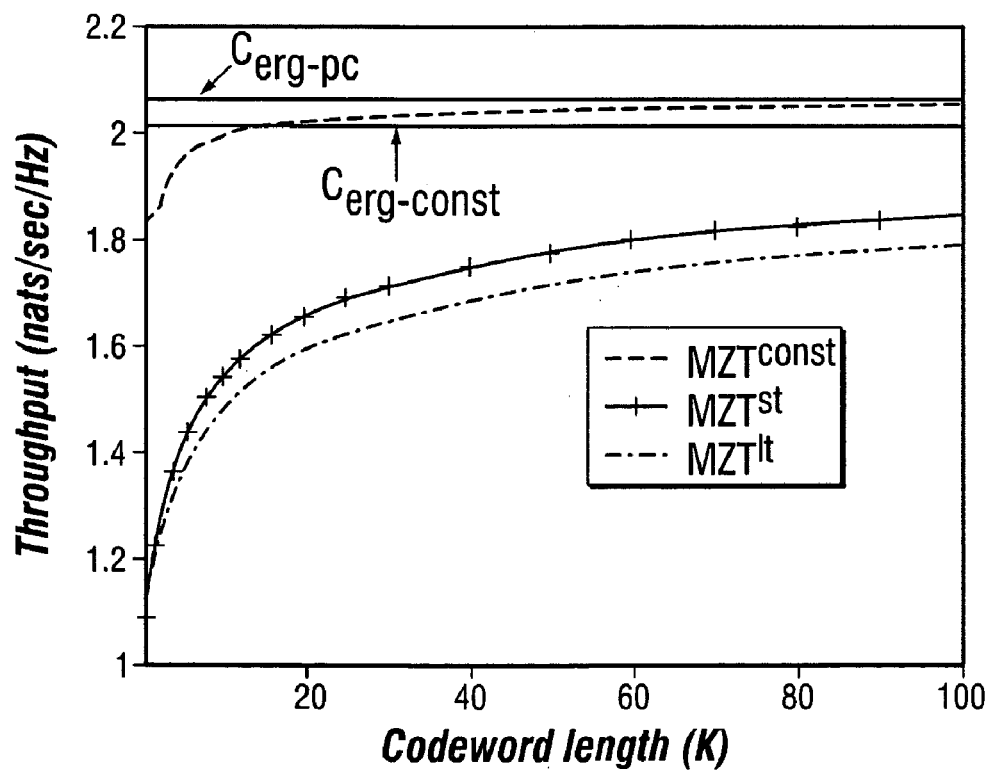
FIG. 4C shows a graph of MZT vs. K for constant, short-term and long-term power allocation strategies.

The importance of power control is again shown in FIG. 4C which plots $MZT_{DT}$ with $P_{av}$=10 dB By observing $MZT_{DT}^{lt}$ as a function of K, it is seen that the throughput, under scheme DT, with optimal rate and power control converges very quickly to ergodic capacity. In fact, $MZT_{DT}^{lt}$=2.00 nats/sec/Hz when K=10, is just slightly lower than $C_{erg-pc}$=2.07 nats/sec/Hz, achievable only when K=∞. Again, this illustrates that power control is more important than large coding delays for maximizing throughput. For example, a target throughput of 1 nat/sec/Hz is achieved with K=1 under the long-term average power constraint, but is not achievable even with K=100 for constant power transmission. It is also worth noting that the more relaxed the power constraint the higher the throughput, i.e., $MZT_{DT}^{const} \leq MZT_{DT}^{st} \leq MZT_{DT}^{lt}$. This relation holds for any coding delay K since the constant power allocation is a special case of the short-term power allocation which in turn is a special case of the long-term power allocation strategy.

To reemphasize the importance of power control FIG. 4B is examined. For K=1 and a throughput of 1 nat/sec/Hz, $MZT_{DT}^{lt}$ is only about 0.5 dB away from ergodic capacity with power control, $C_{erg-pc}$ for which K=∞. More surprisingly, for low SNR it is even greater than the ergodic capacity without constant power, $C_{erg-const}$. In this SNR region, a better average throughput is achieved, $MZT_{DT}^{lt}$ for K=1 with the delayed transmission scheme and power control than for K=∞ with constant power allocation and the single-attempt approach, $C_{erg-pc}$. This implies that optimal power control is more important than the number of fading states affecting each codeword (ergodicity).

4.3.3 Importance of Rate Selection

Figure 4D:
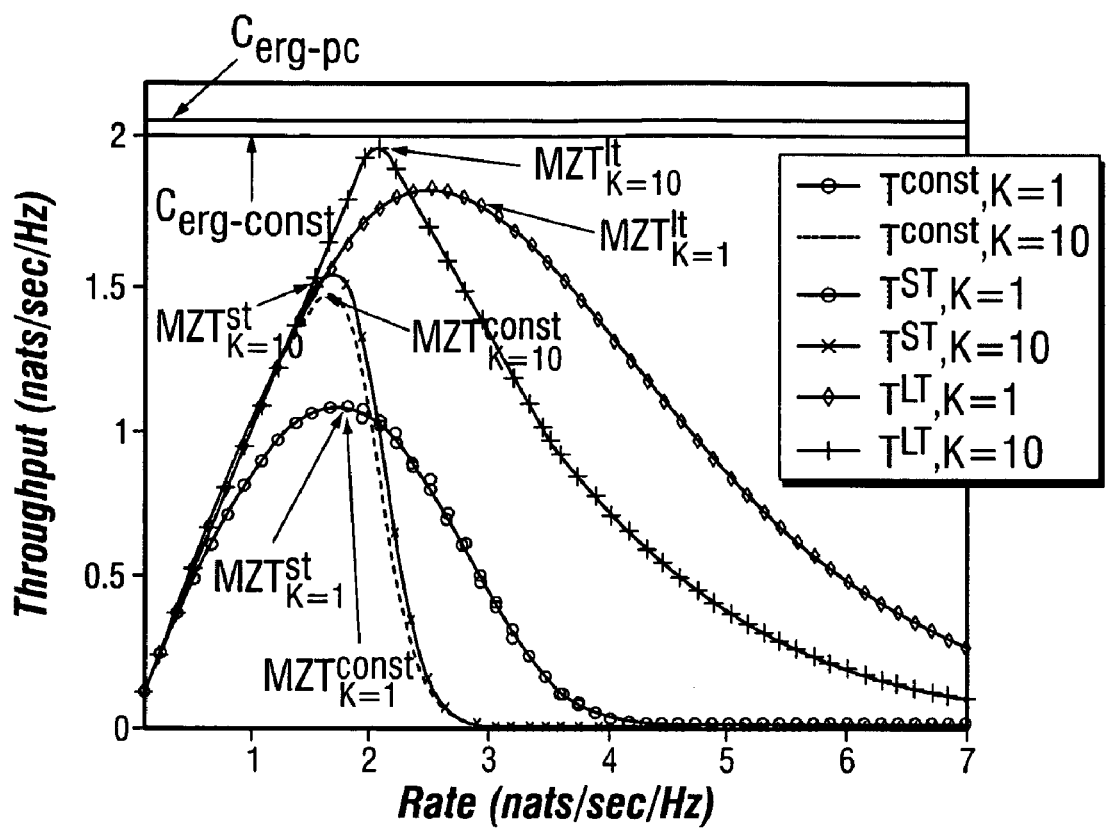
FIG. 4D shows a graph of throughput vs. transmission rate for various K and Pav=10 dB.

As is the case for constant power transmission, the simulation results for variable power transmission show that the transmission rate may be selected carefully in order to maximize throughput. Selecting a suboptimal transmission rate can result in a throughput much smaller than $MZT_{DT}$. This can be seen in FIG. 4D which plots the average throughput achieved with scheme DT as a function of transmission rate for the constant, short-term and long-term average power allocation strategies.

The peak of each curve corresponds to $MZT_{DT}$. It is also seen that the larger the coding delay K the larger the drop in throughput is if the optimal transmission rate is overshot. Therefore case must be taken to solve (4.3) and select the appropriate transmission rate for the power allocation policy at hand.

Figure 4E:
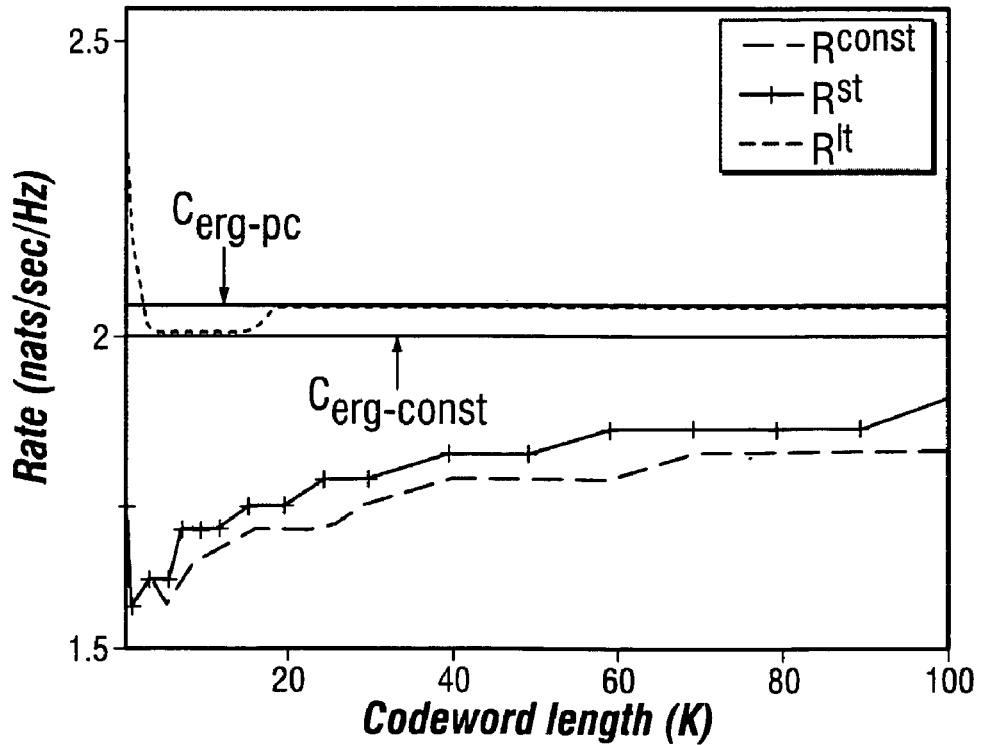
FIG. 4E shows a graph of optimal transmission rate vs. K for constant, short-term and long-term power allocation strategies.

FIG. 4E plots the optimal transmission rate, corresponding to $MZT_{DT}$, as a function of coding delay K. The optimal transmission rate, especially for small K, can fluctuate a great deal. In fact a very non-intuitive phenomenon is observed—in some cases, the optimal transmission rate can actually be higher than ergodic capacity. For example, when K=1 the optimal transmission rate under the long-term average power constraint, $R^{lt}$=2.51 nats/sec/Hz, is more than 21% higher than the ergodic capacity of the channel, $C_{erg-pc}$=2.07 nats/sec/Hz. This is counter to common practice, where a transmission rate lower than capacity is normally used. This is not a violation of the ergodic capacity theorem, since the resulting throughput is virtually always less than ergodic capacity.

Figure 4F:
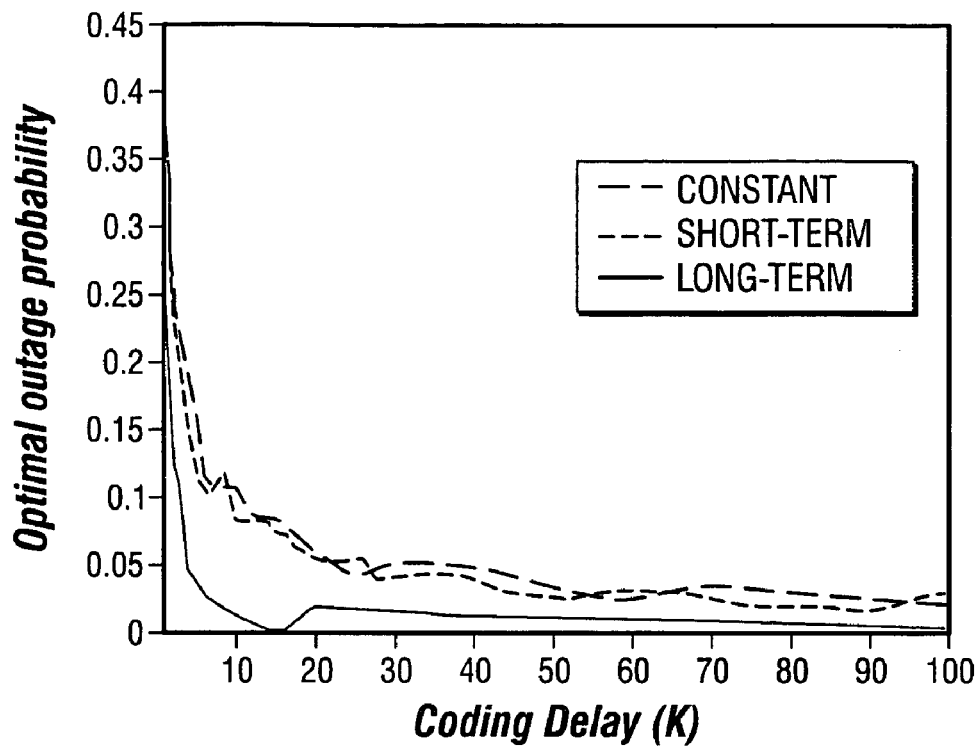
FIG. 4F shows a graph of optimal outage probability vs. K for Pav=10 dB.

For a given power allocation policy, either the transmission rate of the outage probability, but not both, can be freely selected since they depend on one another. FIG. 4F plots the outage probability associated with the optimal transmission rate. It is seen that the optimal outage probability can be substantially high as was shown for constant power transmission. In fact, for $P_{av}$=10 dB the optimal outage probability when K=1 is, 0.37 and 0.27 for the short-term and long-term average power constraints. This is interesting because it is counter to conventional practice; in most communication literature $\epsilon$-capacity is normally measured for a small outage probability such as $\epsilon$=0.01. However, it is seen that in order to maximize throughput the outage probability should be much higher.

4.3.4 Effect of a Peak Power Constraint

As discussed above, a peak power constraint can reduce the ability of a delay-limited communication system to prevent outage events, resulting in higher outage probabilities for the same transmission rate and average power. This will affect the $MZT_{DT}$ of the system as well. Here the effect of the peak power constraint on the long-term average power scenario is illustrated. Similar results, though to a lesser degree, can be observed for the short-term power scenario.

Figure 4G:
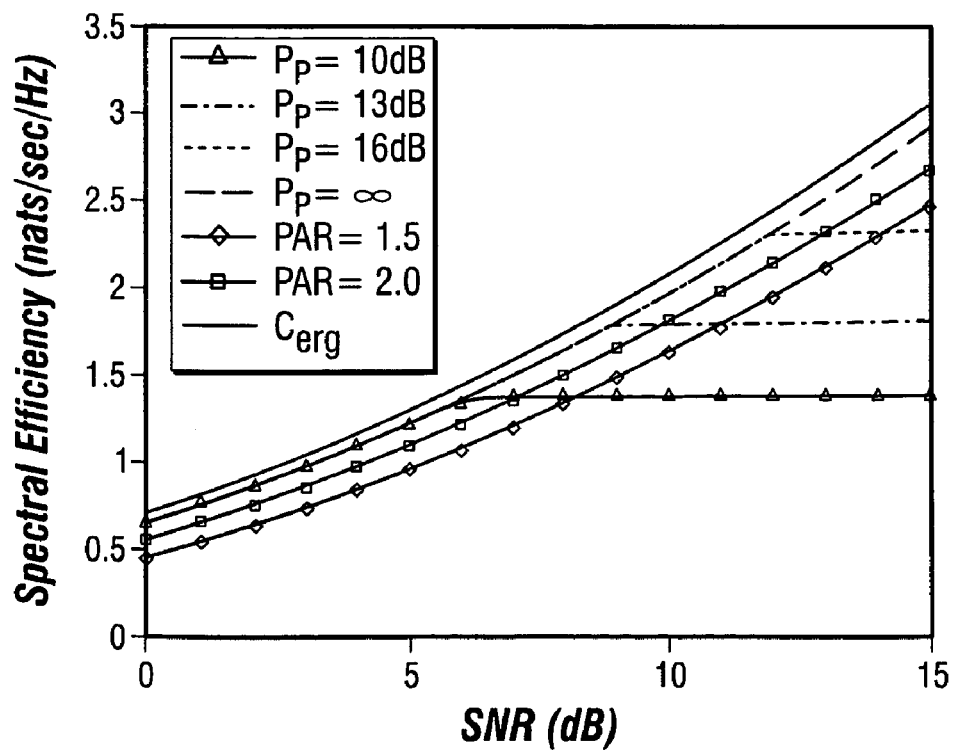
FIG. 4G shows a graph of MZT vs. Pav with K=5 for various values of peak power.
Figure 4H:
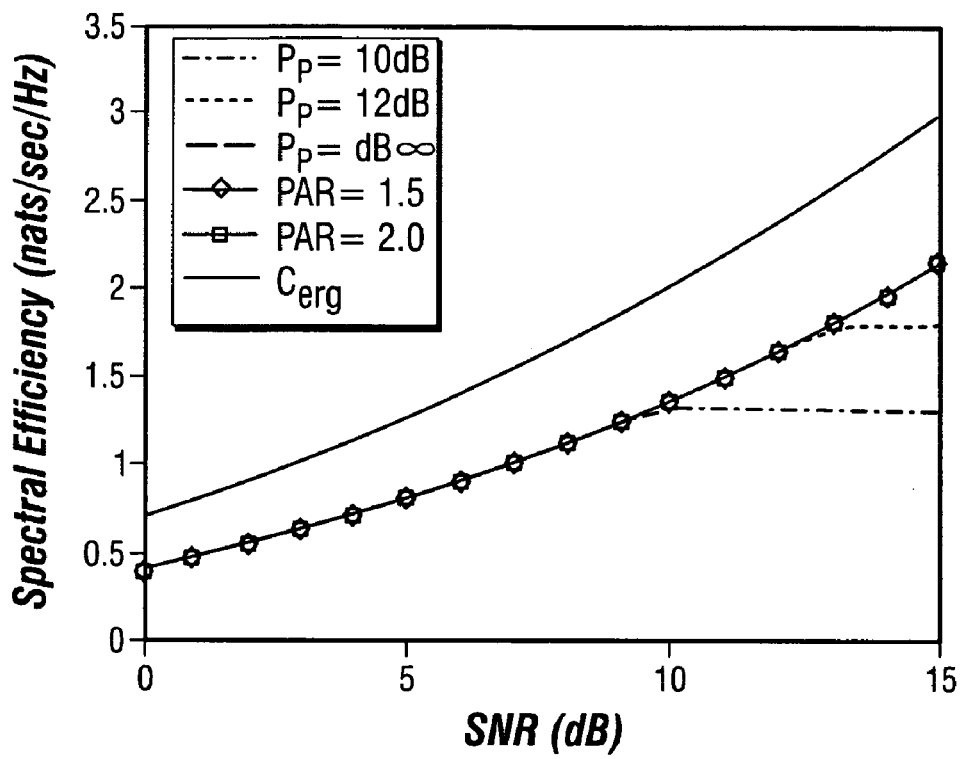
FIG. 4H shows a graph of MZT vs. Pav for K=5 for various values of peak power.

A peak power constraint limits the maximum throughput. FIG. 4G show $MZT_{DT}^{lt}$ when K=5 as a function of $P_{av}$ both with and without a peak power constraint. Also plotted for reference is ergodic capacity (without a peak power constraint). $MZT_{DT}^{lt}(P_{av}, K, P_p)$ is nearly identical to $MZT_{DT}^{lt}(P_{av}, K)$ when $P_{av} \ll P_p$. However, for larger $P_{av}$ the outage probability, and therefore $MZT_{DT}^{lt}(P_{av}, K, P_p)$, becomes limited by the peak power constraint. Further increasing the average power does not increase $MZT_{DT}^{lt}(P_{av}, K, P_p)$ as the peak power constraint will not allow improvements in the minimum outage probability. FIG. 4G also illustrates $MZT_{DT}^{lt}$ for a fixed PAR. Here, $MZT_{DT}^{lt}$ continues to increase with $P_{av}$, but the effect of the PAR restriction is obvious—$MZT_{DT}^{lt}$ is less than that obtained without a peak power constraint. FIG. 4H illustrates the analogous results for the short-term power constraint. The same effects are present but are not as pronounced due to the fact that the short-term amperage power constraint is less affected by an additional peak power constraint than the long-term average power constraint.

Figure 4I:
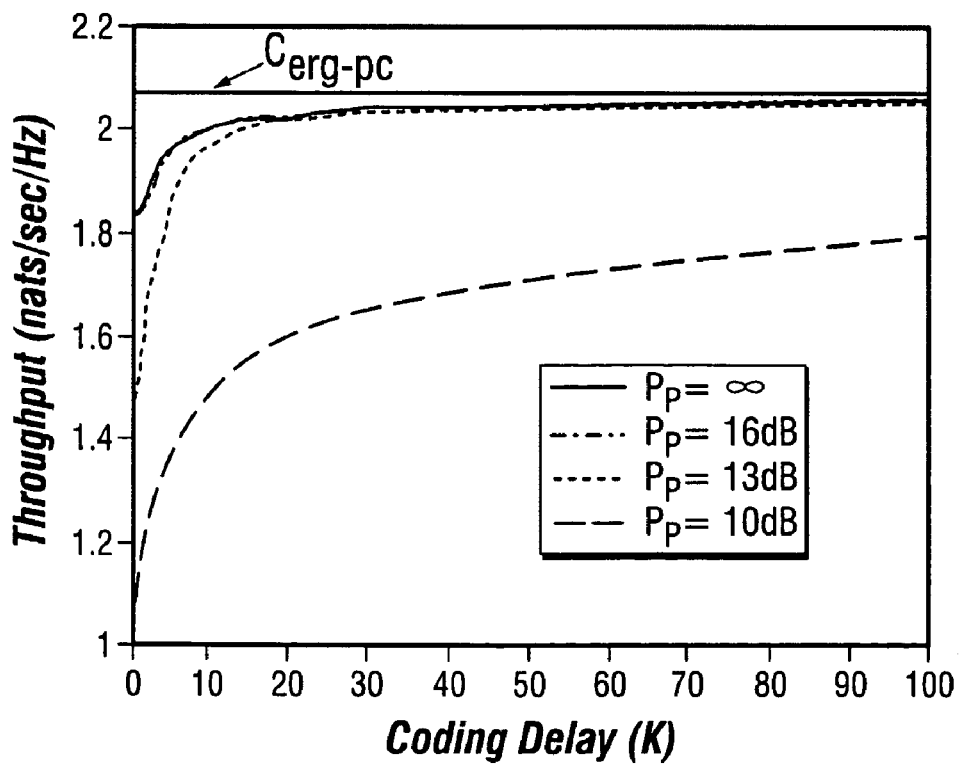
FIG. 4I shows a graph of MZT with a delayed transmission scheme vs. K for a long-term average power constraint Pav=10 dB.
Figure 4J:
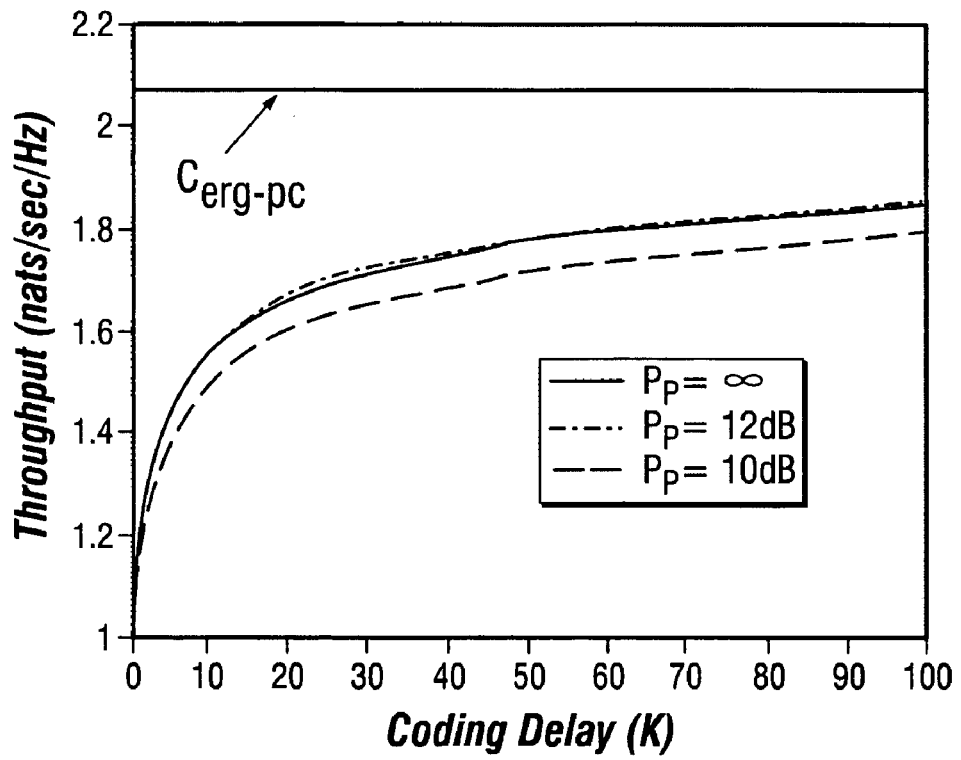
FIG. 4J shows a graph of MZT with a delayed transmission scheme vs. K under a short-term average power constraint Pav=10 dB.

$MZT_{DT}^{lt}(P_{av}, K, P_p)$, is plotted against coding delay K for $P_{av}$=10 dB and various values of $P_p$ in FIG. 4I(b). The smaller the $P_p$, the further $MZT_{DT}^{lt}(P_{av}, P_p, K)$ is from $MZT_{DT}^{lt}(P_{av}, K)$. An interesting phenomenon is observed as K increases; it is seen that the peak power constraint affects the maximum throughput, and hence the outage probability, to a lesser degree. This is explained by the fact that the likelihood of a substantially poor channel α decreases for large K. Hence, the likelihood of a power allocation vector which hits the peak power in several blocks also decreases and the effect of the peak power constraint diminishes. The same phenomenon can be seen with the short-term power constraint in FIG. 4J, though to a lesser degree.

Figure 4K:
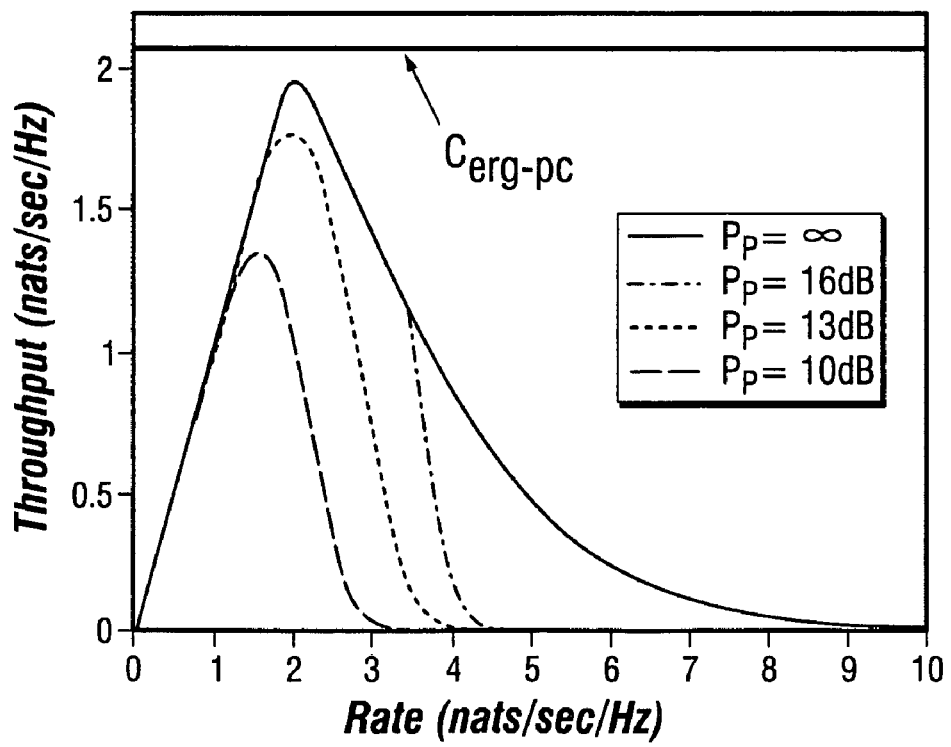
FIG. 4K shows a graph of throughput vs. transmission rate under long-term and peak power constraints for K=5, Pav=10 dB, and various peak power constraint values.
Figure 4L:
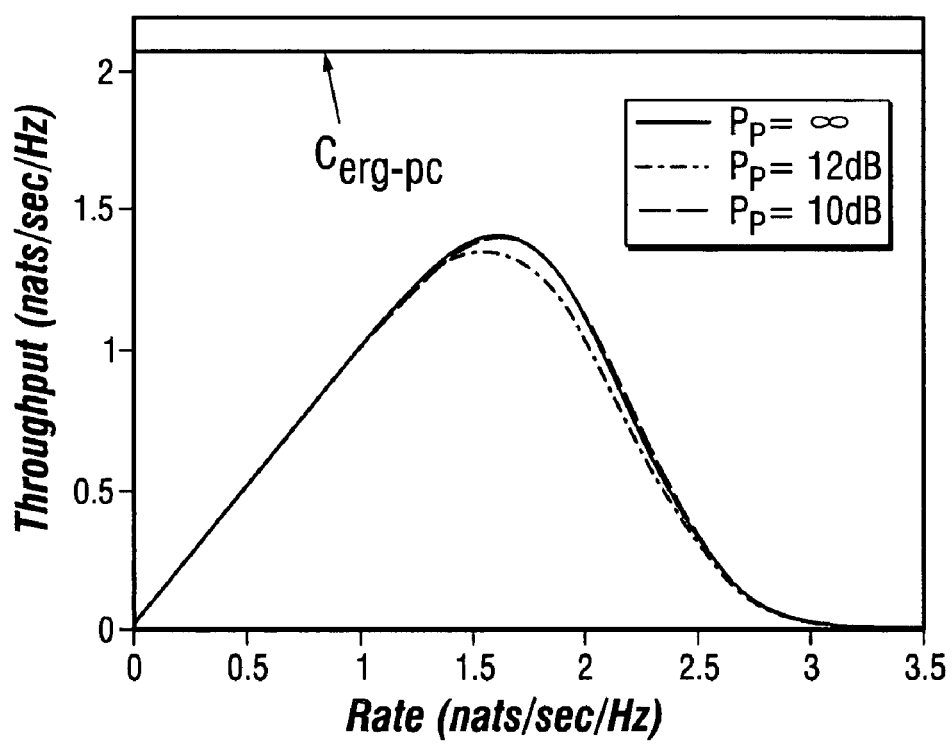
FIG. 4L shows a graph of throughput vs. transmission rate under short-term and peak power constraints for K=5, Pav=10 dB, and various values of peak power constraints.

Properly selecting the transmission rate remains important when a peak power constraint is imposed. FIG. 4K plots the throughput against transmission rate with a long-term average power constraint for different values of $P_p$. It is critical to select the transmission rate that corresponds to $MZT_{DT}^{lt}(P_{av}, K, P_p)$, since a suboptimal selection can yield a large throughput drop. The effect of the peak power constraint is clearly seen on the throughput—small values of $P_p$ and/or for large values of R the transmitted signal is peak limited. That is, the throughput is less that that if there is no peak power constraint. This same phenomenon is observed under the short-term power constraint in FIG. 4L though not seen to the same degree as under the long-term power constraint.

Figure 4M:
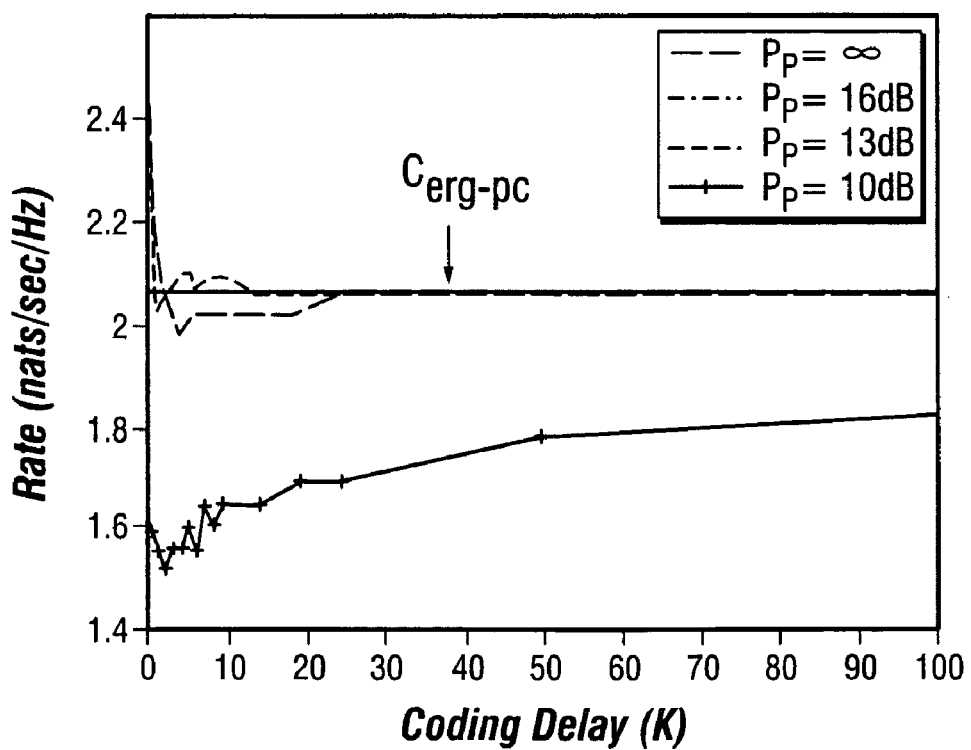
FIG. 4M shows a graph of optimal transmission rate vs. K under a long-term average power constraint of Pav=10 dB and various peak power constraints.
Figure 4N:
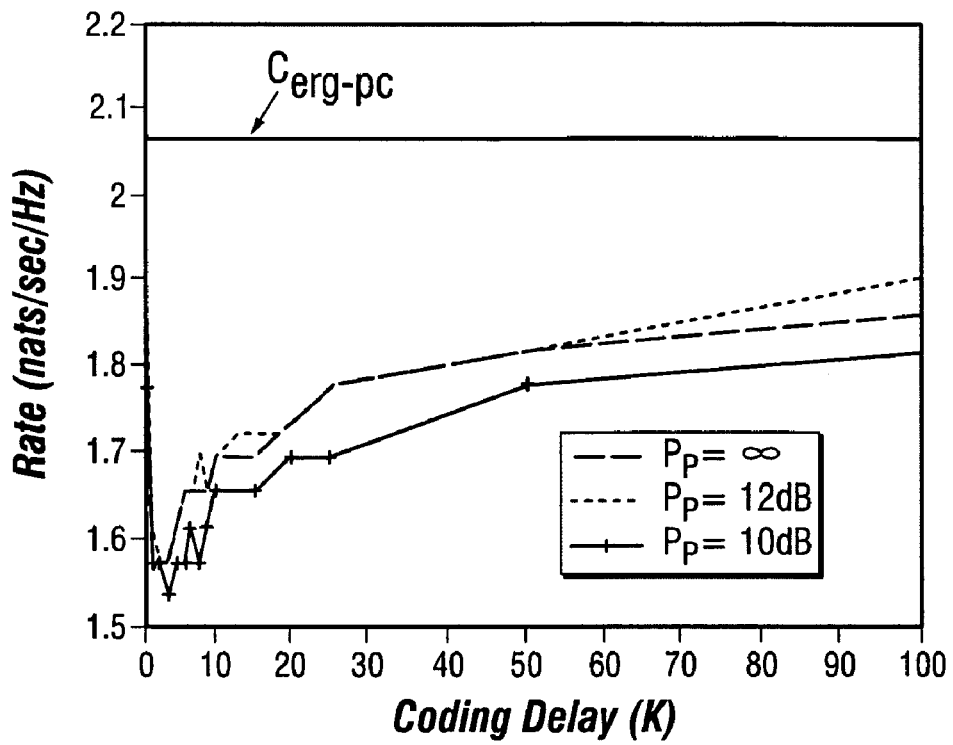
FIG. 4N shows a graph of optimal transmission rate vs. K under a short-term average power constraint of Pav=10 dB and various values of peak power constraint.
Figure 4O:
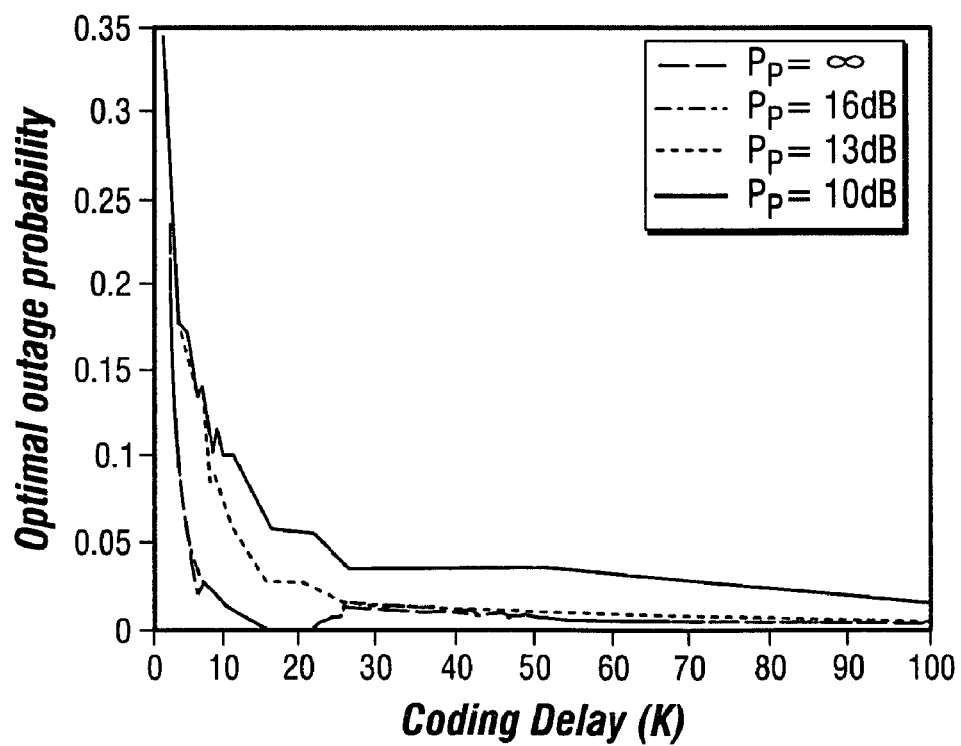
FIG. 4O shows a graph of optimal outage probability vs. coding delay K under the long-term average and peak power constraints with Pav=10 dB.
Figure 4P:
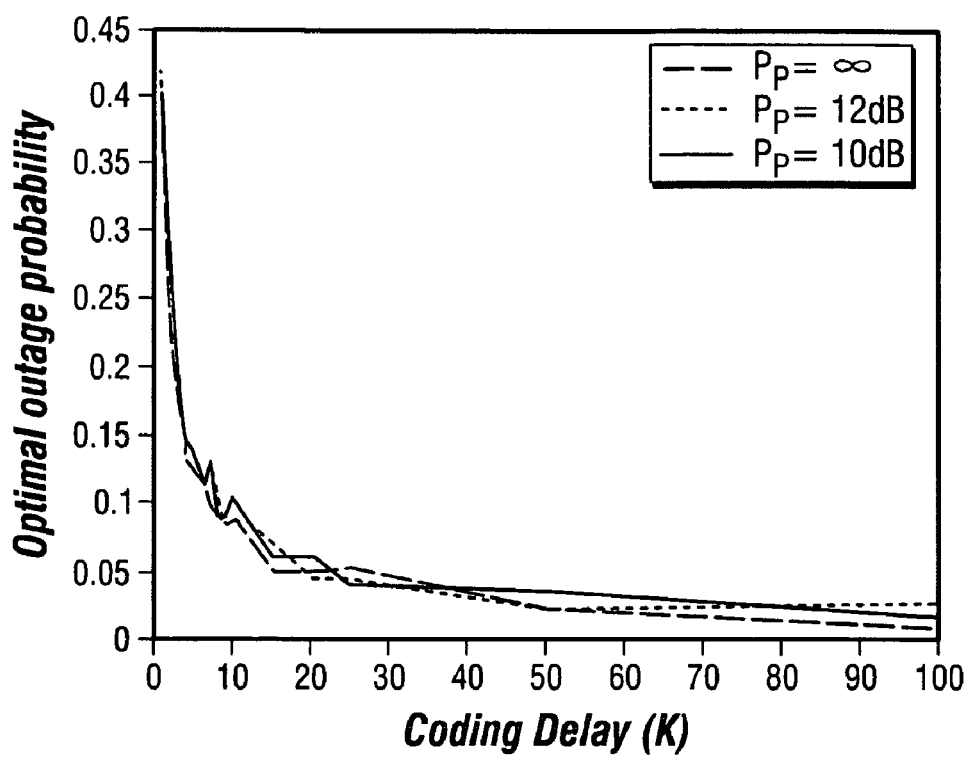
FIG. 4P shows a graph of optimal outage probability vs. coding delay K under the short-term average and peak power constraints with Pav=10 dB.

FIG. 4M and FIG. 4O show the optimal transmission rate and the associated outage probability as a function of K for various $P_p$ under the long-term average power constraint. The optimal transmission rate can be higher than ergodic capacity and the optimal outage probability can be high. Both observations run counter to conventional practice. As K grows, the difference in the optimal transmission rates, with and without a peak power constraint, decreases. FIG. 4N and FIG. 4P illustrate the analogous results under the short-term average power constraint.

5. Throughput Maximization with Queueing Delay Constraints

The throughput maximization analysis described previously measured communication performance under the multi-attempt paradigm. The average throughput for schemes RT, ID and DT are maximized. By allowing multiple transmission attempts per codeword, zero-outage communication is possible for finite coding delay K. This is often not the case for the single-attempt approach, which often results in zero throughput for finite K. The improved throughput achieved with the multi-attempt approach does not come without any cost. The cost is a queueing delay due to the random nature of the fading channel that is not present with the single transmission attempt approach.

5.1 Mathematical Formulation

In the following queueing analysis a slotted transmission system in which "time" is measured in multiples of the channel coherence time, or blocks of N transmitted symbols in the BF-AWGN channel model is assumed. A codeword transmission attempt that requires 1 slot which corresponds to K blocks if the coding delay is K is assumed. A simple Bernoulli arrival process in which either zero or one codeword arrives into the queue in any slot is also assumed. The arrival process has the distribution $$f_a(n) = Prob(n \text{ arrivals}) = \begin{cases} a, & n = 1 \\ 1 - a, & n = 0, \end{cases} \quad (5.1)$$

with average arrival rate, E[n]=a, the average number of codewords arriving in any particular slot. The average service rate, $$\frac{1}{E[S]},$$

is the average number of codewords serviced by the server in any particular slot. Then the queue utilization factor $$\rho := \frac{\text{average arrival rate}}{\text{average service rate}} = a E[S] \quad (5.2)$$

represents the proportion of time that the server is busy. Factoring the queue utilization yields $$T^{LT}(R, P_{av}, K, a) = \rho(a, R) \frac{R}{E[S]} \quad (5.3)$$

as the long-term average throughput for a particular transmission rate R. The formulation is similar to (1.2) except for the scaling factor ρ(a, R) that accounts for the proportion of time the server in the queue is busy For example, if the codeword arrival rate and transmission rate are such that the throughput is 2 nats/sec/Hz but $\rho=\frac{1}{2}$, implying that the server is busy only half of the time, then the long-term average throughput is 1 nat/sec/Hz.

The communications throughput without a constraint on the queueing delay was previously maximized. As such, the queue utilization factor was $\rho=1$, and the server was always busy either transmitting or retransmitting codewords This implies that average arrival rate of codewords into the queue is equal to the average service rate of the codewords. This approach limits the coding delay to K blocks and provides the maximum throughput for a particular retransmission scheme without a constraint on the queueing delay. In many applications, such as video or voice, excessive queueing delays cannot be tolerated. For these systems operating at the maximum throughput $T_{max}(P_{av}, K)$ (1.2) is not feasible as it would lead to excessive delay. For such applications the arrival rate and coding rate may be adjusted to ensure that the queueing delay is not excessive.

The expected waiting-time, or delay, is the amount of time that a codeword spends in the system (either in the queue or under service). One way to constrain the queue length is to constrain the expected waiting-time of codewords that arrive into the system. Illustrate are constant power transmission and schemes RT since it is the most analytically tractable; however, similar results can be derived for other multi-attempt schemes both with and without power control. The problem of throughput maximization with a waiting-time constraint can be stated as $$T_{\max}^D(P_{av}, K) = \sup_{a,R}\left\{\rho(a, R)\frac{R}{\mathbb{E}[S]} : \mathbb{E}[W] \le D\right\} \quad (5.4)$$

where $\mathbb{E}[W]$ is the expected waiting time for each codeword entering the system and the supremum is taken over all valid arrival rates, a, and transmission rates, R. (5.4) is examined in detail for scheme RT.

5.2 Optimal Throughput Maximization with Queuing Delay Constraints

Since the arrival process is Bernoulli, the interarrival time distribution, the distribution of the number of slots between consecutive codeword arrivals, is geometric with parameter a. From Section 2.1, it is known that the service time distribution for scheme RT is also geometric with parameter $[1-P_{out}(R, P_{av}, K)]$. Since both the interarrival and service times are geometrically distributed, the communications system can be modeled as a discrete-time Geo/Geo/1 queue.

The expected waiting time for a Geo/Geo/1 queue, in terms of blocks in the BF-AWGN model, is $$\mathbb{E}[W] = \frac{K}{1-\lambda} \quad (5.5)$$

where $$\lambda := \frac{1 - \text{average service rate}}{1 - \text{average arrival rate}} = \frac{P_{out}(R, P, K)}{1-a} \quad (5.6)$$

The queue utilization for scheme RT can be written as $$\rho = \frac{a}{[1 - P_{out}(R, P_{av}, K)]}. \quad (5.7)$$

Without a queueing delay constraint $\rho=1$ and the optimal transmission rate as $R_{MZT_{RT}}^*$. From (5.7) when $\rho(a, R)=1$ the resulting optimal codeword arrival rate is $$a_{MZT_{RT}}^* = 1 - P_{out}(R_{MZT_{RT}}^*, P_{av}, K). \quad (5.8)$$

Using (5.4)-(5.6) the maximum zero-outage throughput for coding delay K and power $P_{av}$ with a constraint D on the amperage waiting time can be written as $$MZT_{RT}^D(P_{av}, K) = \sup_{a,R}\left\{aR: \frac{K(1-a)}{1-a-P_{out}(R, P_{av}, K)} \le D\right\}. \quad (5.9)$$

Throughput is maximized by optimally selecting the codeword arrival rate a and the coding rate R with the constraint that the expected waiting-time (delay) is less than D blocks. This problem can easily be converted to constrain the number of codewords in the communication system by applying Little's theorem $$M=aD \quad (5.10)$$

with M representing the number of codewords in the system, either in the queue or being served. In general the transmitter does not have control of the codeword arrival rate since data is generated by applications not under the control of the communication system. However, it is possible to optimize over the arrival rate a in order to determine the optimal rate that applications should generate data. Though the objective function in (5.9) is convex, the set of feasible points for the optimization problem is not and therefore (5.9) is not a convex optimization problem. Thus, a unique solution to (5.9) may not exist.

Figure 5A:
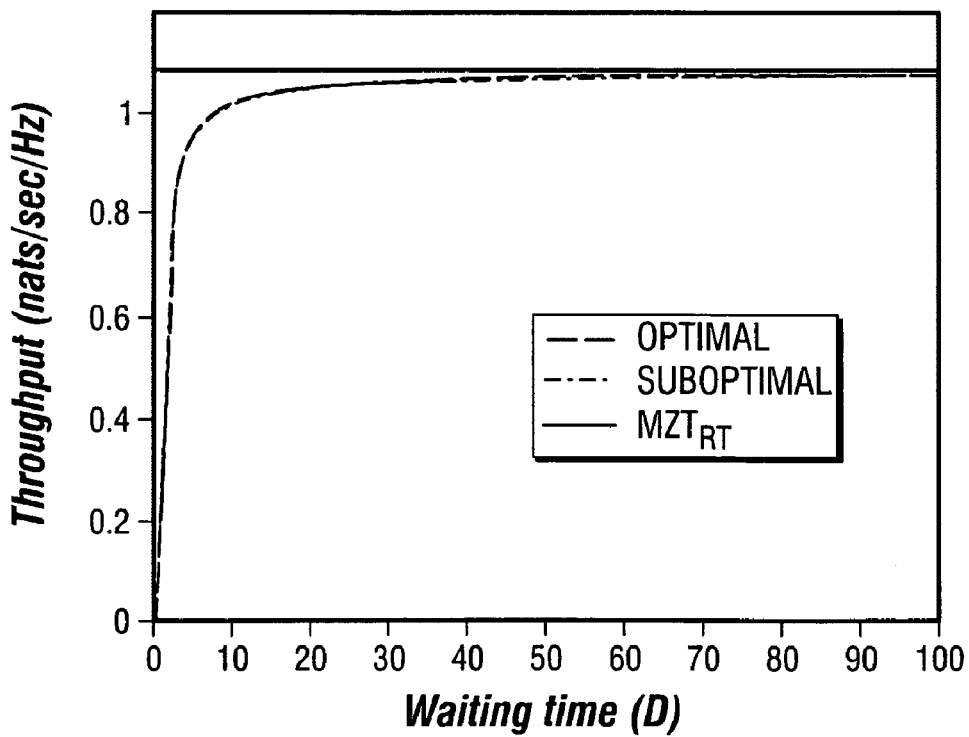
FIG. 5A shows a graph of MZT and near-optimal throughput as a function of average waiting time for K=1 and Pav=10 dB.

FIG. 5A plots the optimal $MZT_{RT}^D(P_{av}, K)$ as a function of the maximum average waiting time D, for K=1 and $P_{av}=10$. $MZT_{RT}^D(P_{av}, K)$ was found by exhaustive search over the variables R and a. It is seen that the maximum through-put approaches $MZT_{RT}(K, P_{av})$ as the constraint on the waiting time is relaxed, i.e. $D\to\infty$. Though it cannot be shown explicitly, since no closed form for (5.9) exists, the convergence of $MZT_{RT}^D(P_{av}, K)$ to $MZT_{RT}(K, P_{av})$ appears monotonic. This figure is particularly useful as it allows the prediction of the best case performance of a communication system using retransmission scheme RT with both a finite coding delay K and a finite waiting-time D. It is also interesting to note that for small D≈10 the maximum throughput with a waiting-time constraint approaches that obtained without a waiting-time constraint.

Figure 5B:
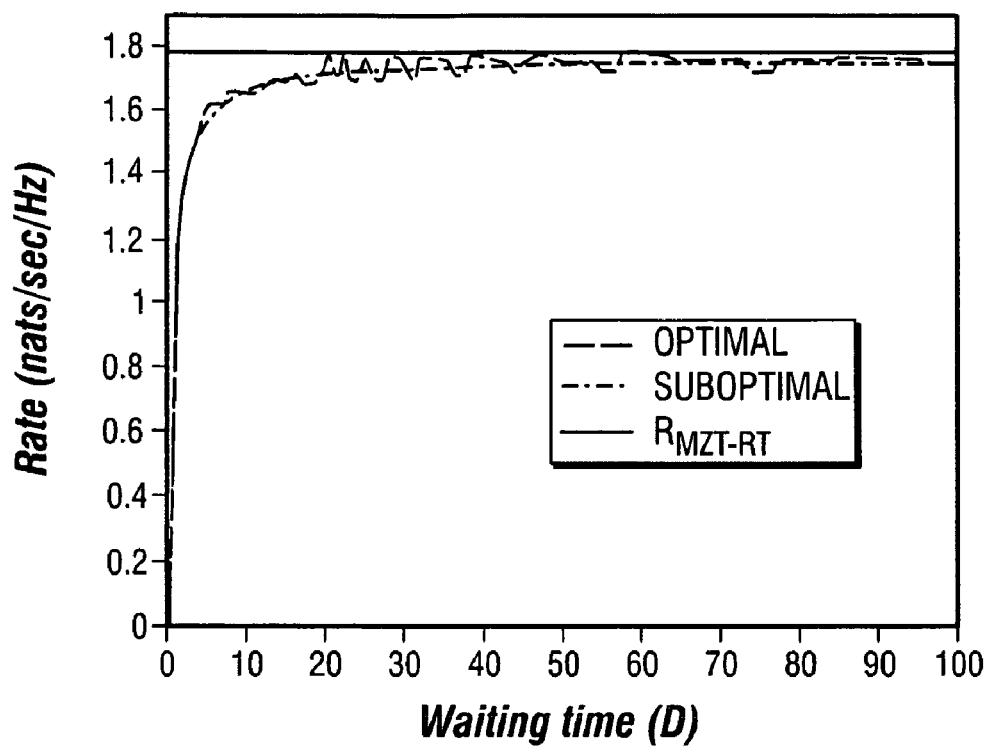
FIG. 5B shows a graph of optimal transmission rate and near-optimal transmission rate as a function of the average waiting time for K=1 and Pav=10 dB.
Figure 5C:
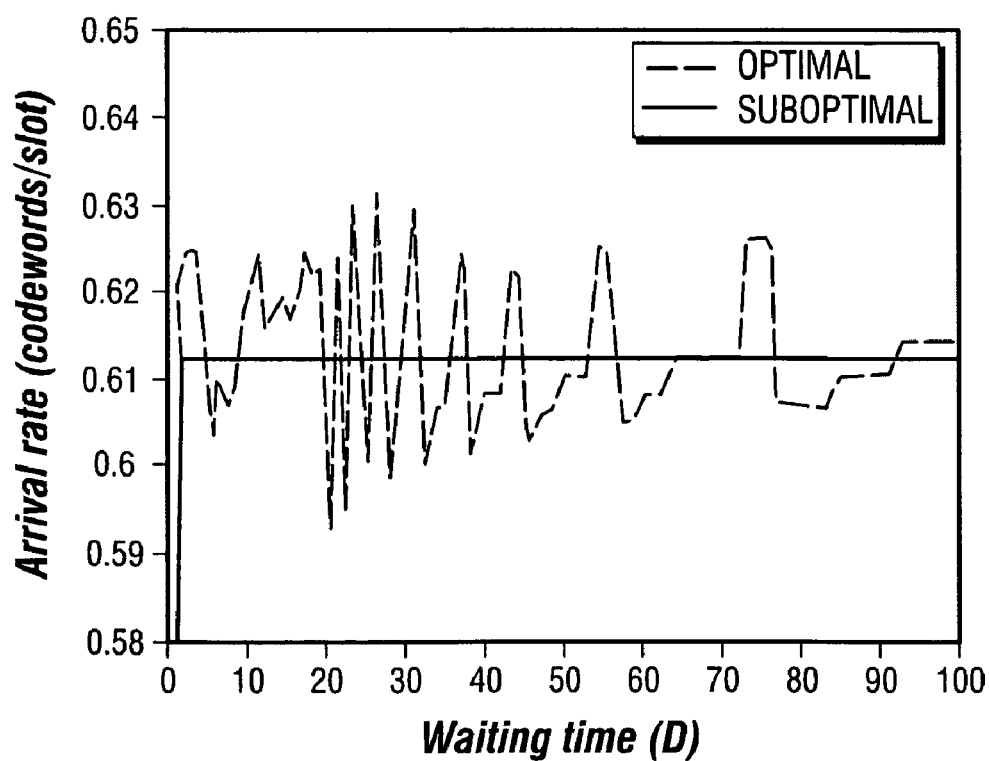
FIG. 5C shows a graph of optimal arrival rate as a function of average waiting time for K=1 and Pav=10 dB.

For K=1 and $P_{av}=10$ dB, the optimal transmission rate $R_{MZT_{RT}}^{D*}$ and codeword arrival rate $a_{MZT_{RT}}^{D*}$ that maximize (5.9) are shown in FIGS. 5B and 5C, respectively. It is seen that $R_{MZT_{RT}}^{D*} \to R_{MZT_{RT}}^*$ and $a_{MZT_{RT}}^{D*} \to a_{MZT_{RT}}^*$ as $D\to\infty$. However, the convergence is not monotonic and the optimal values of $R_{MZT_{RT}}^{D*}$ and $a_{MZT_{RT}}^{D*}$ can fluctuate as a function of D. This is due to the non-convexity of the original problem (5.9). For small D that $R_{MZT_{RT}}^{D*}$ is quite far from the optimal $R_{MZT_{RT}}^*$ while $a_{MZT_{RT}}^{D*}$ is not far from $a_{MZT_{RT}}^*$. Thus, in order to maximize the throughput while constraining the average waiting-time, the coding rate rather than the codeword arrival rate should be reduced; the frequency of codeword arrivals should be left unchanged while the amount of information in each codeword should be reduced. A reduction in the codeword arrival rate reduces the throughput to a greater extent than a reduction in the coding rate. This is non-intuitive as conventional flow-control algorithms, such as TCP, reduce the frequency of packet generation when large queues build in communication networks. The difference is reconciled by the fact that the underlying cause for the buildup of queues is different. The action that TCP takes is motivated by the assumption that queues build due to congestion in the network—that packets are being generated faster than the network can handle them. However, queues in fading channels grow due to the frequency of codeword generation and the fact that the medium itself is unreliable. For example, if the channel condition remains poor for 10 consecutive slots (resulting in outages for 10 consecutive transmission attempts) and zero new codewords arrive into the queue, then the queue size remains unchanged. However, if the link is assumed reliable and if zero codewords arrive into the queue for 10 consecutive slots, then the queue size shrinks by 10. This concept allows for a novel method for waiting-time/delay (or queue-length) management in fading channels: If the average waiting-time is large then it can be reduced by using a smaller coding rate (codewords with a smaller amount of data) at the transmitter. Conversely, a larger coding rate (more information per codeword) can be used at the transmitter to increase communications throughput at the expense of a larger waiting-time.

Figure 5D:
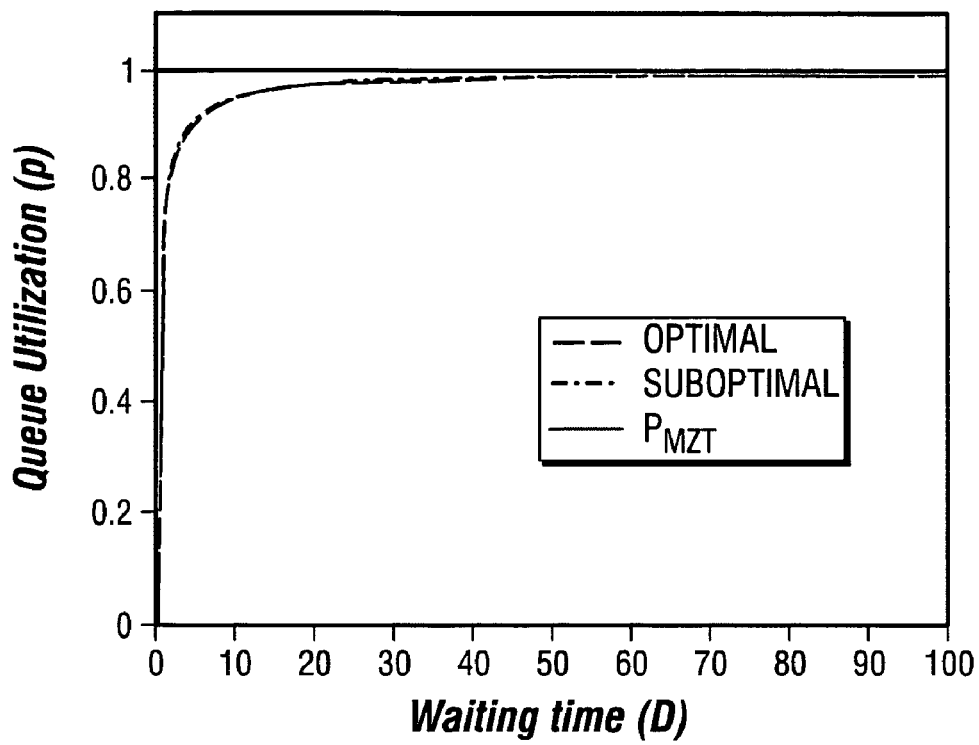
FIG. 5D shows a graph of queue utilization for both optimal and suboptimal strategies as a function of average waiting time for K=1 and Pav=10 dB.

For the optimal coding rate and codeword arrival rate the corresponding queue utilization ρ(a, R) is plotted in FIG. 5D as a function of D. It is seen that in order to satisfy a smaller waiting-time constraint D the queue utilization is lowered until the delay constraint is met. From FIGS. 5B and 5C it is seen that this is accomplished by reducing the transmission rate rather than the arrival rate. This is preferable to the opposite situation (reducing the arrival rate while keeping the transmission rate constant) since it yields a larger throughput for the same waiting-time.

5.3 Near-Optimal Throughput Maximization with Queuing Delay Constraints

Since (5.9) is not a convex optimization problem it may have many local maxima. As such, numerical techniques to solve (5.9) may not converge to the globally optimal solution. In this situation a near-optimal optimization problem that is amenable to a numerical solution is desirable.

The optimal arrival rate $a_{MZT_{RT}^D}^*$ in (5.9) does not deviate greatly from $a_{MZT_{RT}}^*$ as a function of D. This phenomenon can be seen in FIG. 5C. Similarly, it is seen from FIG. 5B that the optimal transmission rate drops significantly for small D. Clearly adjusting R rather than a is more important for controlling the waiting-time D while maximizing the throughput. Therefore, it makes sense for the arrival rate to be fixed $a=a_{MZT_{RT}}^*$ and the optimization to only be performed over the transmission rate R.

For a fixed arrival rate $a=a_{MZT_{RT}}^*$ near-optimal $nMZT_{RT}^D$ for coding delay K and power $P_{av}$ with average waiting time D is defined as $$nMZT_{RT}^D(P_{av}, K) = \qquad (5.11)$$

$$\sup_R \left\{ a_{MZT_{RT}}^* R: \frac{1 - a_{MZT_{RT}}^*}{1 - a_{MZT_{RT}}^* - P_{out}(R, P_{av}, K)} \leq D \right\}.$$

This is a convex optimization problem since both the objective function and set of feasible points are convex. Therefore, a globally optimal solution to (5.11) exists. The existence of a near-optimal convex optimization problem is also useful since both (5.9) and (5.11) must be solved numerically; if an optimization algorithm converges to a local maxima in both cases, then it is the globally optimal solution to (5.11) while it may not be for (5-9).

When K=1 and the channel fading is $\chi_2^2$ a closed form solution to the near-optimal (5.11) can be found.

Theorem 5.3.1. If K=1 and the channel fading process follows a $\chi_2^2$ fading distribution then $$nMZT_{RT}^D(P_{av}, 1) = a_{MZT_{RT}}^* \log\left(1 - P_{av} \log\left(\frac{1 - a_{MZT_{RT}}^*(1-D)}{D}\right)\right). \qquad (5.12)$$

Proof. To begin $$nMZT_{RT}^D(P_{av}, 1) = \qquad (5.13)$$

$$\sup_R \left\{ a_{MZT_{RT}}^* R: \frac{1 - a_{MZT_{RT}}^*}{1 - a_{MZT_{RT}}^* - P_{out}(R, P_{av}, 1)} \leq D \right\}.$$

For K=1 and $\chi_2^2$ fading $$P_{out}(R, P_{av}, 1) = 1 - e^{-\left(\frac{e^R - 1}{P_{av}}\right)}. \qquad (5.14)$$

Substituting this into the waiting-time constraint $$\frac{1 - a_{MZT_{RT}}^*}{e^{-\left(\frac{e^R - 1}{P_{av}}\right)} - a_{MZT_{RT}}^*} \leq D \qquad (5.15)$$

which after some algebraic manipulation yields $$\mathcal{R} \leq \log\left(1 - \mathcal{P}_{av} \log\left(\frac{1 - a_{MZT_{RT}}^*(1 - \mathcal{D})}{\mathcal{D}}\right)\right). \qquad (5.16)$$

Clearly the linear objective function in (5.13) is maximized by satisfying (5.16) with equality, resulting in (5.12). □

In FIG. 5A it is seen that the near-optimal $nMZT_{RT}^D(P_{av}, K)$ achieved by only varying the coding rate performs nearly as well as $MZT_{RT}^D(P_{av}, K)$ achieved by optimizing the transmission rate and codeword arrival rate. A reduction in either a and R reduces both the expected waiting-time and maximum throughput. However, the maximum throughput suffers a great deal more if a rather than R is reduced, explaining the fact that $a_{MZT_{RT}}^* \approx a_{MZT_{RT}^D}^*$.

FIG. 5B compares the optimal $R_{MZT_{RT}^D}^*$ and near-optimal $R_{nMZT_{RT}^D}^*$ transmission rates as a function of the waiting-time D. As with $R_{MZT_{RT}^D}^*$, $R_{nMZT_{RT}^D}^*$ converges to $R_{MZT_{RT}}^*$ as D→∞. For K=1 this can be analytically seen by the fact that the throughput maximizing transmission rate $$\mathcal{R}^*_{nMZT^D_{RT}} = \log\left(1 - \mathcal{P}_{av}\log\left(\frac{1 - a^*_{MZT_{RT}}(1-\mathcal{D})}{\mathcal{D}}\right)\right) \quad (5.17)$$

$$\stackrel{D\to\infty}{=} \log(1 - \mathcal{P}_{av}\log(a^*_{MZT_{RT}}))$$

$$= R^*_{MZT_{RT}}.$$

The near-optimal queue utilization is compared with the optimal queue utilization in FIG. 5D for K=1 and $P_{av}$=10 dB. Both are similar although the near-optimal one is obtained by varying only the transmission rate and not the codeword arrival rate.

5.4 The Queueing Delay vs. Coding Delay Tradeoff

Above, the waiting-time is constrained to be less than D for a fixed coding delay of K. However, some applications using a communication system are affected by the total delay and it does not matter whether the delay is spent in coding or queueing. For small K retransmissions are less costly in terms of delay but the instantaneous capacity, but the amount of information that can be reliably transmitted with each codeword, is small. For large K the opposite is true, the instantaneous capacity is larger but retransmission is more costly in terms of delay. By optimizing over the coding delay K, an optimal balance can be struck.

Using this idea, it is possible to define $$MZT^D_{RT}(\mathcal{P}_{av}) = \sup_K \{nMZT^D_{RT}(\mathcal{P}_{av}, K)\} \quad (5.18)$$

and $$nMZT^D_{RT}(\mathcal{P}_{av}) = \sup_K \{nMZT^D_{RT}(\mathcal{P}_{av}, K)\} \quad (5.19)$$

as the highest optimal and near-optimal throughput for $P_{av}$ and average waiting-time D. These quantities are achieved by solving (5.9) and (5.11) for each value of K∈{1, 2, ..., D} and then taking the supremum, over K, of these values.

Figure 5E:
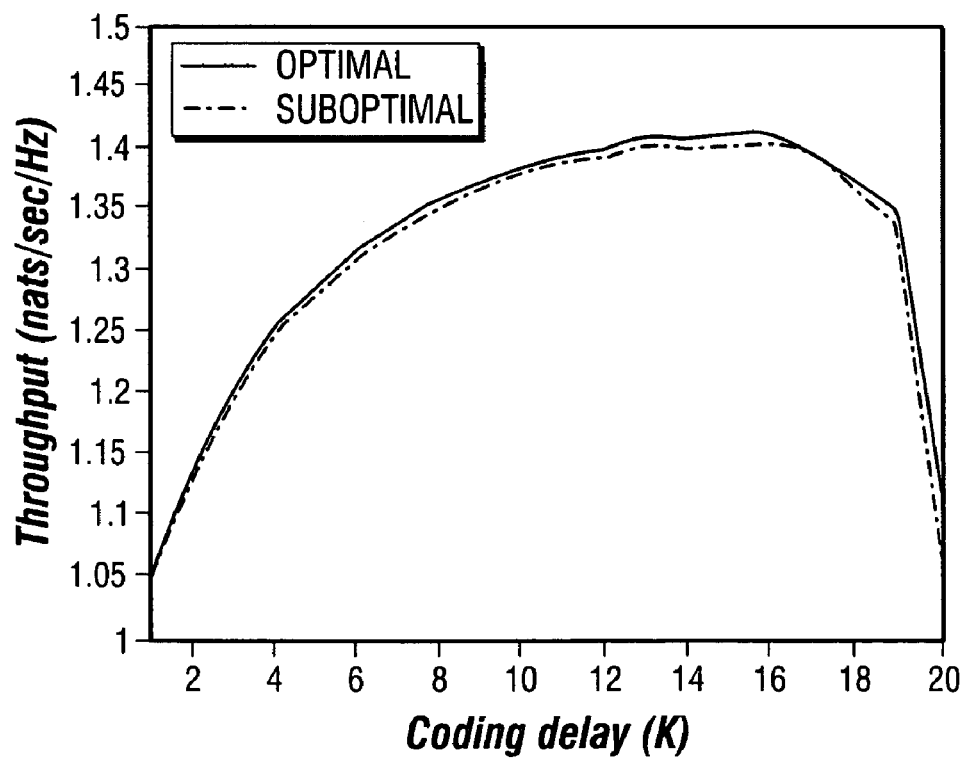
FIG. 5E shows a graph of MZT as a function of K for a waiting time of D=20 and for Pav=10 dB.

The tradeoff between coding delay and queueing delay is illustrated in FIG. 5E, which plots $MZT_{RT}^D(P_{av}, K)$ and $nMZT_{RT}^D(P_{av}, K)$ as a function of K for D=20 and $P_{av}$=10 dB.

To the end-user the average waiting time is D=20 for each coding delay K, however, the throughput is not. By optimizing over K, the throughput can be maximized without any effect on the average waiting-time of end users. In this case it is seen that there is a unique coding delay, K=16, that corresponds to $MZT_{RT}^D(P_{av})$ and $nMZT_{RT}^D(P_{av})$, respectively. This indicates that for a total waiting-time of D=20 that the coding delay should be set to K=16 and the codeword arrival and transmission rates found by solving (5.9) and (5.11), respectively. Also note that only zero throughput is achievable with K=20 for both the optimal and near-optimal techniques. This is due to the fact that the minimum delay is D=20 since K=20 and a retransmission of any codeword would violate the average waiting-time constraint. Since retransmissions are not permitted in this case and zero-outage communication is not possible with a single-transmission attempt (delay-limited capacity is zero), the throughput is zero.

Figure 5F:
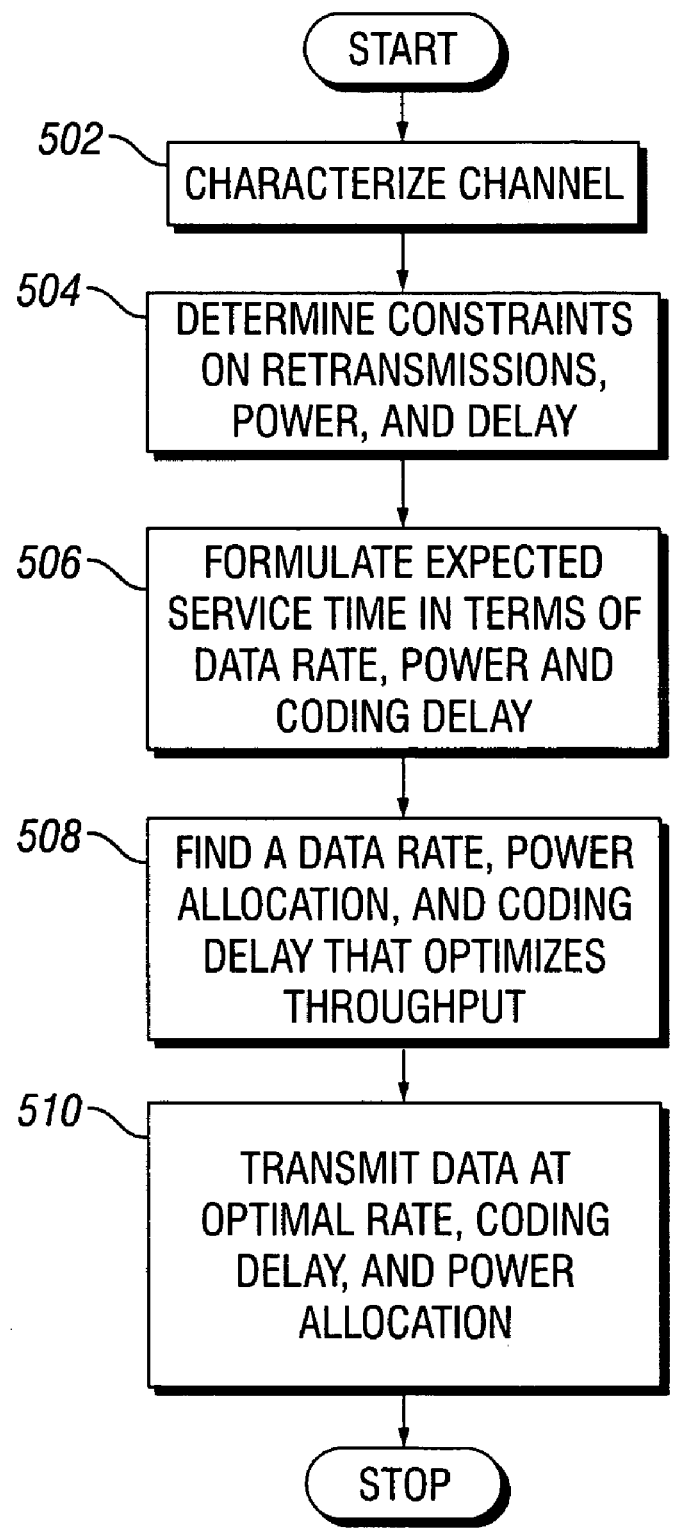
FIG. 5F shows a flow diagram of a technique used to optimize throughput during data transmission over a wireless channel.

FIG. 5F shows a flow diagram of a technique used to optimize throughput during data transmission over a wireless channel. The technique may be implemented by first characterizing the channel (block 502). Characterizing the channel includes identifying a coherence time for the channel, identifying a noise power, and modeling a channel gain probability density function. Constraints on retransmissions, power, and delay then are determined (block 504) to establish the parameters within which subsequent optimization calculations are to be performed. Expected service time is subsequently formulated in terms of data rate, power and coding delay (block 506). The expected service time is used in calculations to determine a data rate, power allocation, and coding delay that optimize throughput (block 508). Results of these calculations are used to transmit data at the optimal rate, coding delay and power allocation (block 510), thus optimizing throughput.

What is claimed is:

1. A communication method comprising:

characterizing a commutations channel using a transmitter;

determining a data rate that maximizes channel throughput using said transmitter; and configuring said transmitter to send a transmit signal with said data rate;

wherein characterizing the communications channel comprises modeling a channel gain probabilty density function;

wherein the power allocation strategy sets $\gamma_k$, a transmit gain for a kth interval, to $$\gamma_k(\underline{\alpha}) = \min\left(\max\left(\lambda(\underline{\alpha}) - \frac{1}{\alpha_k}, 0\right), P_p\right),$$

wherein $\underline{\alpha}$ is a vector of the channel attenuation $\alpha_k$ for the last K intervals, $P_P$ is a peak power constraint, and $\lambda(\underline{\alpha})$ is the solution to $$\frac{1}{K}\sum_{k=0}^{K-1} \min\left(\max\left(\lambda(\underline{\alpha}) - \frac{1}{\alpha_k}, 0\right), P_p\right) = P_{av}.$$

2. The method of claim 1, wherein said determining further includes determining a power allocation strategy that jointly maximizes the channel throughput with said data rate.

3. The method of claim 2, wherein said power allocation strategy provides for adjustment of the transmit power to compensate for channel gain variation.

4. The method of claim 3, wherein said power allocation strategy minimizes outage probability subject to peak power and average power constraints.

5. The method of claim 1, wherein the power allocation strategy stochastically sets $\gamma_k$, a transmit gain for a kth interval, to $$\gamma_k(\underline{\alpha}) = 0 \text{ or } \gamma_k(\underline{\alpha}) = \min\left(\max\left(\lambda(\underline{\alpha}) - \frac{1}{\alpha_k}, 0\right), P_p\right),$$

wherein $\underline{\alpha}$ is a vector of the channel attenuation $\alpha_k$ for the last K intervals, $P_P$ is a peak power constraint, and $\lambda(\underline{\alpha})$ is the solution to $$\frac{1}{K}\sum_{k=0}^{K-1}\log\left[1 + \alpha_k \min\left(\max\left(\lambda(\underline{\alpha}) - \frac{1}{\alpha_k}, 0\right), P_p\right)\right] = R,$$

wherein R is the data rate, and wherein the stochastic probability is based on a current channel gain and a history of transmit gains.

6. The method of claim 1, wherein the communications channel is a wireless channel.

7. The method of claim 6, wherein said characterizing includes:
identifying a coherence time for the channel; and
identifying a noise power.

8. The method of claim 1, wherein said determining includes:
maximizing a throughput function that accounts an expected service time for transmitting a codeword to a receiver and an average amount of data carried by each codeword.

9. The method of claim 8, wherein the expected service time is expressible as a function of data rate.

10. The method of claim 8, wherein the expected service time is expressible as a function of coding delay.

11. The method of claim 8, wherein the expected service time accounts for a power allocation strategy.

12. The method of claim 8, wherein the expected service time accounts for delay constraints.

13. The method of claim 8, wherein the expected service time accounts for retransmission constraints.

14. The method of claim 8, wherein the expected service time accounts for outage probability.

15. The method of claim 8, wherein the expected service time accounts for receiver decoding strategy.

16. The method of claim 15, wherein the receiver decoding strategy includes:
discarding incorrectly received codewords; and
requesting re-transmission of the incorrectly received codewords.

17. The method of claim 15, wherein the receiver decoding strategy includes:
requesting re-transmission of incorrectly decoded codewords; and
combining re-transmitted codewords with incorrectly decoded codewords to decode the re-transmitted codewords.

18. A communication method comprising:
characterizing a communications channel;
determining a data rate that maximizes channel throughput; and
configuring a transmitter to send a transmit signal with said data rate;
wherein characterizing the communications channel comprises modeling a channel gain probability density function, wherein the throughput function is expressible as:

$$T(R, \gamma, K) = \frac{R}{E[S(R, \gamma, K)]},$$

wherein R is the data rate, $\gamma$ is the transmit power, K is the coding delay, and $E[S(R,\gamma,K)]$ is the expected service time.

19. The method of claim 18, wherein the expected service time is expressible as:

$$E[S(R, P_{av}, K)] = \frac{1}{1 - P_{out}(R, P_{av}, K)},$$

wherein $P_{av}$ is the average transmit power, and $P_{out}(R,P_{av},K)$ is the probability of a channel outage.

20. The method of claim 18, wherein the expected service time is expressible as:

$$E[S(R, P_{av}, K = 1)] = \frac{e^R + P_{av} - 1}{P_{av}},$$

wherein $P_{av}$ is the average transmit power.

21. The method of claim 18, wherein the expected service time is expressible as:

$$E[S(R, P_{av}, K, L)] = \frac{1 - [P_{out}(R, P_{av}, K)]^L}{1 - P_{out}(R, P_{av}, K)},$$

wherein $P_{av}$ is the average transmit power, $P_{out}(R,P_{av},K)$ is the probability of a channel outage, and L is the maximum number of transmission attempts per codeword.

22. A transceiver that comprises:
a receiver configured to receive information characterizing a communications channel; and
a transmitter configured to process said information to determine a data rate that maximizes a throughput for the communications channel, and further configured to provide a transmit signal to the communications channel using said data rate
wherein, as part of determining a data rate, the transceiver maximizes a channel throughput function that accounts for an expected service time for transmitting a codeword to a remote receiver;
wherein said throughput function is expressible as a function of the data rate and an expected service time, said expected service time being a function of the data rate, transmit power and coding delay.

23. The transceiver of claim 22, wherein as part of determining a data rate that maximizes a throughput for the communications channel, the transmitter is configured to jointly determine a power allocation strategy that maximizes the throughput subject to a power constraint.

24. The transceiver of claim 23, wherein the power allocation strategy minimizes a channel outage probability.

25. The transceiver of claim 22, wherein the communications channel is a fading channel.

26. The transceiver of claim 25, wherein the information characterizing the channel includes a coherence time for the channel, a noise power, and model for a channel gain probability density function.

27. The transceiver of claim 22, wherein the expected service time accounts for data rate and coding delay.

28. The transceiver of claim 27, wherein the expected service time further accounts for constraints on power and retransmission attempts.

29. The transceiver of claim 27, wherein the expected service time further accounts for outage probability and receiver decoding strategy.

30. A transceiver that comprises:
a receiver configured to receive information characterizing a communications channel; and a transmitter configured to process said information to determine a data rate that maximizes a throughput for the communications channel, and further configured to provide a transmit signal to the communications channel using said data rate;

wherein, as part of determining a data rate, the transceiver maximizes a channel throughput function that accounts for an expected service time for transmitting a codeword to a remote receiver;

wherein the throughput function is expressible as:

$$T(R, \gamma, K) = \frac{R}{E[S(R, \gamma, K)]},$$

wherein R is the data rate, $\gamma$ is the transmit power, K is the coding delay, and $E[S(R,\gamma,K)]$ is the expected service time.

31. The transceiver of claim 30, wherein the expected service time is expressible as:

$$E[S(R, P_{av}, K, L)] = \frac{1 - [P_{out}(R, P_{av}, K)]^L}{1 - P_{out}(R, P_{av}, K)},$$

wherein $P_{av}$ is the average transmit power, $P_{out}(R,P_{av},K)$ is the probability of a channel outage, and L is the maximum number of transmission attempts per codeword.

* * * * *